US009144083B2

(12) United States Patent
Zhang et al.

(10) Patent No.: US 9,144,083 B2
(45) Date of Patent: Sep. 22, 2015

(54) COOPERATIVE SENSING SCHEDULING FOR ENERGY-EFFICIENT COGNITIVE RADIO NETWORKS

(75) Inventors: Tengyi Zhang, Hong Kong (CN); Danny Hin Kwok Tsang, Hong Kong (CN)

(73) Assignee: DYNAMIC INVENTION LLC, Victoria, Mahe (SC)

( * ) Notice: Subject to any disclaimer, the term of this patent is extended or adjusted under 35 U.S.C. 154(b) by 348 days.

(21) Appl. No.: 13/114,451

(22) Filed: May 24, 2011

(65) Prior Publication Data

US 2012/0195212 A1    Aug. 2, 2012

Related U.S. Application Data

(60) Provisional application No. 61/438,625, filed on Feb. 1, 2011.

(51) Int. Cl.
*H04W 72/12*      (2009.01)
*H04L 1/16*       (2006.01)

(52) U.S. Cl.
CPC ......... *H04W 72/1215* (2013.01); *H04L 1/1607* (2013.01); *Y02B 60/50* (2013.01)

(58) Field of Classification Search
USPC ....................................................... 370/252
See application file for complete search history.

(56) References Cited

U.S. PATENT DOCUMENTS

2012/0108276 A1*   5/2012   Lang et al. ................... 455/501

OTHER PUBLICATIONS

J. Palicot, "Cognitive Radio: An Enabling Technology for the Green Radio Communications Concept," in Proc. International Conference on Wireless Communications and Mobile Computing, Jun. 2009.
K. B. Letaief and W. Zhang, "Cooperative Spectrum Sensing," Cognitive Wireless Communication Networks, Springer, pp. 115 C138, Oct. 2007.
Y.C. Liang, Y. Zeng, E.C.Y. Peh, and A.T. Hoang, "Sensing-Throughput Tradeoff for Cognitive Radio Networks," IEEE Trans. Wireless Commun., vol. 7, No. 4, pp. 1326-1337, Apr. 2008.
Q. Zhao, L. Tong, A. Swami, and Y. Chen, "Decentralized Cognitive MAC for Opportunistic Spectrum Access in Ad Hoc Networks: a POMDP Framework," IEEE J. Sel. Areas Commun., vol. 25, No. 3, pp. 589-600, Apr. 2007.
D.E. Dominici, "The Inverse of the Cumulative Standard Normal Probability Function," Integral Transforms and Special Functions, vol. 14, No. 4, pp. 281-292, Aug. 2003.
K. Murota, "Discrete Convex Analysis," Mathematical Programming, Springer, vol. 83, No. 1-3, pp. 313-371, Jan. 1998.
K. Murota, "Recent Developments in Discrete Convex Analysis," Research Trends in Combinatorial Optimization, pp. 219-260, Nov. 2008.

(Continued)

*Primary Examiner* — Huy D Vu
*Assistant Examiner* — Bao G Nguyen
(74) *Attorney, Agent, or Firm* — Amin, Turocy & Watson, LLP

(57) ABSTRACT

Cooperative sensing scheduling and parameter designs are described, which can achieve improvements in energy efficiency in cognitive radio networks, for example. In addition, the disclosed subject matter describes an objective or reward function or policy related to energy efficiency and considerations such as channel assignments sensing time that can maximize the objective function. The disclosed details enable various refinements and modifications according to system design and tradeoff considerations.

24 Claims, 19 Drawing Sheets

(56) References Cited

OTHER PUBLICATIONS

K. Liu, Q. Zhao and B. Krishnamachari, "Dynamic Multichannel Access With Imperfect Channel State Detection," IEEE Trans. Signal Process., vol. 58, No. 5, pp. 2795-2808, Apr. 2010.

R. Smallwood and E. Sondik, "The optimal control of partially observable Markov processes over a finite horizon," Operations Research, pp. 1071-1088, 1971.

A.T. Hoang, Y.C. Liang, D.T.C Wong, Y. Zeng and R. Zhang, "Opportunistic Spectrum Access for Energy-constrained Cognitive Radios", IEEE Trans. Wireless Commun., vol. 8, No. 3, pp. 1206-1211, Mar. 2009.

A.Y. Ng, D. Harada and S. Russell, "Policy Invariance Under Reward Transformations: Theory and Application to Reward Shaping," in Proc. of The Sixteenth International Conference on Machine Learning, Jun. 1999.

Y. Chen, Q. Zhao, A. Swami, "Joint design and separation principle for opportunistic spectrum access in the presence of sensing errors," IEEE Trans. Inf. Theory, vol. 54, No. 5, pp. 2053-2071, 2008.

S.H. Ahmad, M. Liu, T. Javidi, Q. Zhao and B. Krishnamachari, "Optimality of Myopic Sensing in Multi-Channel Opportunistic Access," IEEE Trans. Information Theory, vol. 55, No. 9, pp. 4040-4050, 2009.

Y.J. Choi, Y. Xin and S. Rangarajan, "Overhead-Throughput Tradeoff in Cooperative Cognitive Radio Networks," in Proc. of IEEE WCNC, pp. 1-6, Apr. 2009.

E.C.Y. Peh, Y.C. Liang, Y.L. Guan and Y. Zeng, "Optimization of Cooperative Sensing in Cognitive Radio Networks: A Sensing-Throughput Tradeoff View," IEEE Trans. Vehicular Technology, vol. 58, No. 9, pp. 5294-5299, Nov. 2009.

R. Fan and H. Jiang, "Optimal Multi-Channel Cooperative Sensing in Cognitive Radio Networks," IEEE Trans. Wireless Commun., vol. 9, No. 3, pp. 1128-1138, Mar. 2010.

C. Song and Q. Zhang, "Cooperative Spectrum Sensing with Multi-Channel Coordination in Cognitive Radio Networks," in Proc. of IEEE ICC 2010, pp. 1-5, Jul. 2010.

Y. Wu and D.H.K. Tsang, "Distributed Power Allocation Algorithm for Spectrum Sharing Cognitive Radio Networks with QoS Guarantee," in Proc. of IEEE INFOCOM 2009, pp. 981-989, Jun. 2009.

T. Zhang and D.H.K. Tsang, "Optimal Cooperative Sensing Scheduling for Energy-Efficient Cognitive Radio Networks", Technical Report, Aug. 2010, http://eez058.ece.ust.hk/publication/OptScheduling.pdf.

* cited by examiner

COOPERATIVE SENSING SCHEDULING FOR ENERGY-EFFICIENT COGNITIVE RADIO NETWORKS

CROSS-REFERENCE TO RELATED APPLICATIONS

This application claims priority to U.S. Provisional Patent Application No. 61/438,625, entitled OPTIMAL COOPERATIVE SENSING SCHEDULING FOR ENERGY-EFFICIENT COGNITIVE RADIO NETWORKS, and filed on Feb. 1, 2011, the entirety of which is incorporated herein by reference.

FIELD OF THE INVENTION

The disclosed subject matter relates generally to wireless communications and, more particularly, to cooperative sensing scheduling that facilitates energy-efficient cognitive radio networks.

BACKGROUND OF THE INVENTION

In recent years, dramatic growth in various wired and wireless communication applications has led to attendant increases in energy consumption. Thus, it is not surprising that communications developers investigate radio and networking solutions, which are energy-efficient and resource-efficient. One emerging wireless technology, Cognitive Radio (CR), can facilitate improved spectrum usage and efficiency.

For example, by intelligently monitoring the spectrum, Secondary Users (SUs) can opportunistically access the idle spectrum originally assigned to Primary Users (PUs). On the other hand, such new functionalities and additional tasks (e.g., spectrum sensing) of CR enabling devices can require an amount of energy to provide such benefits. Nevertheless, with the associated agility and intelligence, CR technology can create new possibilities and methods to realize are energy-efficient communications and energy-efficient Cognitive Radio Networks (CRNs).

Thus, improvements in the designs of protocols for opportunistic spectrum access can be expected to provide further opportunities for improvements in energy-efficiency. For instance, a separation principle for a joint design problem of spectrum sensor operating points, sensing channel selection, and access policy utilized has been studied, and a simple but robust round-robin myopic channel selection policy held for a general number of positive correlated channels has been offered, while another approach extended techniques to the imperfect sensing case.

However, prior approaches of cooperative sensing and various conventional schemes to fuse sensing information from SUTs in the framework of a Partially Observable Markov Decision Process (POMDP) focused on improving sensing performance, such as sensing performance on a single channel, while neglecting the problem of how to assign SUTs to sense multiple channels, e.g., the Cooperative Sensing Scheduling (CSS) problem. As examples, the impact of the cooperative sensing overhead on the system throughput has been studied with the consideration of the number of reporting packets, and the tradeoff of finding the optimal sensing time and the parameter for the result fusion in order to maximize SUTs' throughput was characterized. Further works have extended the analysis to the case of multiple channels using a soft decision fusion rule.

Thus, the determination of how to assign SUTs to sense multiple channels, e.g., the CSS problem, remains largely unexplored. For example, conventional approaches are commonly formulated as a static optimization problem, rather than considering the CSS problem under varying spectrum environments with uncertainty (e.g., rather than being analyzed as a dynamic CSS problem), which can result in a sequential decision problem as described elsewhere. For instance, the CSS problem can be considered to be a non-deterministic polynomial-time hard optimization problem (e.g., an NP-hard problem).

However, conventional approaches to the problem apply numerical methods to obtain a CSS solution, which are applied to impractical or theoretical cases (e.g., where only the probability of detection is considered in the numerical solution, etc.), using certain assumptions or methods (e.g., a soft result fusion method, etc.) that can result in additional computational complexity and overhead, and without a direct focus on an energy-efficiency objective in the optimization problem. In addition, some conventional approaches that treat the CSS problem as a static optimization problem can impose strictures on the solution (e.g., fixed number of channels that can be sensed in each slot, fixed sensing duration in each slot, etc.).

The above-described deficiencies are merely intended to provide an overview of some of the problems encountered in CR design, and are not intended to be exhaustive. Other problems with conventional systems and corresponding benefits of the various non-limiting embodiments described herein may become further apparent upon review of the following description.

SUMMARY OF THE INVENTION

In consideration of the above-described deficiencies of the state of the art, the disclosed subject matter provides scheduling apparatuses, related systems, and methods associated with optimal Cooperative Sensing Scheduling (CSS) and parameter designs that facilitate achieving energy efficiency in CRNs.

According to non-limiting aspects, a network entity, such as a base station (BS), radio network controller, or the like, can determine how many secondary user terminals (SUTs) can be assigned to sense channels in order to maximize an objective function related to energy efficiency, assign a set of SUTs to measure a subset of wireless channels in a target frequency, and/or tune a punishment parameter to achieve better energy efficiency in a CRN, and so on, as further described herein.

In additional aspects of the disclosed subject matter, CSS can be performed according to a determined sensing time or duration that can facilitate maximizing the energy efficiency objective. According to various non-limiting aspects, CSS can be generally described as a process where for a slot, a BS can determine how to assign a number of SUTs to sense a channel, how long a sensing duration is to be, and/or whether to allow the SUTs to access primary channels based on the sensing outcomes, and/or as further described herein, on constraints and/or objectives, rewards, policies, and so on related to energy efficiency. For instance, in an additional aspect of the disclosed subject matter, CSS can incorporate objective or reward functions or policies (e.g., for identifying a desired wireless condition, etc.).

For example, scheduling algorithms can select a sensing assignment in a manner that maximizes a reward, to increase a likelihood of discovering the desired wireless condition, as a non-limiting example, or minimizes a negative reward (e.g., a punishment), such as a punishment parameter related to energy efficiency. According to the foregoing aspects, various non-limiting implementations can achieve an optimal performance for cooperative sensing as described herein. As a non-limiting example, a punishment parameter can be determined for unsuccessful transmissions to help the CRN create fewer collisions to the PUs to achieve higher energy efficiency, for instance, by saving power that would otherwise be used for retransmission.

Thus, according to various non-limiting embodiments, the disclosed subject matter provides wireless communications methods that can include assigning SUTs to measure or sense wireless channels based on states of the wireless channels and/or an energy-efficiency function, reward, policy, or objective for the SUTs. According to further non-limiting embodiments of the disclosed subject matter, systems and apparatuses are provided that can be adapted to select SUTs to perform idle or busy state measurements of wireless channels, based on a function, reward, policy, or objective associated with energy efficiency of the SUTs, as well as other constraints as described herein. As a result, the provided techniques and architectures can advantageously reduce energy consumption associated with, as an example channel sensing, transmission, collisions, and so on, which can result in significant power reduction as demonstrated herein.

Additionally, various modifications are provided, which achieve a wide range of performance and computational overhead trade-offs according to system design considerations.

A simplified summary is provided herein to help enable a basic or general understanding of various aspects of exemplary, non-limiting embodiments that follow in the more detailed description and the accompanying drawings. This summary is not intended, however, as an extensive or exhaustive overview. The sole purpose of this summary is to present some concepts related to the various exemplary non-limiting embodiments of the disclosed subject matter in a simplified form as a prelude to the more detailed description that follows.

BRIEF DESCRIPTION OF THE DRAWINGS

The disclosed techniques and related systems and methods are further described with reference to the accompanying drawings in which.

DETAILED DESCRIPTION OF ILLUSTRATIVE EMBODIMENTS

Overview

Figure 1:
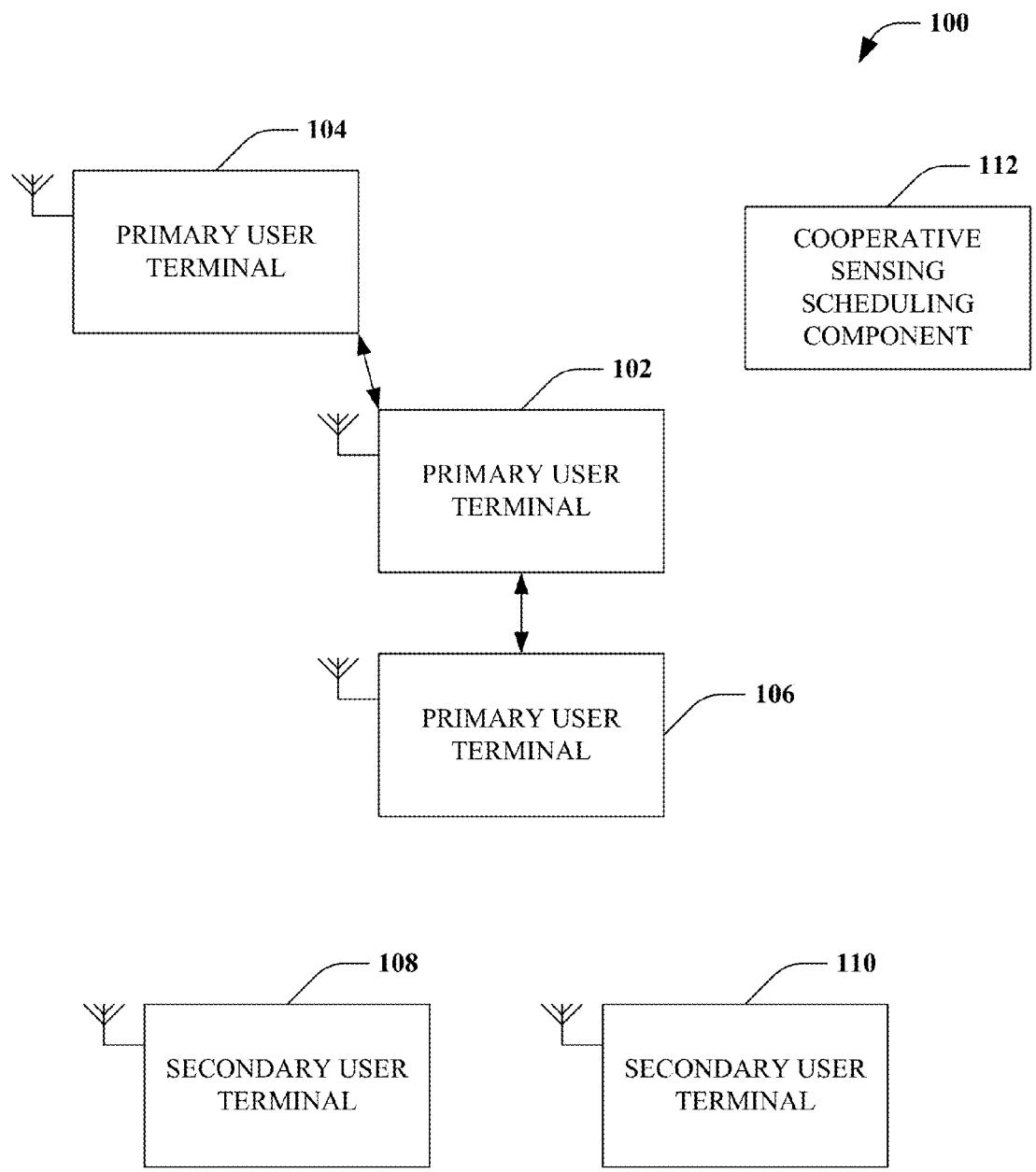
FIG. 1 illustrates a non-limiting block diagram of an exemplary wireless communication environment suitable for incorporation of aspects the disclosed subject matter.

Simplified overviews are provided in the present section to help enable a basic or general understanding of various aspects of exemplary, non-limiting embodiments that follow in the more detailed description and the accompanying drawings. This overview section is not intended, however, to be considered extensive or exhaustive. Instead, the sole purpose of the following embodiment overviews is to present some concepts related to some exemplary non-limiting embodiments of the disclosed subject matter in a simplified form as a prelude to the more detailed description of these and various other embodiments of the disclosed subject matter that follow.

It is understood that various modifications may be made by one skilled in the relevant art without departing from the scope of the disclosed subject matter. Accordingly, it is the intent to include within the scope of the disclosed subject matter those modifications, substitutions, and variations as may come to those skilled in the art based on the teachings herein. Additionally, while aspects of the present disclosure are generally described in relation to cognitive radio, wireless communication, and so on, it is to be appreciated that the subject matter described herein can be utilized in substantially any environment for detecting utilized or unutilized frequency bands, while optimizing communications therein to achieve energy-efficient wireless communications.

As used in this application, the terms "component," "module," "system", or the like can refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

As described above, by intelligently monitoring the spectrum in CRNs, Secondary Users (SUs) can opportunistically access the idle spectrum originally assigned to Primary Users (PUs). Thus, with the associated agility and intelligence of the CRNs, CR technology can create new possibilities and methods to realize energy-efficient communications and energy-efficient CRNs. Accordingly, improvements in the designs of protocols for opportunistic spectrum access can provide opportunities for improvements in energy-efficiency. However, as described above, prior approaches of cooperative sensing and various conventional schemes to fuse sensing information from SUTs in the framework of a Partially Observable Markov Decision Process (POMDP) focused on improving sensing performance, while neglecting the problem of how to assign SUTs to sense multiple channels, e.g., the Cooperative Sensing Scheduling (CSS) problem.

Thus, conventional solutions for the determination of how to assign SUTs to sense multiple channels, e.g., the CSS problem, have formulated the inquiry as a static optimization problem, rather than considering the CSS problem under varying spectrum environments with uncertainty (e.g., rather than as a dynamic CSS problem), which can result in a sequential decision problem as described. For instance, the CSS problem can be considered to be a non-deterministic polynomial-time hard optimization problem (e.g., an NP-hard problem). However, conventional approaches to the problem apply numerical methods to obtain a CSS solution, which are applied to impractical or theoretical cases (e.g., where only the probability of detection is considered in the numerical solution, etc.), using certain assumptions or methods (e.g., a soft result fusion method, etc.) that can result in additional computational complexity and overhead, and without a direct focus on an energy-efficiency objective in the optimization problem. In addition, some conventional approaches that treat the CSS problem as a static optimization problem can impose strictures on the solution (e.g., fixed number of channels that can be sensed in each slot, fixed sensing duration in each slot, etc.).

Thus, various aspects of the disclosed subject matter are directed to the problem of spectrum scarcity and elevated energy consumption in wireless communications, to the end of facilitating, for example, the design of energy-efficient CRNs. According to various aspects, the disclosed embodiments can provide solutions to the problem of optimal CSS and parameter design to facilitate improvements in energy efficiency in CRNs using a POMDP framework.

In particular non-limiting aspects, exemplary implementations can address the CSS problem for CRNs with M SUTs and N primary channels to determine how many SUTs can be assigned to sense each channel in order to maximize an objective function related to energy efficiency. In a non-limiting example, by assigning more SUTs to sense one channel, higher sensing accuracy can be gained. However, in a further non-limiting example, spreading out the SUTs to sense more channels can result in better exploitation of spectrum opportunities.

Thus, in various non-limiting implementations, the CSS problem can be formulated as a combinatorial optimization problem, for which, while conventionally approached as a hard problem solved by numerical methods with attendant high computation complexity, the disclosed subject matter's detailed analyses and analytical results provide useful insights into the optimization of CSS and parameter design to facilitate improvements in energy efficiency in CRNs. As an aid to further understanding the disclosed subject matter, the optimality of the myopic CSS is proved herein for the non-limiting case of two channels, while the general case is also discussed.

In addition, study of the disclosed subject matter can also reveal that a tradeoff between sensing and transmission durations can be determined, while structure of the optimal sensing time (e.g., optimal sensing time that maximizes the energy efficiency objective, etc.) can be analyzed, a condition for the optimality of the myopic sensing time can be obtained, and the performance upper bound of the myopic policy can be derived, according to disclosed non-limiting aspects. Moreover, in a further non-limiting aspect of the disclosed subject matter, exemplary embodiments can employ a punishment parameter that can be tuned to facilitate better energy efficiency in CRNs, which can be shown based on the numerical results.

FIG. 1 illustrates a non-limiting block diagram of an exemplary wireless communication environment 100 suitable for incorporation of aspects the disclosed subject matter. Wireless communication environment 100 can include a plurality of communicating primary user equipment (e.g., including primary user terminals (PUTs) 102-106, etc.). For example, PUTs 102-106 can utilize a portion of a frequency band to communicate. The portion of the frequency band can be defined herein as substantially any number of frequency band resources over time and/or divisions thereof, such as channels, resource blocks, resources, orthogonal frequency division multiplexing (OFDM) symbols, tiles, tones, subcarriers, and/or the like. In addition, the terms are used interchangeably herein such that, for example, channels can refer to substantially any defined collection of frequency band portions over a collection of time periods. Such collections or portions can be defined in a communication specification for PUTs and/or SUTs, and/or the like. In one example, PUTs 102-106 can be configured in a broadcast mode, request/receive, peer-to-peer, and/or the like. Thus, for instance, PUT 102 can be an access point or broadcast tower, etc., and PUT 104 and 106 can be receivers or transmitters, etc., that can receive data from PUT 102 and/or transmit data thereto. In addition, though not shown, PUT 104 can additionally or alternatively communicate with PUT 106 and/or vice versa.

The portion of the frequency band utilized for communication can be reserved for the PUTs 102-106. In one example, the spectrum can be reserved by a government agency (such as the Federal Communications Commission (FCC), etc.), standards organization, and/or the like. The frequency band, however, can be utilized by other secondary devices (e.g., including secondary user terminals (SUTs), etc.) 108-110 as well, in one example, such as a CR, devices communicating therewith, and/or other devices. This can be mandated by the same government agency, standards organization, etc., in one example. Secondary devices, however, can determine whether a portion of the frequency band is currently utilized by a PUT to avoid interfering with the primary reserved use and/or avoid receiving interference from the PUTs as part of the mandate.

Thus, as described above, in CR there can typically be two types of user equipment, primary user equipment (e.g., including primary user terminals or PUTs, etc.) and secondary user equipment such as SUTs. For instance, primary user equipment is generally understood to be some kind of wireless interface device (e.g., wireless transmitter, wireless receiver, wireless transceiver) that can be licensed for a particular frequency spectrum, or that can be employed as a service allocated to the particular frequency spectrum. A SUT, on the other hand, is typically not licensed on the particular frequency, or can utilize a different service than what the frequency spectrum is allocated for (e.g., primarily allocated for). As an example, a cellular phone can be a SUT on a frequency spectrum primarily allocated for broadcast television, as the cellular phone utilizes a different service (e.g., cellular wireless communications as opposed to reception of broadcast television) than for what this frequency spectrum is allocated (e.g., primarily allocated). In yet another example, the cellular phone can be a secondary user on a frequency spectrum allocated for 802.11 wireless communications, as the cellular phone is not licensed to utilize the frequency spectrum allocated for 802.11 wireless communications, and so on.

For this reason, in CR and other cases where determining utilized and unutilized frequency bands is beneficial, a cooperative sensing scheduling component (CSSC) 112 can be employed to detect the presence of communication over a frequency band and/or identify whether the communication is by PUTs, SUTs, etc., for example. As described further below, CSSC 112 can perform various operations in relation to various PUTs 102-106. CSSC 112 can further determine whether a related communication channel is occupied by a PUT, SUT, or is vacant.

Thus, CR can employ a channel sensing mechanism to avoid causing interference to PUTs on frequencies employed by the primary user. By sensing a channel, an estimate of whether transmissions are occurring on that channel at a given point in time can be made. Channels estimated to be idle, e.g., having no transmissions or expected to have no transmissions during a relevant time, can be employed for traffic transmissions of SUTs. Channels estimated to be busy can be avoided by SUTs.

One problem with channel sensing mechanisms can occur when sensing estimates are incorrect. This can happen, for instance, when a SUT fails to sense existing transmissions on a frequency and the frequency is improperly identified as idle, when it is in fact busy. Such conditions can be referred to as a misdetection. Another incorrect sensing estimate can occur when the SUT senses a transmission on the frequency, when no such transmission in fact exists. Such occurrences can be referred to as a false alarm.

To improve sensing accuracy, multiple SUTs 108-110 can be employed to sense a particular frequency, in a cooperative sensing arrangement, as further described herein. Although cooperative sensing can improve spectrum sensing accuracy, it can also have some drawbacks, for example, such as when a number of secondary users available for the cooperative sensing is limited, when sensing equipment employed by the SUTs is limited to sequential (e.g., narrowband) sensing, overhead employed in cooperative sensing algorithms, and so on, etc. In some instances, several SUTs, e.g., SUTs 108-11, can be scheduled to sense several channels sequentially, decreasing an amount of time available for those SUTs to transmit or receive traffic in a given wireless time frame. Thus, it can be understood that a tradeoff can exist between cooperative sensing time and traffic transmissions (whether uplink or downlink) in a relevant wireless time frame.

To complicate the foregoing problem, idle spectrum available for SUTs to access is time varying, and information about the changing idle spectrum can only be partially observed by SUTs. This is due to existence of imperfect spectrum sensing equipment and sensing scheduling policy. Moreover, the existence of unsuccessful transmissions (e.g., by collisions, imperfect sensing, etc.) can result in excessive power usage due to the power required to retransmit unsuccessful transmissions.

To address these and other problems, various aspects of the disclosed subject matter can provide dynamic scheduling for cooperative sensing that can be configured for a time-varying spectrum environment, and that can facilitate reducing collisions with the PUTs, achieve higher energy efficiency by saving power for retransmission, and so on, as further described herein. According to particular aspects, the dynamic scheduling can be derived from a partially observable Markov decision process (POMDP) employed to improve or optimize energy efficiency in a CRN. Thus, dynamic scheduling can be employed to select a subset of the SUTs to measure a subset of wireless channels on a target frequency. In addition, various objective or reward functions or policies can be implemented in a tradeoff between computational complexity and estimation accuracy.

Figure 2:
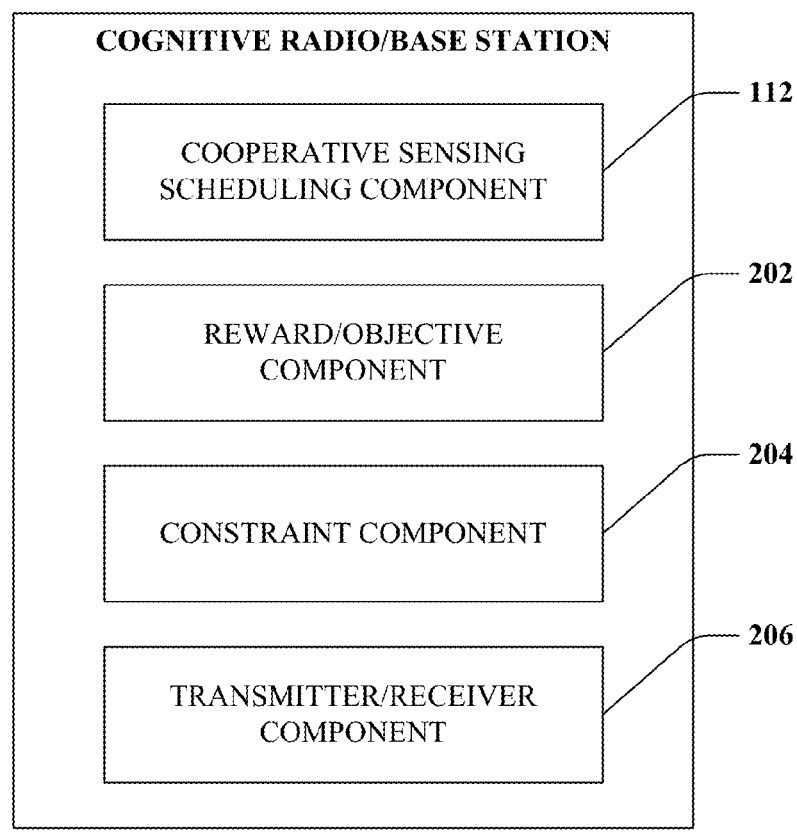
FIG. 2 depicts a non-limiting block diagram of an exemplary cognitive radio or base station that can employ cooperative spectrum sensing as described herein.

FIG. 2 depicts a non-limiting block diagram of an exemplary cognitive radio and/or a CR BS 200 that can employ cooperative spectrum sensing as described herein. CR BS 200, or simply BS 200, as described, can be employed in a variety of environments where it can communicate with various devices in frequency bands reserved for disparate devices communicating using disparate technologies, such as PUTs. In this regard, CR 200 can communicate in portions reserved for but not utilized by surrounding PUTs to provide efficient use of spectrum resources. To this end, CR 200 can comprise a CSSC 112 that can analyze frequency bands to determine, estimate, and/or identify states of channels of the spectrums and assign SUTs, e.g., SUTs 108-110, to sense the channels as further described herein, for example, regarding FIGS. 3-8, etc.

In addition, BS 200 can further comprise a reward/objective component 202 adapted to determine an energy-efficiency function, reward, policy or objective for SUTs, e.g., SUTs 108-110, in conjunction with CSSC 112, for instance, as further described below regarding FIGS. 5-8, 12, etc. In further non-limiting implementations, BS 200 can include a constraint component 204 adapted to determine and/or apply various constraints related to energy consumption in associated wireless systems related to sensing, transmission, and/or collisions, and so on, etc., as further described herein regarding FIG. 8, for example. In addition, BS 200 can also include transmitter/receiver component 206 that facilitates communicating with one or more disparate CRs or other wireless devices, as further described herein, such as PUTs, SUTs, etc. Further discussion of the advantages and flexibility provided by the various non-limiting embodiments can be appreciated by review of the following description.

Figure 3:
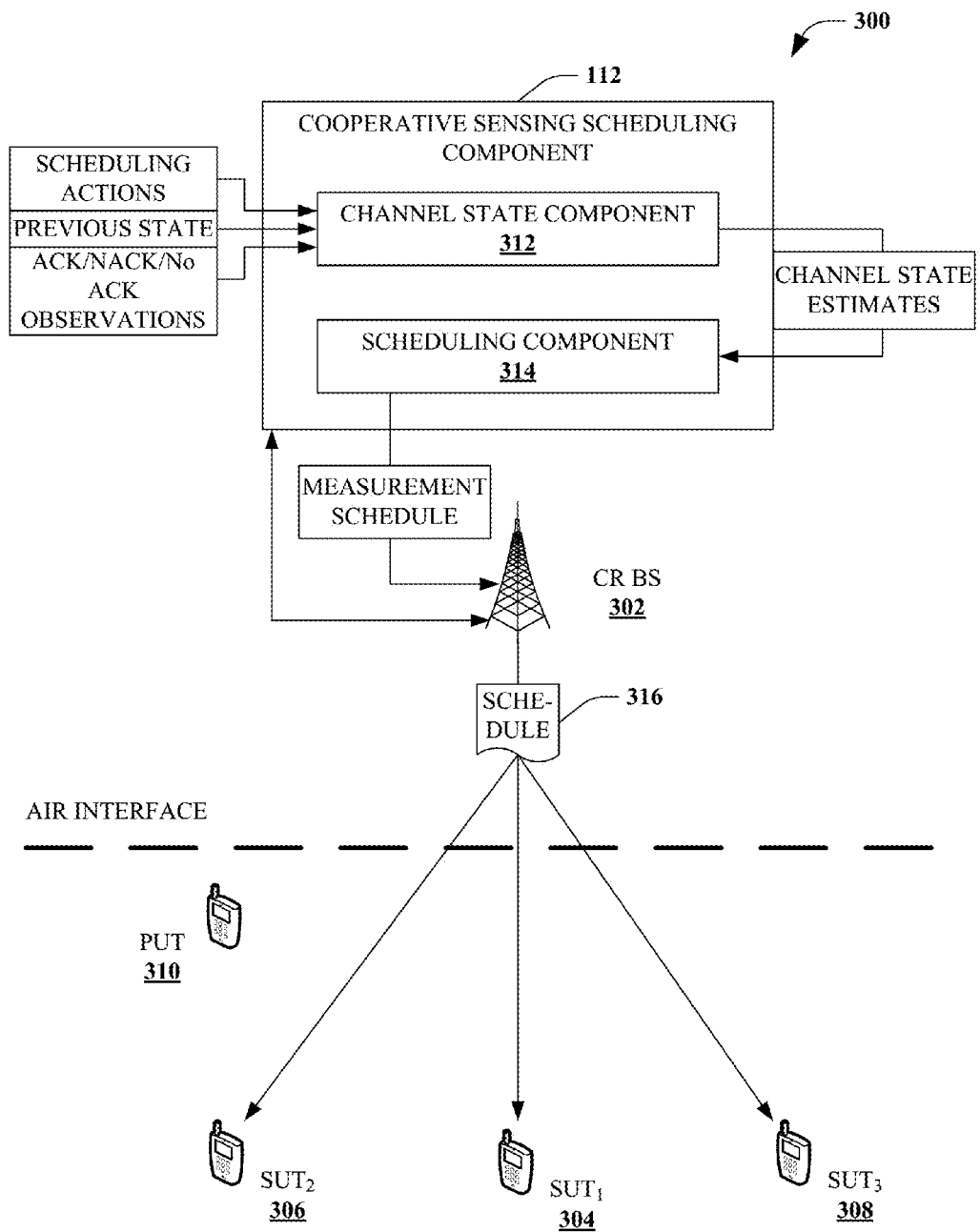
FIG. 3 illustrates a block diagram of an example wireless communication environment suitable for cognitive radio according to aspects of the disclosed subject matter.

For example, FIG. 3 illustrates a block diagram of an example wireless communication environment 300 suitable for cognitive radio according to aspects of the disclosed subject matter. Wireless communication environment 300 can comprise a CRN including a CR base station 302, serving a plurality of SUTs associated with SUTs, including $SUT_1$ 304, $SUT_2$ 306, $SUT_3$ 308, etc. In addition, one or more primary user terminals, e.g., such as PUT 310, can exist within a signal range of CR base station 302. PUT 310 can include a cellular telephone that operates in conjunction with a non-cognitive cellular communication system, or another suitable wireless communication device, such as an 802.11(a, b, g, n, etc.) wireless device, an electronic paging service, an amateur radio transmitter, a broadcast television transmitter, an AM or FM radio transmitter, and so forth. Based on cognitive radio principles, SUTs 304-308 can be configured to sense various frequency spectra within a geographic region served by CR base station 302, including those frequency spectra on which primary user equipment 310 is licensed, or is utilizing an allocated service. In addition, exemplary wireless communication environment 300 can further comprise a cooperative sensing scheduling component (CSSC) 112, which can further comprise, be communicatively coupled with, or otherwise associated with a channel state component 312 and/or a scheduling component 314 that can facilitate determining a schedule 316 by CSS as further described herein.

For instance, considering a centralized CRN as depicted in FIG. 3 with multiple SUTs 304-308 and a BS 302, which BS can facilitate scheduling and coordination among the SUTs, CSS can be employed in various non-limiting implementations to improve the sensing accuracy among the SUTs, to better protect the PUTs, and to capture the spectrum opportunities in a slotted primary system as described herein. As a further example, in various non-limiting implementations, for each slot, the BS can determine how many SUs to sense each channel, how long a sensing duration should be, and/or whether to allow the SUTs to access the primary channels based on the sensing outcomes, for example, as described below regarding FIG. 5. According to an aspect of the disclosed subject matter, the sequential decision-making problem can be studied in the framework of a POMDP, as described above. In further non-limiting aspects, the disclosed subject matter can advantageously improve energy efficiency of CRNs and/or associated components or subcomponents, by employing a related parameter in the framework.

The following section provides additional information regarding system design tradeoffs and considerations as an aid to further understand the development of optimized cooperative sensing scheduling for cognitive radio networks according to aspects of the disclosed subject matter. For example, regarding CSS, at the beginning of each slot, a BS can decide how many SUTs can be assigned to sense each channel in order to maximize an immediate reward (e.g., an immediate reward related to energy efficiency). The CSS problem, being a combinatorial optimization problem, can be solved by numerical methods with high computational complexity as described. But for various non-limiting implementations, solutions can be provided by an analytical framework as describe herein. For instance, employing Discrete Convex Analysis theory, an optimal solution can be obtained analytically, which can reveal that, for a given number of channels that need to be sensed, the best combination can be shown to be to assign the SUTs as equally as possible for each channel. In addition, the necessary and sufficient condition can be shown for the case that assigning all the SUTs to cooperatively sense one channel can be the optimal solution of the CSS problem. Various non-limiting embodiments, by employing the disclosed framework or techniques, can obtain an optimal solution for the general case (e.g., any number of SUTs and channels) as well.

As a further example, in a non-limiting implementation of an exemplary case of two channels and fixed sensing durations, according to the disclosed subject matter, optimal CSS can be shown to correspond to or be associated with optimality of the myopic CSS. For instance, while result can be useful for reducing the complexity of obtaining the optimal CSS, in various non-limiting implementations (e.g., because the myopic CSS can be analytically obtained as described herein), more generally, further non-limiting implementations can employ recursive computation to obtain optimal CSS. Further, numerical results support the notion that the optimality as described herein also holds for general number of SUTs and channels.

In still further non-limiting implementations, exemplary BSs can determine one or more sensing duration(s), for example, after performing CSS. For instance, due in part to the nature of the problem of obtaining CSS being a sequential decision problem, exemplary BSs can determine one or more sensing duration(s), or structure thereof. As above, myopic sensing duration can conventionally be found by numerical methods. However, such techniques may not always preserve optimality. Thus, from analysis of the structure of the optimal sensing duration, as described herein, it can be seen that the optimal sensing duration can be larger than or equal to the myopic sensing duration, in agreement with conventional models. As a result, various non-limiting implementations can impose a condition on the optimality of the myopic sensing duration and in the calculation or determination thereof.

Moreover, in yet other non-limiting embodiments, the disclosed subject matter can employ a punishment parameter that can facilitate improving energy efficiency in the process of determining optimal CSS. As a non-limiting example, a punishment parameter that punishes or penalizes unsuccessful transmissions can facilitate a CRN to create fewer collisions with the PUs, which in turn can facilitate achieving higher energy efficiency (e.g., facilitate achieving higher energy efficiency by saving the power for retransmission, etc.). Thus, in yet other non-limiting embodiments, a calculation or determination of myopic performance can employ an upper bound, for example, by employing conventional methods. As a further advantage, the disclosed subject matter facilitates improvements in energy efficiency of the CRN (e.g., by tuning the punishment parameter, etc.) as demonstrated by numerical results.

As a result, in various non-limiting implementations, the disclosed subject matter can provide solutions to problems related to energy-efficient CRN design, according to framework of POMDP, as described herein. For instance, in the NP-hard combinatorial optimization problem or determining myopic CSS, the disclosed subject matter provides an analytical framework that facilitates obtaining an analytical solution, for which optimality of the myopic CSS can be proven under a case of two channels and a fixed sensing duration. In addition, structure of the optimal sensing duration is described and a condition for the optimality of the myopic sensing duration is provided. Thus, an upper bound of myopic policy performance can be employed, according to various aspects of non-limiting implementations, for example, as an aid in selecting a punishment parameter, such that energy efficiency can be improved compared to conventional designs. Moreover, in further non-limiting implementations, various aspects of the disclosed framework can be employed in addressing the CSS problem while advantageously facilitating improvements in CRN energy-efficiency.

In addition, while particular non-limiting implementations of the disclosed subject matter exemplify a case of assigning all, or substantially all, SUTs to sense one channel, for the purposes of illustration, it can be understood that the disclosed subject matter is not so limited. For example, while the determination of optimal CSS, as M increases and condition (C0) (e.g., as presumed in Theorem 1 below) may not necessarily apply, this does not limit application of the disclosed framework to a more general case, e.g., when M is large and/or (C0) is violated, such as described herein. In other non-limiting implementations, the disclosed framework can employ objective or reward functions or policies that, in lieu of a linear transformation, can be employed to facilitate higher energy efficiency in CRNs.

As described above, by intelligently monitoring the spectrum in CRNs, SUTs can opportunistically access the idle spectrum primarily allocated to PUs, because of the associated agility and intelligence of the CRNs. Thus, various embodiments can employ CR techniques to create new possibilities and methods for realizing energy-efficient communications and energy-efficient CRNs. Accordingly, improvements such as those described herein for the opportunistic access of spectra can be expected to provide further opportunities for improvements in energy-efficiency. For example, various non-limiting embodiments can analyze spectrum-sensing performance based in part on a probability of detection, a probability of false alarm, and so on. Further non-limiting implementations can employ a hard result fusion method (e.g., an employing an "OR" rule in result fusion, etc.), which can advantageously involve less computational overhead, while considering the CSS problem as a dynamic CSS problem, where different number of channels may be sensed in each slot due to the CSS result. In addition, various embodiments of the disclosed subject matter can employ an energy efficiency-oriented objective in POMDP, variable sensing duration for each slot, different number of channels sensed in each slot, various objective or reward functions or policies, etc., in the context of multiple primary channels.

In consideration of the above-described limitations, in accordance with exemplary non-limiting embodiments, the disclosed subject matter provides wireless communications methods that can include assigning secondary user terminals (SUTs) to measure or sense wireless channels based on the states of the wireless channels and an energy-efficiency function, reward, policy, or objective for the SUTs.

According to further non-limiting embodiments of the disclosed subject matter, systems and apparatuses are provided that can be adapted to select SUTs to perform idle or busy state measurements of wireless channels, based on a function, reward, policy, or objective associated with energy efficiency of the SUTs, as well as other constraints as described herein. As a result, the provided techniques and architectures can advantageously reduce energy consumption associated with, as an example, channel sensing, transmission, collisions, and so on, which can result in significant power reduction as demonstrated herein.

System Model

Figure 4:
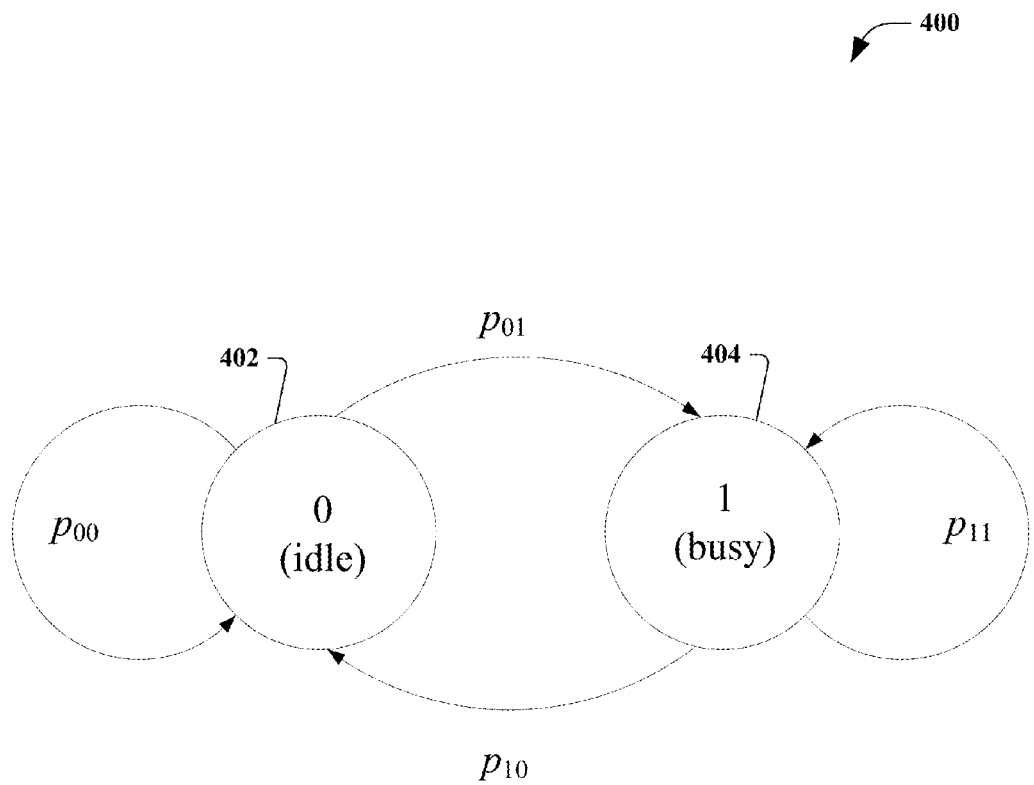
FIG. 4 depicts a non-limiting state diagram for exemplary wireless communication environments that illustrates aspects of a cognitive radio network according to the disclosed subject matter.

The following discussion provides additional information regarding CRN systems to facilitate understanding the techniques described herein. To that end, FIG. 4 depicts a non-limiting state diagram 400 for exemplary wireless communication environments that illustrates aspects of a cognitive radio network according to the disclosed subject matter. According to various non-limiting implementations, CR base station 302 and SUTs 304-308 can operate in a time-slotted manner having a fixed wireless time slot length of L (which also can be referred to as a wireless time frame, or other suitable terminology). Respective wireless channels of the set of wireless channels can have two discrete states, an idle state (in which no transmissions related to primary user equipment 106 occur or are not expected to occur) and a busy state (in which transmissions related to primary user equipment 106 can occur or are expected to occur). In one aspect of the disclosed subject matter, the states of respective channels can be modeled with a two-state discrete time Markov chain (DTMC). For instance, two states can be represented as state 0(idle or state 402) and state 1(busy or state 404) in this model, and there can be four transition probabilities (e.g., $p_{00}$, $p_{01}$, $p_{10}$, and $p_{11}$) for channels from one wireless time slot to another. Specifically, a wireless channel can be in state 0 and transition to state 1, be in state 0 and remain in state 0, be in state 1 and transition to state 0, or be in state 1 and remain in state 1, from one wireless time slot to the other.

Figure 5:
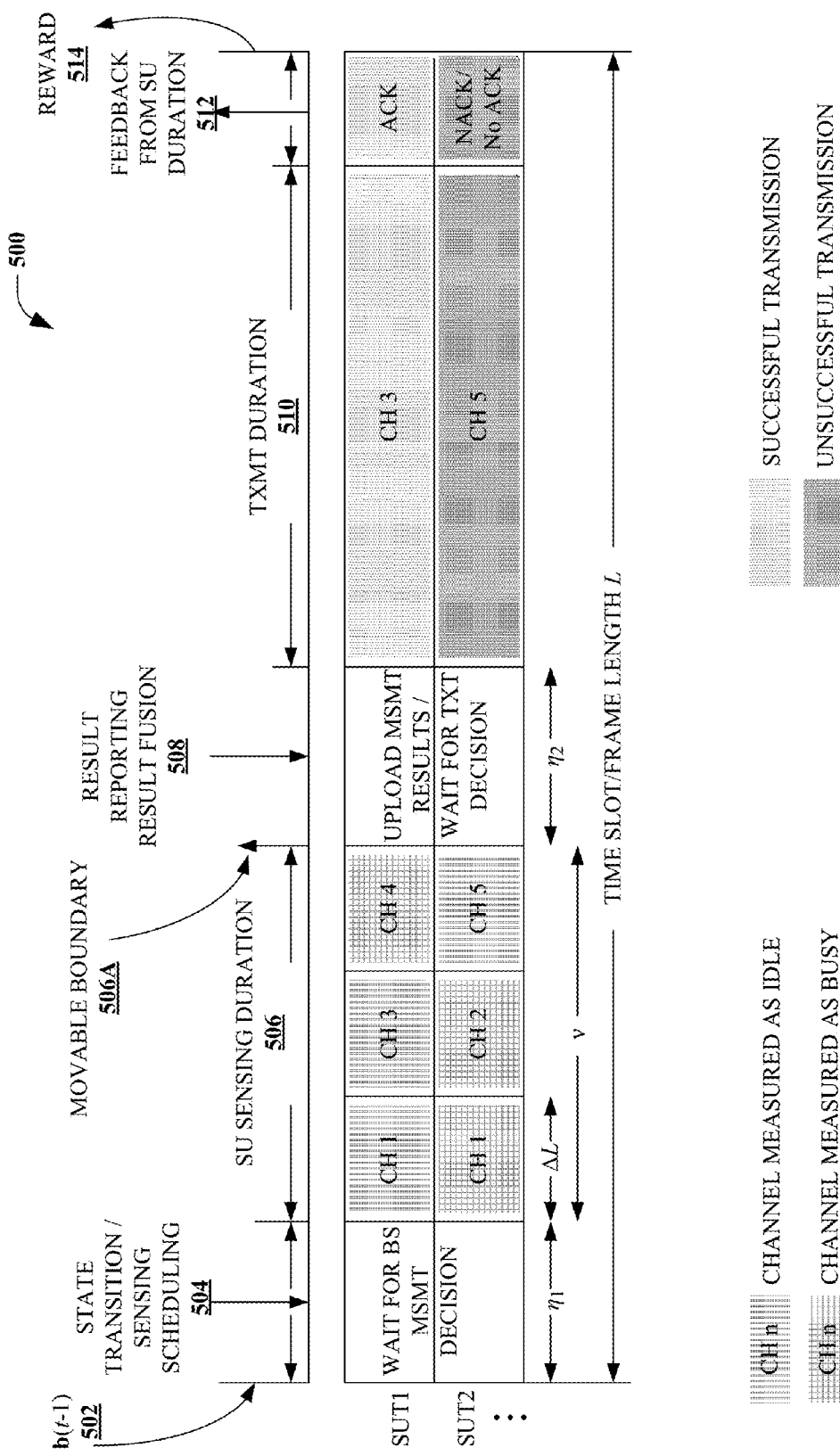
FIG. 5 depicts a non-limiting protocol diagram for exemplary wireless communication environments that illustrates aspects of a cognitive radio network according to the disclosed subject matter.

FIG. 5 depicts a non-limiting protocol diagram 500 for exemplary wireless communication environments that illustrates aspects of a cognitive radio network according to the disclosed subject matter. For example, FIG. 5 illustrates an example wireless time slot 500 that can be employed for CR communications in aspects of the disclosed subject matter. Wireless time slot 500 is a current or existing time slot at time t such that a previous time slot (not depicted) is t−1, and a subsequent time slot is t+1. Additionally, wireless time slot 500 can have an overall duration or time slot/frame length of L.

Respective blocks of wireless time slot 500 can specify actions taken by a set of SUTs, including $SUT_1$, $SUT_2$, etc., e.g., SUTs 304-306, and so on. At the beginning of time slot 500, wireless channels can have a state transition according to a DTMC model described supra, in reference to FIG. 4. A belief vector b(t−1) at 502 can be calculated for target wireless channels to model associated state transitions, and can be employed for assigning a subset of the SUTs to measure at least a subset of the wireless channels in a cooperative sensing arrangement. As depicted, calculation of belief vector b(t−1) can occur at 502 and state transition and/or sensing scheduling can occur at 504. During this period of state transition and/or sensing scheduling 504, which can have a duration of $\eta_1$, SUTs can wait for and receive respective scheduling assignments.

Once scheduling assignments are received, SUTs, e.g., SUTs 304-308, can begin sensing assigned wireless channels. In one aspect, different misdetection or false alarm probabilities can be assigned to different SUTs, or for different wireless channels, or combinations thereof. In other aspects, however, a common misdetection probability and/or a common false alarm probability can be assigned to all SUTs, or to all wireless channels, or a suitable combination thereof.

In at least one aspect of the disclosed subject matter, duration of a single measurement can be fixed at $\Delta L$, as depicted, or can be a decision variable defined as $\tau$. The aggregated duration can be ended as depicted as a movable boundary 506A, as befits the tradeoff between SU sensing duration 506 of length v and transmit duration 510, and which can depend on a number of channels being sensed, etc. In the example provided by wireless time slot 500, $SUT_1$ can sense wireless channel', wireless channel$_3$, and wireless channel$_4$. $SUT_2$ can also sense wireless channel', and then can sense wireless channel$_2$ and wireless channel$_5$. An aggregated duration of these measurements is indicated as SU sensing duration 506, where the sensing duration per channel can be fixed at $\Delta L$, or in a further non-limiting aspect, the sensing duration per channel can be defined as $\tau$ variable according to a POMDP policy as described herein. If CR base station decides that SUTs measure the channels for a longer aggregated sensing duration (e.g., to increase sensing accuracy for the channels), less time might be available for traffic transmissions, potentially lowering traffic throughput for the wireless time slot, as described above, which illustrates the tradeoff between cooperative sensing time and traffic transmission time.

As is depicted in FIG. 5, $SUT_1$ measures channel$_1$ to be idle, measures channel$_3$ to be idle, and measures channel$_4$ as busy. $SUT_2$ measures channel$_1$ and channel$_2$ both to be busy, and channel$_5$ as idle. After finishing the measurements at 506, SUTs, e.g., SUTs 304-308, can transmit measurement results to the CR base station, e.g., BS 302. Based on an "or" sensing rule, as a non-limiting example, the BS 302 can establish channel$_1$ as busy, since at least one of the SUTs measured channel$_1$ as busy. Likewise, channel$_2$ and channel$_4$ are established as busy, and channel$_3$ and channel$_5$ are established as idle.

According to one or more particular aspects of the disclosed subject matter, allocation of traffic transmissions can be handled as follows. If a channel measurement result indicates the channel is idle, then although there exists a probability of a misdetection on the channel, the CR base station can utilize this channel for assigning traffic transmissions. Based on these results, the CR base station, e.g., BS 302, can allocate channel$_3$ and channel$_5$ for traffic transmissions for SUT$_1$ and SUT$_2$, respectively. In general, the CR base station, e.g., BS 302, can allocate to any of the SUTs the channels that are measured to be idle, according to a further non-limiting aspect.

Sending or receiving traffic transmissions can occur during transmit duration 510. As is depicted in the non-limiting example of FIG. 5, SUT$_1$ can successfully transmit on channel$_3$, and can send an ACK during feedback from SU duration 512 to indicate the transmission was successful. On the other hand, SUT$_2$ experiences interference on channel$_5$, which turns out to be busy (e.g., such as for a collision with PUT 310) despite being sensed as idle (a misdetection) in SU sensing duration 506. Thus, SUT$_2$ can send a NACK during the feedback from SU duration 512. Alternatively, SUT$_2$ can simply refrain from sending an ACK if interference is experienced on channel$_5$. For instance, in an aspect, failure to receive an ACK within feedback duration 512 can be interpreted as the equivalent of receiving a NACK. This enables a NACK determination to be inferred even where channel$_5$ is in fact busy, and an actual NACK signal cannot be sent on channel$_5$. Based on the ACK/NACK feedback, CR base station, e.g., BS 302, can determine that channel$_3$ was indeed idle during wireless time slot t, whereas channel$_5$ was indeed busy during wireless time slot t.

According to various aspects, ACK/NACK feedback can be employed to build an observation vector as further described herein for wireless channels, based on deterministic results for channels which ACK/NACK feedback is obtained, and state probabilities for channels sensed as busy (and therefore no traffic transmissions and ACK/NACK feedback available) or channels that are not sensed. Once an observation vector is built, CR base station, e.g., BS 302, can update a belief vector that represents probability states for the wireless channels, where the belief vector can be generated on a prior state of the belief vector in time t−1, as well as the sensing actions in time t (e.g., SUT$_1$ having measured channels$_{1,3,4}$ and SUT$_2$ having measured channels$_{1,2,5}$), and the observation vector obtained in time t. Determination and use of observation vectors and belief vectors are discussed in more detail below.

For example, referring again to FIG. 3 it can be assumed that there exists N independent and stochastically identical Gilbert-Elliot channels owned by PUs, denoted by $\mathcal{N} = \{1, 2, \ldots, N\}$. Thus, an exemplary CRN can comprise M SUTs (e.g., SUTs 304, 306, etc.) and a BS (e.g., BS 302), where N≥M. According to particular aspects of the disclosed subject matter, SUTs 304-308 can employ a single radio interface, although it should be understood that the disclosed subject matter is not limited to this example implementation. For instance, it is noted generally that, the number of channels can be greater than that of the SUTs. However, aspects of the disclosed subject matter also holds for the case that N<M. Additionally, according to a further non-limiting aspect, the primary system, e.g., PUTs, can operate in a time slotted manner with a fixed slot duration L, where the occupancy state of each channel transits according to the two-state discrete-time Markov chain with transition probabilities $\{p_{ij}\}_{i,j=0,1}$ at the beginning of each slot where $p_{00} \geq p_{10}$, for example, as depicted in FIG. 4 (e.g., the channels are not negatively correlated). Alternatively, the case that $p_{00} < p_{10}$ can be similarly analyzed. In addition, it is noted that the system model is conventionally employed to abstract physical channels with memory, and the slotted system structure is shown to fit well in the application of CRNs.

Thus, respective wireless channels of the set of wireless channels can have two discrete states, an idle state 402 (in which no transmissions related to primary user equipment, PUT 310, occur or are not expected to occur) and a busy state 404 (in which transmissions related to primary user equipment, PUT 310, do occur or are expected to occur). Accordingly, an applicable system model can let $s_n(t) \in \{0(\text{idle}), 1(\text{busy})\}$ denote the occupancy state of channel n in time slot t. As a further non-limiting example, $s_n(t)=0$ can denote channel n is idle (available for traffic transmissions associated with SUTs 304, 306, etc.) whereas $s_n(t)=1$ can denote channel n is busy (unavailable for use by SUTs 304, 306, etc.) in time slot t. The system state in slot t can be denoted as $s(t) \triangleq [s_1(t), \ldots, s_N(t)]$. In another aspect of the disclosed subject matter, CR base station (e.g., BS 302) can calculate, or can obtain from another entity, measurements of long-term historical or statistical behavior of the respective wireless channels, which can be utilized to derive initial transition probability states of the wireless channels, for example.

CR base station (e.g., BS 302) can comprise, can be communicatively connected with, or can be otherwise associated with CSSC 112. For instance, CSSC 112 can be configured to schedule SUTs 304-308 to sense wireless channels, to facilitate estimation of whether those wireless channels are idle or busy. As a non-limiting example, where such measurements are correct, traffic transmissions can be scheduled on idle state channels without fear of interference with primary user equipment 310 employing those channels. However, because measurements of the wireless channels can result in misdetection or false alarms, lack of interference is not guaranteed, particularly when the idle/busy state of a wireless channel can change with time. To refine scheduling estimates over time, CSSC 112 can comprise a channel state component 312 that can be configured to estimate respective idle or busy states of wireless channels for a current wireless time slot. This estimation of current state can be based on prior state information, as well as scheduling actions, and collision observations, e.g., ACK/NACK feedback provided by SUTs 304-308, as described in more detail below. Based on this information, a current state estimate of the N wireless channels can be provided to a scheduling component 314, which can be adapted or configured to determine cooperative sensing decisions for SUTs 304-308 in a subsequent wireless time slot (e.g., see FIG. 5, supra for an example time-based cooperative scheduling process).

In various non-limiting examples, SUTs (e.g., SUTs 304, 306, etc.) can carry out spectrum sensing or measurements before operating on the primary channels using energy detection mechanism(s), as in conventional CRNs. Thus, conventionally, each SU can be expected to sense one channel at a time due to physical limitations (e.g., as opposed to simultaneous sensing or measurement of more than one channel), and the spectrum sensor of SUTs can detect the presence of PUT signals by performing the binary hypothesis test as in Eqn. (1):

$$H_0: s_n(t)=0(\text{idle}), \text{ and } H_1: s_1(t)=1(\text{busy}) \quad (1)$$

In addition, in further non-limiting examples, sensing performance of each SUT can be described by a probability of detection $p_d \triangleq \Pr\{\text{decide } H_1 | H_1 \text{ is true}\}$ and a probability of false alarm $p_f \triangleq \Pr\{\text{decide } H_1 | H_0 \text{ is true}\}$.

Moreover, various embodiments can be applied to a complex-valued phase-shift keying (PSK) signal and Circular Symmetric Complex Gaussian (CSCG) noise case, without loss of generality. Under this model, for a given probability of detection $p_d$, the probability of false alarm can be defined as in Eqn. (2), as a non-limiting example:

$$p_f = Q(\sqrt{2\gamma+1} Q^{-1}(p_d) + \sqrt{\tau f_s}\gamma) \quad (2)$$

where $Q(\bullet)$ can be a complementary distribution function of a standard Gaussian, $Q^{-1}(\bullet)$ can denote the inverse of $Q(\bullet)$, $\gamma$ can denote received signal-to-noise ratio (SNR) of the primary signal at the SU, $\tau$ can denote sensing time, and $f_s$ can denote the sampling rate.

In various embodiments of the disclosed subject matter, a cooperative sensing mechanism can be employed in the CRN. For instance, based in part on sensing outcomes from individual SUTs, a BS can perform a result fusion (e.g., result reporting, result fusion at 508, etc.) procedure to process individual outcomes jointly to obtain a final sensing outcome. Thus, channel state component 312 can employ a cooperative sensing scheme based on an "or" rule, as described herein, for example. Accordingly, based on an "or" rule, SUTs, e.g., SUTs 304-308, can submit a sensing result (e.g., either a 0 or 1) for a particular wireless channel to CR base station 102, e.g., BS 302, and if any SUT senses this wireless channel as busy, channel state component 312 can set the idle/busy state of the wireless channel to busy. Conversely, if every SUT, e.g., SUTs 304-308, sensing the channel reports the wireless channel as idle, channel state component 312 can set the idle/busy state of the wireless channel to idle. As a non-limiting example, on receiving results from M SUTs, a BS can apply a hard decision fusion rule (e.g., a hard decision fusion rule such as an "OR" rule, etc.) for fusion, which, according to a non-limiting aspect can be mathematically expressed as in Eqn. (3):

$$P_d(M) = 1 - \Pi_{i=1}^{M}(1-p_{d,i}), P_f(M) = 1 - \Pi_{i=1}^{M}(1-p_{f,i}) \quad (3)$$

where $p_{d,i}$ and $p_{f,i}$ denote the probability of detection and probability of false alarm obtained by $SU_i$, respectively. Note that, because a hard decision mechanism can be employed via a one bit information feedback, such mechanism can advantageously facilitate reducing CRN overhead. In a further non-limiting aspect, SUTs can be assumed to be homogeneous (e.g., having equivalent sensing performance, etc.) for the purpose of illustration, but in further non-limiting aspects heterogeneous sensing performance can also be accommodated.

Accordingly, in various non-limiting implementations, improved sensing results can be achieved when scheduling component 314 increases the number of SUTs 304-308 assigned to sense a given channel. However, when N≥M, the more SUTs that sense a given channel, the less the number of channels that can be sensed, and the less potential spectrum opportunities can be found for CRNs. On the other hand, improved sensing results can also be achieved when scheduling component 314 increases the sensing duration of SUTs 304-308 assigned to sense a given channel. As described, the longer the sensing duration, the longer the overall sensing duration, and the less time is available for traffic transmissions for the SUTs 304-308. Thus, with the exemplary system model as described above, the CSS problem of determining CSS for energy-efficient CRNs can be formulated.

Problem Formulation

The following discussion provides additional information regarding the CSS problem to facilitate understanding the techniques described herein. Referring again to FIG. 5, for example, at the beginning of each slot, a BS can sequentially determine $a_n(t)$, a number of SUTs assigned to sense channel n, with what sensor operating point, and for how long. According to an aspect, all or substantially all SUTs can be assigned a channel for sensing and/or can have the same sensing duration (e.g., such as for synchronization consideration, and so on, etc.). In accordance with further aspects, a transmission decision can be made based on a fusion outcome (e.g., result reporting, result fusion at 508, etc.), as described after collecting sensing reports from SUTs. In yet other non-limiting aspects, the BS, e.g., BS 302, can allocate the channels that are selected for transmission to SUTs (e.g., according to a random allocation of channels selected for transmission to SUTs, according to other algorithms, such as a fairness determination, a priority scheme, throughput maximization, a quality of service consideration, etc.). In still other non-limiting aspects, SU(s) utilizing a channel can send an acknowledge (ACK) to the BS if the transmission is successful (e.g., at the end of a slot, etc.).

It can be understood that because channel sensing capability is limited (e.g., some channels may not be sensed, etc.), and thus, the sensing performance is imperfect, system state may not be fully observable to the CRN. As a result, a BS, e.g., BS 302, can abstract system state in a probabilistic way by incorporating, for example, a decision history and an observation history. Accordingly, various non-limiting embodiments can employ a Partially Observable Markov Decision Process (POMDP) framework to facilitate determining optimal CSS.

Figure 6:
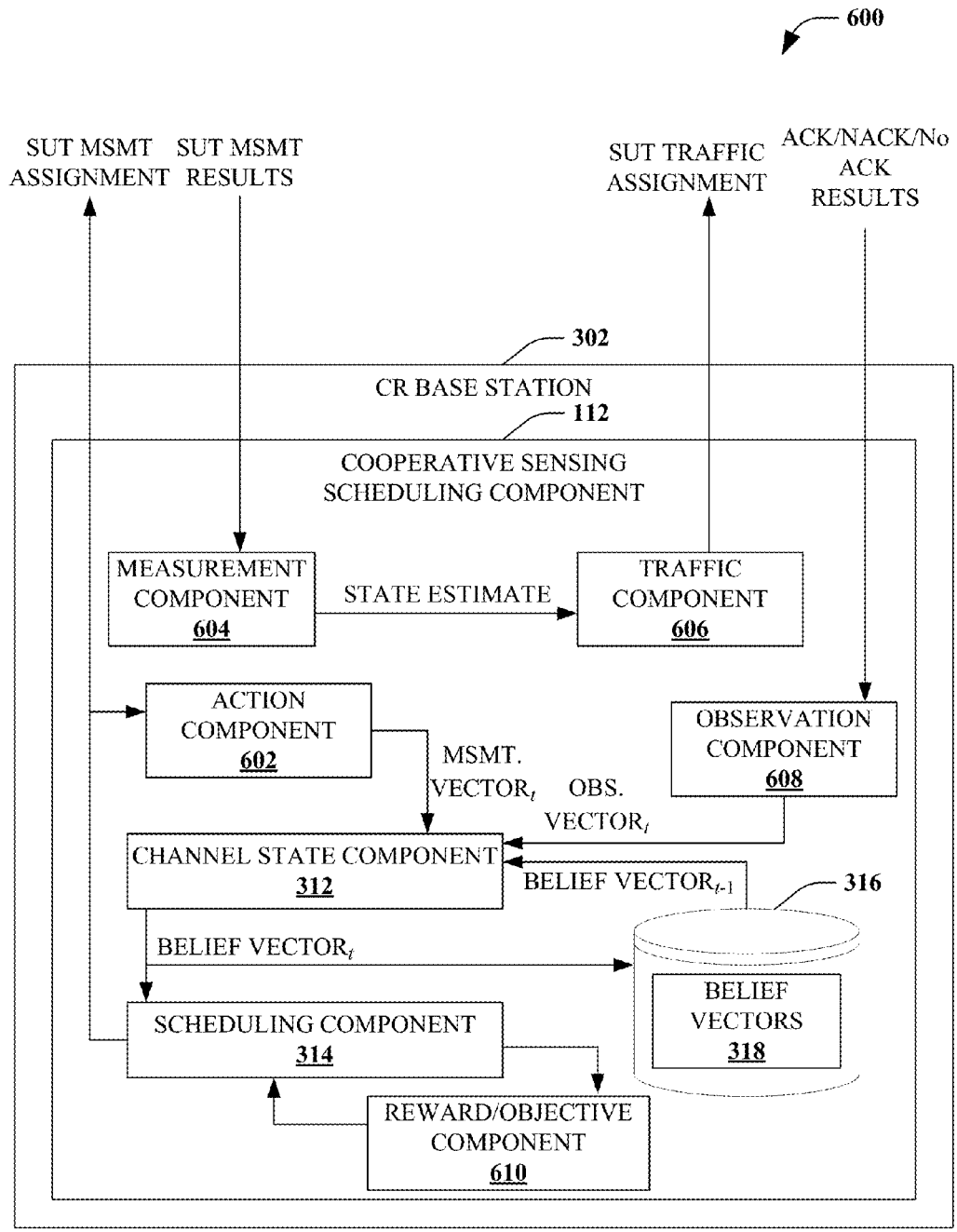
FIG. 6 illustrates a block diagram of an exemplary base station that illustrates aspects of a cognitive radio network according to the disclosed subject matter.

FIG. 6 illustrates a block diagram 600 of an exemplary base station, e.g., BS 302, that illustrates aspects of a cognitive radio network according to the disclosed subject matter. For ease of illustration, similar terminology and reference characters is employed regarding FIG. 6 as that employed, for example, regarding FIGS. 1-3, to indicate similar functionality. Thus, exemplary BS 302 can comprise a CSSC 112 that can be adapted to provide cooperative SUT sensing on primary user wireless channels. Moreover, the cooperative sensing can employ a scheduling algorithm that improves energy efficiency for a CRN. Thus, CSSC 302 can be adapted to provide a significant improvement over prior CRN implementations that do not address energy usage problems involved in cooperating sensing.

CSSC 112 can comprise a scheduling component 314 that selects a subset of SUTs (not depicted) to perform idle/busy state measurements on a subset of the primary user wireless channels. As mentioned above, this selection can conform to an energy-efficiency function, reward, policy, or objective as further described herein. The scheduling algorithm employed by scheduling component 314 is discussed in more detail below.

CSSC 112 can further comprise an action component 602 that can be adapted to generate a measurement vector in respective wireless time slots. This measurement vector can be derived from channel measurement selections output by scheduling component 314. Further, the measurement vector can be provided to a channel state component 312 to facilitate estimation of idle/busy states of the primary user wireless channels, which in turn can be employed by scheduling component 314 for optimizing energy-efficient sensing, transmission, and so on.

According to particular aspects of the disclosed subject matter, the measurement vector (also referred to as an action vector) that can be generated by action component 602 can comprise one or more actions including action or measurement vectors compiled from cooperative sensing decisions performed by scheduling component 304 that can determine which SUT senses which primary user channel, a misdetection probability or false alarm probability for SUTs, e.g., SUTs 304-308, to tune their respective sensor operating points when sensing assigned channels, and so on. According to the foregoing aspects, action component 602 can be adapted to generate or compute combined or compiled action or measurement vectors, for example from scheduling selections, an energy-efficiency function, reward, policy, or objective, constraints and so on, etc., by scheduling component 314 in a given wireless time frame.

Accordingly, in various non-limiting implementations, scheduling decisions computed or determined by scheduling component 314 can be transmitted to a set of SUTs communicatively coupled with BS 302, as described above at FIGS. 3, 5, etc. supra. In response, the set of SUTs, e.g., SUTs 304-308, can upload a set of measurement results (e.g., upload a set of measurement results to measurement component 604, portions thereof, etc.) after sensing the assigned primary user channels. Measurement component 604 can be adapted to receive and/or record channel measurements performed by SUTs, e.g., SUTs 304-308, and can be adapted to identify one or more of the primary user wireless channels that are likely to be in an idle state, or one or more such wireless channels likely to be in a busy state according to the channel measurements. Accordingly, channels identified as being in an idle state according to channel measurements can be provided to a traffic component 606.

Thus, traffic component 606 can be adapted to schedule uplink or downlink traffic transmissions for at least one of the set of SUTs, e.g., SUTs 304-308, to one or more of the primary user wireless channels identified by measurement component 604 as being in an idle state. The traffic scheduling of traffic component 606 can be forwarded to the SUTs, e.g., SUTs 304-308, which can respond with ACK/NACK results of those traffic transmissions, as described above regarding FIGS. 3, 5, etc., for example. These ACK/NACK results can be received and/or analyzed by an observation component 608.

Regarding observation history, according to exemplary non-limiting implementations, observation component 608 can denote $\theta_n(t)$ as the observation of channel n obtained in slot t. It can be understood that for an observation of observation component 608 at a relevant time, there can be four possible outcomes (e.g., (i) $\theta_n(t)=0$, can denote that data transmission is performed as a result of measurement component 604 identifying channel n as idle and observation component 608 receiving an ACK in response to transmissions on this channel; (ii) $\theta_n(t)=1$, can denote that data transmission is performed as a result of measurement component 604 identifying channel n as idle and observation component 608 does not receive an ACK for this channel (or an NACK is received); (iii) $\theta_n(t)=2$, can denote that measurement component 604 identifies channel n as busy based in part on the result fusion outcome at 508 and will not be utilized; and (iv) $\theta_n(t)=3$, can denote that the BS determines that, e.g., via scheduling component 314, the channel will not be sensed, etc.). Accordingly, observation component 608 can be adapted to establish a system observation vector that can be expressed as $\theta(t) \triangleq [\theta_1(t), \ldots, \theta_N(t)]$, for which it is noted the observations can be distinguished, because the BS can govern the transmission decisions, according to further non-limiting aspects.

Once the observation vector is established (e.g., by observation component 608), the observation vector for time slot t can be forwarded to channel state component 312. Additionally, the measurement vector for time slot t can be forwarded by action component 602 to channel state component 312. Channel state component 312 can also obtain a belief vector for time slot t−1 from a memory or storage component (e.g., memory 316), which can store, for example, historical belief vectors 318. As depicted in FIG. 6 and as further described below regarding FIG. 7, utilizing measurement vector$_t$, observation vector$_t$, and belief vector$_{t-1}$, channel state component 312 can calculate a belief vector for time slot t, which can comprise determined or estimated idle/busy state probabilities for the primary user channels at the end of time slot t. This new belief vector can be utilized by scheduling component 314 at the start of time slot t+1 to schedule cooperative sensing in time slot t+1 in a manner that optimizes energy efficiency, as described below.

Because of partial spectrum sensing decisions and the presence of sensing errors, channel state component may not observe the true idle/busy state of the primary user channels. However, in various non-limiting implementations, these states can be inferred based on prior decisions and observations and compiled into a belief vector. As a non-limiting example regarding a belief vector, a sufficient statistic of the system state can be described as a belief vector $b(t) \triangleq \{b_0^1(t), \ldots, b_0^N(t)\}$, where $b_0^n(t)$ can be defined as a conditional probability that the occupancy state is idle, e.g., $s_n(t)=0$, given the decision and observation history and $b_1^n(t)=1-b_0^n(t)$. Accordingly, in various non-limiting implementations b(t) can be computed, e.g., via channel state component 312, at the end of slot t, for example, after an observation is received and used for decision making in slot t+1. For example, b(t) can be computed by channel state component 312 at the end of the current time slot t when the observation vector is known and provided by observation component 608 (e.g., see the timing process of FIG. 5, supra). Scheduling component 314 can then make cooperative scheduling decisions at time slot t+1 based on this belief vector of the channel state. Thus, in further non-limiting implementations, based in part on the action and the observation received in slot t, the updating of the belief vector $b(t) \triangleq \tau(b(t-1)|A(t), \theta(t))$ can be obtained through the Bayes rule:

$$b_0^n(t) = Pr(s_n(t) = 0 | b(t-1), A(t), \theta(t)) \qquad (4)$$

$$= \frac{\sum_{i=0}^{1} b_i^n(t) p_{i0} Pr(\theta_n(t) | A(t), s_n(t) = 0)}{\sum_{j=0}^{1} \sum_{i=0}^{1} b_i^n(t) p_{ij} Pr(\theta_n(t) | A(t), s_n(t) = j)}$$

where $b_1^n(t)=1-b_0^n(t)$, A(t) denotes the action of the BS in each slot.

Once the belief vector for time slot t is calculated by channel state component 312 as described above, scheduling component 314 can employ this belief vector for CSS in time slot t+1. However, as described herein, SUTs can be assigned to sense channel in conjunction with an objective function related to energy efficiency. For example, by developing an objective function that can be employed to obtain energy-efficient CRN designs, energy consumption can taken into account, according to various aspects of the disclosed subject matter. Thus, the scheduling can be implemented in a manner that can influence the energy-efficiency of CRNs. To accomplish the objective, an objective or reward function or policy related to energy efficiency can be employed by a reward/objection component 610 in conjunction with scheduling component 314, or portions thereof, and so on as further described below and regarding FIG. 8, to determine assignments for SUTs, e.g., SUTs 304-308, etc. for CSS in time slot t+1.

As a further non-limiting example, the disclosed subject matter provides a reward that can be received at the end of each slot t according to an objective or reward policy or function. For example, because an objective can be defined to obtain energy-efficient CRN designs, energy consumption can taken into account, e.g., by scheduling component 314, according to various aspects of the disclosed subject matter. As a non-limiting example, an exemplary objective or reward function or policy for channel n, $R_n(A(t), \theta(t))$, can comprise non-limiting values such as, for example:

(i) when $\theta_n(t)=0$, e.g., as determined by observation component 608, a positive reward $(L-\eta-\tau(t))(B-e_t)$ can be determined (e.g., by scheduling component 314, by reward/objective component 610, by portions thereof, etc.), where $\tau(t) \in (0, L-\eta)$ can denote the sensing duration (e.g., SU sensing duration 506), $\eta$ can denote the duration for sensing scheduling and result fusion in the BS (e.g., sensing scheduling 504 and result fusion 508), B can denote a reward (e.g., an aspect of reward 514) for successful transmission and $-e_t$ can denote the energy consumed for transmission, both of which can be proportional to transmission duration;

(ii) when $\theta_n(t)=1$, e.g., as determined by observation component 608, a negative reward $(L-\eta-\tau(t))(-e_w-e_t)$ can be determined (e.g., by scheduling component 314, by reward/objective component 610, by portions thereof, etc.). In various non-limiting implementations, $-e_w$ can be regarded as a punishment for interference generated to a PU, which can be understood to reflect energy waste due to collision(s) or potential collisions (e.g., a parameter that can facilitate achieving energy-efficient CRN designs, as further described herein);

(iii) when a channel is sensed (e.g., at SU sensing duration 506) or selected for sensing (e.g., via scheduling component 314), a negative reward $-\tau(t)c$ can be determined (e.g., by scheduling component 314, by reward/objective component 610, by portions thereof, etc.), where c can denote energy consumed in spectrum sensing per unit of time, according to further non-limiting aspects; and (iv) when a channel is not selected for sensing, a condition of no reward can be employed or determined (e.g., by scheduling component 314, by reward/objective component 610, by portions thereof, etc.), according to still further non-limiting aspects.

Thus, to accomplish the objective of influencing the energy-efficiency of CRNs, an objective or reward function or policy can be employed by CSSC 112 (e.g., via scheduling component 314, by reward/objective component 610, portions thereof, and so on, etc.). Accordingly, as further described herein, the subject disclosure approaches the objective as a POMDP problem while comparing optimal policy formulations and myopic policy formulations, which merely focus on the immediate reward and ignores the impact of current policy on the future reward. Accordingly, myopic cooperative sensing scheduling is explored and compared with the structure of the optimal policy regarding optimal cooperative sensing scheduling and optimal sensing time. In addition, to explore design of energy-efficient reward parameters an analytical expression of the throughput is presented and an average successful transmission amount and an average collision amount is discussed as an aid to understand an energy efficiency criteria as described herein.

For example, in yet other non-limiting examples, a CRN can be expected to carry out as many successful transmissions as possible while minimize the collisions caused to the PU, since collisions can understandably result in retransmission and wasted energy. Therefore, an objective of such a POMDP problem can be to find out the optimal policy it that can maximize total reward received in T slots. A policy it can specify a sequence of functions $\pi=[\pi_1, \ldots, \pi_T]$, where $\pi_t$ can map a belief vector b(t−1) (e.g., from memory 316) to an action A(t) (e.g., from action component 602) in slot t. Thus, in various non-limiting implementations, the problem can be formulated as:

$$\pi^* = \text{argmax}_\pi \mathbb{E}_\pi \left\{ \sum_{t=1}^{T} R(A(t), \theta(t)) \middle| b(0) \right\} \quad (5)$$

with constraint $P_d^n(t) \geq \overline{P}_d$ and $\sum_{n=1}^{N} a_n(t)=M$, $\forall n \in \mathcal{N}$, t=1, ..., T. b(0) is the initial belief vector whose entries are set to the stationary distribution $$\overline{b} = \frac{p_{10}}{p_{01} + p_{10}}$$

of the underlying Markov chain as described above, regarding FIG. 4, for example. Constraint $P_d^n(t) \geq \overline{P}_d$ can serve as protection for the PUs, which can be defined such that probability of detection for all the PU channels $P_d^n(t)$ should be larger than some threshold $\overline{P}_d$ pre-determined by the PUs. It can be understood that by tuning the operating point of the SUTs' sensors to make the equality hold, then the optimal access policy is to access channel n if the result fusion outcome is idle and not to access otherwise. Applying such a result, the constraint $P_d^n(t) \geq \overline{P}_d$ can be removed and the original problem can become an unconstrained POMDP problem. Moreover, Eqn. (2) reveals that the probability of false alarm can be obtained when the target probability of detection and sensing duration are determined. As a result, action component 602 can determine the action of the BS, e.g., BS 302, in each slot, which can be expressed as $A(t) \triangleq \{a(t), \tau(t)\}$, where $a(t) \triangleq \{a_n(t)\}_{n \in \mathcal{N}}$.

In comparing optimal policy formulations and myopic policy formulations, to solve the objective Eqn. (5), the following value function can be employed to obtain the optimal policy:

$$V_t(b(t-1)) = \max_{A(t)} \{I_t(b(t-1)) + \mathbb{E}[V_{t+1}(\mathcal{T}(b(t-1) | A(t), \theta(t)))]\} \quad (6)$$

with constraint $\sum_{n=1}^{N} a_n(t)=M$ and $I_t(b(t-1))=\mathbb{E}[R(A(t), \theta(t))|b(t-1)]$ can denote the expected immediate reward. The value Eqn. (6) represents the maximum expected reward accumulated from slot t up to the maximum time horizon T. It can be understood that, the computational complexity for obtaining the optimal policy can be very high. One of the methods for addressing this problem can be to apply the myopic policy as described below, which merely focuses on the immediate reward and ignores the impact of current policy on the future rewards. For instance, in various non-limiting implementations, myopic policy can be given by $\tilde{A}(t)=\arg \max_{A(t)} I_t(b(t-1))$, with constraint $\sum_{n=1}^{N} a_n(t)=M$. Generally, the myopic policy can reduce the computational complexity but can possibly result in sub-optimal results.

However, various non-limiting implementations employing the myopic policy can be shown to coincide with optimal policy under particular non-limiting conditions as described herein.

Myopic Cooperative Sensing Scheduling

To demonstrate, in the beginning of each slot, for example, as described above regarding FIG. 5, a BS, e.g., BS 302, can determine for a channel, how many users (e.g., SUs, SUTs, etc. of the set of SUTs 304-308, and so on) are to be assigned to perform spectrum sensing cooperatively. As described, the more SUTs sensing a channel, the better the spectrum sensing performance. However, if some channels are not sensed, because the number of SUTs is limited, for example, then the spectrum opportunities may not be fully exploited. Thus, an objective in CSS, e.g., in optimizing the tradeoff between sensing accuracy and spectrum opportunities utilization, is to find an optimal scheduling of the SUTs to maximize an immediate reward received or determined by a BS, e.g., BS 302.

Accordingly, for a fixed sensing time $\tau(t)=\bar{\tau}$, $\tilde{I}_t(b(t-1)) \triangleq I_t(b(t-1))|_{\tau(t)=\bar{\tau}}$ can be defined. As a result, myopic CSS in slot t can be obtained by solving the following maximization problem:

$$(P1{:})\max_{a(t)} \tilde{I}_t(b(t-1)), \text{s.t. } \Sigma_{n=1}^N a_n = M \qquad (7)$$

Without loss of generality, the case can be considered that, in any slot t, the belief values of all the channels are the same, while the case of channels having different belief values is further described below. After careful inspection on $\tilde{I}_t(b(t-1))$, the following problem (P2) can be solved instead:

$$(P2{:})\max_{a(t)} \Sigma_{\{n: a_n(t)>0\}}(1-P_f(a_n(t))) \qquad (8)$$

with constraint $\Sigma_{n=1}^N a_n(t)=M$, for which it is shown below that the optimal solution for (P2) is actually the optimal solution for (P1) as well. Although the optimization objective in (P2) has a simpler form compared to (P1), (P2) is a combinatorial optimization problem regarded as NP-hard. Thus, while numerical methods can be applied to find a discrete optimal solution, such methods cannot provide insight to system design. For example, numerical methods cannot demonstrate how CSS can change with the changes in system parameters such as the total number of SUTs, M.

Thus, an analytical treatment of the combinatorial problem as described herein can provide useful design insights. Furthermore, as described above, various non-limiting implementations employing the myopic policy can be shown to coincide with optimal policy under particular non-limiting conditions as described herein. Accordingly, conditions can be established for some specific scheduling combinations employing the myopic policy. Before exploiting the pattern of the sensing scheduling, it is useful to first examine properties of the objective Eqn. (8). We begin with the following two lemmas.

Lemma 1: Let m be a continuous variable with domain $[1,+\infty)$. Denote $\tilde{p}_d(m)$ as the relaxed individual probability of detection as a decreasing and convex function of m:

$$\tilde{p}_d(m) = 1-(1-\bar{P}_d)^{1/m}. \qquad (9)$$

Eq. (8) relaxes the integer variable in Eqn. (3) to a continuous one. Taking the first-order derivative of $\tilde{p}_d(m)$:

$$\nabla \tilde{p}_d(m) = \exp\left(\frac{\ln(1-\bar{P}_d)}{m}\right) \frac{\ln(1-\bar{P}_d)}{m^2} \qquad (10)$$

where $\nabla$ can denote the differentiation of the function with respect to its argument. Since $0<1-\bar{P}_d<1$, it follows that $\nabla \tilde{p}_d(m)<0$, which means $\tilde{p}_d(m)$ is decreasing in m. Similarly, the second-order derivative of $\tilde{p}_d(m)$ can be shown to be positive as follows:

$$\nabla^2 \tilde{p}_d(m) = \exp\left(\frac{\ln(1-\bar{P}_d)}{m}\right) \frac{\ln(1-\bar{P}_d)(2m+\ln(1-\bar{P}_d))}{m^4} \qquad (11)$$

which can be positive when $2m+\ln(1-\bar{P}_d)>0$. In fact, in various non-limiting implementations, this condition can always be satisfied when $\bar{P}_d \leq 0.86$, which is an acceptable value for practical systems. Moreover, even for the systems that require better probability of detection, e.g., $\bar{P}_d \geq 0.9$, the condition can also be shown to hold when m is large, which means convex for the most portion of the range of m. From these two derivatives, $\tilde{p}_d(m)$ can be seen to be decreasing and convex as described.

Lemma 2: Denote $\tilde{p}_f(m)$ as the relaxed individual probability of false alarm as a function of m:

$$\tilde{p}_f(m) = Q\left(\sqrt{2\gamma+1}\, Q^{-1}(\tilde{p}_d(m)) + \sqrt{\bar{\tau} f_s}\, \gamma\right) \qquad (12)$$

which can be obtained from Eqn. (2) and which can be understood to be decreasing and convex.

From Eqn. (12), it follows that:

$$\nabla \tilde{p}_f(m) = -\frac{1}{\sqrt{2\pi}} \mathcal{J}_1 \sqrt{2\gamma+1}\, \nabla Q^{-1}(\tilde{p}_d(m)) \qquad (13)$$

where $$\mathcal{J}_1 = \exp\left[-\left(\sqrt{2\gamma+1}\, Q^{-1}(\tilde{p}_d(m)) + \sqrt{\bar{\tau} f_s}\, \gamma\right)^2 / 2\right],$$

and $$\nabla Q^{-1}(\tilde{p}_d(m)) = -\sqrt{2\pi} \exp\left[\frac{(Q^{-1}(\tilde{p}_d(m)))^2}{2}\right] \nabla \tilde{p}_d(m).$$

The derivative of the inverse of Q(x) can be given by $$\nabla Q^{-1}(x) = -\sqrt{2\pi} \exp\left[\frac{(Q^{-1}(x))^2}{2}\right],$$

which can be derived as demonstrated elsewhere. Since $\nabla \tilde{p}_d(m)<0$ from Lemma 1, it follows that $\nabla Q^{-1}(\tilde{p}_d(m))>0$. Therefore $\nabla \tilde{p}_f(m)<0$, i.e. $\tilde{p}_f(m)$ is decreasing in m.

Taking the second derivative of $\tilde{p}_f(m)$ it follows that:

$$\nabla^2 \tilde{p}_f(m) = -\frac{1}{\sqrt{2\pi}} \left\{ \exp\left[-\frac{(\alpha Q^{-1}(\tilde{p}_d(m))+\beta)^2}{2}\right] \right. \qquad (14)$$
$$(-\alpha Q^{-1}(\tilde{p}_d(m))-\beta)(\alpha \nabla Q^{-1}(\tilde{p}_d(m)))^2 +$$
$$\left. \exp\left[-\frac{(\alpha Q^{-1}(\tilde{p}_d(m))+\beta)^2}{2}\right] \nabla^2 Q^{-1}(\tilde{p}_d(m)) \right\}$$

where the second-order derivative of the inverse of $Q(x)$ can be further derived as:

$$\nabla^2 Q^{-1}(x) = Q(x)(Q^{-1}(x))^2 \quad (15)$$

and after manipulation, it follows that:

$$\nabla^2 \tilde{p}_f(m) = -\frac{1}{\sqrt{2\pi}} \left\{ \exp\left[-\frac{(\alpha Q^{-1}(\tilde{p}_d(m)) + \beta)^2}{2}\right] \right. \quad (16)$$

$$\left. (\nabla Q^{-1}(\tilde{p}_d(m)))^2 [-(\alpha^3 - 1)Q^{-1}(\tilde{p}_d(m)) - \alpha^3 \beta] \right\}$$

Since $\alpha > 1$, it can be verified that $\nabla^2 \tilde{p}_f(m) > 0$. To this end, it can be shown that $\tilde{p}_f(m)$ is decreasing and convex in m. These two lemmas present the properties of $\tilde{p}_d(m)$ and $\tilde{p}_f(m)$ (e.g., relaxed functions of the probability of detection and the probability of false alarm, respectively) with respect to the variable m. Originally, the number of cooperating SUTs can only be integer, which is difficult to analyze. For the sake of the analysis convenience, this can be relaxed such that the number can be a continuous variable m, while preserving the definition of the individual probability of detection and probability of false alarm, and using the results as the basis for the following analysis. Thus, it is noted that actual individual probability of detection and probability of false alarm can be regarded as some discrete points on the relaxed functions $\tilde{p}_d(m)$ and $\tilde{p}_f(m)$. Based on these two lemmas, the property of the relaxed probability of false alarm after result fusion, $\tilde{P}_f(m)$, can be characterized as follows.

Proposition 1: The probability of false alarm after result fusion, $\tilde{P}_f(m)$, is decreasing and convex on the domain of m, if the following condition holds:

$$\left[\ln(1 - \tilde{p}_f(m)) - \frac{m}{1 - \tilde{p}_f(m)} \nabla \tilde{p}_f(m)\right]^2 < \quad (17)$$

$$\frac{2\nabla \tilde{p}_f(m) + m\nabla^2 \tilde{p}_f(m)}{1 - \tilde{p}_f(m)} + \left[\frac{\sqrt{m} \nabla \tilde{p}_f(m)}{1 - \tilde{p}_f(m)}\right]^2, \forall m$$

Because, according to a non-limiting aspect, homogenous SUTs are considered, relaxed probability of false alarm after result fusion can be written as $\tilde{P}_f(m) = 1 - (1 - \tilde{p}_f(m))^m$. The first order derivative of $\tilde{P}_f(m)$ can be shown to be smaller than zero from Lemma 1 and Lemma 2. Then take the second-order derivative of $\tilde{P}_f(m)$ and after some algebraic manipulations, it follows that:

$$\nabla^2 \tilde{P}_f(m) = \quad (18)$$

$$-\exp\{m\ln(1 - \tilde{p}_f(m))\} \left\{ \left[\ln(1 - \tilde{p}_f(m)) - \frac{m}{1 - \tilde{p}_f(m)} \nabla \tilde{p}_f(m)\right]^2 - \right.$$

$$\left. \frac{2\nabla \tilde{p}_f(m) + m\nabla^2 \tilde{p}_f(m)}{1 - \tilde{p}_f(m)} - \left[\frac{\sqrt{m} \nabla \tilde{p}_f(m)}{1 - \tilde{p}_f(m)}\right]^2 \right\}$$

where $\nabla^2 \tilde{P}_f(m) > 0$, i.e. $\tilde{P}_f(m)$ can be shown to be decreasing and convex on the domain of m if the condition as represented in Eqn. (17) holds. In fact, it can be shown that, the as the number of cooperating SUTs increases, the smaller $\tilde{P}_f(m)$ gets. Otherwise, there would be no incentive to perform cooperative sensing and CSS. Moreover, for $m \to +\infty$, the condition as represented in Eqn. (17) should also hold. Otherwise, $\tilde{P}_f(m)$ would eventually go below zero; an impossible result. As demonstrated by extensive simulations, the condition as represented in Eqn. (17) holds for most cases, e.g., $\tilde{P}_f(m)$ is usually decreasing and convex. In further non-limiting aspects, even when there exists a concave section, it can be easily incorporated into the following analytical framework. Without loss of generality, it can be assumed that $\tilde{P}_f(m)$ can be decreasing and convex throughout according to various non-limiting implementations. Accordingly, with the above results, the combinatorial problem (P2) can be analyzed, employing the following non-limiting definitions, for ease of illustration.

Definition 1: All combinations, e.g. ways of assigning SUTs to sense the channels, can be divided into groups, such that $G_i$, $i=1, \ldots, M$ can be defined as the group that can comprise $|G_i|$ combinations in which exactly i channels are sensed (e.g., each of the i channels can be sensed by at least one SUT). Note that, in the exemplary framework, at most, M channels can be sensed since it is assumed that $N \geq M$. It is further noted that the reason for such division is that in some combinations, some channels may not have any SUT assigned for sensing. Considering the general case herein (e.g, where channels can have different belief values), the channels can be ordered according to belief values in a descending order and defined in $G_i$, the first i channels in the ordering are selected for sensing. $r \triangleq \{r_1, \ldots, r_i\}$ can be further defined where $r_1$ can denote the real channel number which is the first one in the ordering (e.g., with the largest belief value as described above), $r_2$ denotes the real channel number of the second one, etc. $C_{i,l} = \{a_{i,l}^j\}$ can be denoted as the l-th combination in group $G_i$, where $l=1, \ldots, |G_i|$. Let $a_{i,l}^j$ denote the number of SUTs assigned to sense channel $r_j$ in combination $C_{i,l}$ group $G_i$ and $j=1, \ldots, i$. Further assume $a_{i,l}^j \geq a_{i,l}^{j'}$ for $j<j'$, for example, because the channels are ordered according to the belief values, the case of $a_{i,l}^j \geq a_{i,l}^{j'}$ will produce an objective value of Eqn. (8) greater than or equal to that produced by the case of $a_{i,l}^j < a_{i,l}^{j'}$, for $j<j'$. It can be further understood that, when the belief values are the same, the logic also applies. Note that, by this assumption, some non-optimal combinations can already be excluded. It is obvious that $a_{i,l}^j \geq 1$ and $\Sigma_j a_{i,l}^j = M$, $\forall G_i$, $C_{i,l}$.

Definition 2: Each combination can produce different value of Eqn. (8). As a result, let the operator $\succ$ denote that a combination $C_{i,l}$ is larger than $C_{i',l'}$, $\forall i, i', l, l'$. In other words, $C_{i,l} \succ C_{i',l'}$ means $C_{i,l}$ can produce larger value of Eqn. (8) than $C_{i',l'}$. Similarly, $\succeq$ and $\preceq$ can be defined for the relationship of "larger than or equal to" and "smaller than or equal to", respectively.

In various non-limiting implementations, for each group, which combination is the largest one can be determined. For example, consider group $G_i$. If $a_{i,l}^j$ can take continuous values, it can be understood that the combination $C_{i,l}$ with $$a_{i,l}^j = \frac{M}{i},$$

$\forall j$ is the largest one due to the relationship:

$$\tilde{P}_f\left(\frac{M}{i}\right) \leq \frac{1}{i}\tilde{P}_f(a_{i,l}^1) + \frac{1}{i}\tilde{P}_f(a_{i,l}^2) + \ldots + \frac{1}{i}\tilde{P}_f(a_{i,l}^1), \forall C_{i,l} \quad (19)$$

which can result from the understanding that $\tilde{P}_f(m)$ is convex. However, in (P2), only integer values are allowed for $a_{i,l}^j$, which can be addressed by application of the theory of Discrete Convex Analysis, which can incorporate discrete settings and the concept of combinatorial optimization into the framework of convex analysis, as described elsewhere. Thus, for the purpose illustration of various non-limiting implementations, the actual probability of false alarm $P_f(m)$, $m \in [1, +\infty)$ and $m \in \mathbb{Z}$ is a discrete convex function, since $\tilde{P}_f(m)$ is convex and $P_f(m) = \tilde{P}_f(m)$ $\forall m \in [1, +\infty)$ and $m \in \mathbb{Z}$, which can also be understood as $P_f(m)$ actually taking the integer points on the domain of $\tilde{P}_f(m)$, as described above.

In addition, the concepts of L-convex functions and M-convex functions as described elsewhere can be introduced for the case of two scalar variables, according to further non-limiting aspects. For example, consider function $f(x)$ where x is a scalar. If $f(x)$ is an L-convex function, then $$f(a) + f(b) \geq f\left(\left\lceil \frac{a+b}{2} \right\rceil\right) + f\left(\left\lfloor \frac{a+b}{2} \right\rfloor\right),$$

$\forall a, b \in \mathbb{Z}$. This property is referred to as "discrete midpoint convexity." Then if $f(x)$ is an M-convex function, it follows $f(a)+f(b) \geq f(a+c)+f(b-c)$, $\forall a \leq b$, $a+c \leq b-c$, $a, b, c \in \mathbb{Z}$. This property is referred as "equidistance convexity." Thus, the following lemma can be established due to the fact that there is only a scalar variable of interest. Lemma 3: $P_f(m)$ is both L-convex and M-convex function.

Accordingly, it can be shown which combination is the largest one in each group. For instance, Eqn. (19) can provide insight that the largest combination should be the one that equally assigns the SUTs on each channel, which can lead to the largest value of the objective function. For the case that $$\frac{M}{i}$$

is an integer, the same conclusion can be shown to hold for $P_f(m)$. By also considering the case that $$\frac{M}{i}$$

is not divided, the following proposition can be proposed.

Proposition 2: The largest combination $C_{i,max}$ in group $G_i$ is given by:

$$a_{i,max}^j = \left\lceil \frac{M}{i} \right\rceil \text{ or } a_{i,max}^j = \left\lfloor \frac{M}{i} \right\rfloor, \sum_j a_{i,max}^j = M, \forall i, j \quad (20)$$

The largest combination has the following property:

$$\Sigma_j P_f(a_{i,max}^j) < \Sigma_j P_f(a_{i,j}^j), \quad (21)$$

where $\{a_{i,j}^j\}$ excludes the largest combination $C_{i,max}$.

It can be understood that Eqn. (20) has a unique solution under the constraint $\Sigma_j a_{i,max}^j = M$. Without loss of generality, consider a combination $C_{i,l}$ in group $G_i$. By recursively utilizing the properties of discrete midpoint convexity and equidistance convexity from Lemma 3, the following procedure can result:

1) For $a_{i,l}^1$ and $a_{i,l}^i$, since $$P_f(a_{i,l}^1) + P_f(a_{i,l}^i) \geq P_f\left(\left\lceil \frac{a_{i,l}^1 + a_{i,l}^i}{2} \right\rceil\right) + P_f\left(\left\lfloor \frac{a_{i,l}^1 + a_{i,l}^i}{2} \right\rfloor\right),$$

replace $a_{i,l}^1$ and $a_{i,l}^i$ with $$\left(\left\lceil \frac{a_{i,l}^1 + a_{i,l}^i}{2} \right\rceil\right) \text{ and } \left(\left\lfloor \frac{a_{i,l}^1 + a_{i,l}^i}{2} \right\rfloor\right)$$

and obtain a new combination $C_{i,l_1}$. It can be understood that $C_{i,l_1} \succeq C_{i,l}$.

2) Re-arrange the order within $C_{i,l_1}$ to meet the ordering requirement for $a_{i,l}^j$ mentioned in Definition 1. Then, repeat the same operation in 1) to gain a larger $C_{i,l_2}$.

3) The logic behind the previous two steps is to always take the largest and smallest $a_{i,l}^j$ in a group and replace them with the average of them. By doing so, a larger group results from consideration of Lemma 3.

It can be further understood that, by performing the operations in 1) and 2) recursively, all $a_{i,l}^j$ will be equal to the ones given in Eqn. (20). The largest combination in $G_i$ is then obtained and Eqn. (21) follows. Proposition 2 reveals a similar result as in Eqn. (19) (e.g., in each group, when exactly i channels need to be sensed, the SUTs among the channels should be distributed as equally as possible, to gain the minimum summation of the probabilities of false alarm, etc.), which is similar to a situation, where the same amount of power will be allocated if channels are homogeneous in noise. According to a non-limiting aspect, for homogeneous channels, SUTs can be equally assigned for sensing, for the purposes of illustration.

On finding out the largest combination in each group, the last step towards the optimal solution to (P2) is to find the largest one among these M combinations $C_{i,max}$, $i=1, \ldots, M$. The optimal solution and its related properties is given in the following theorem.

Theorem 1: (i) The optimal solution of (P2) is $C_{1,max}$, e.g., all M SUTs sense one channel cooperatively, if the following condition:

$$(C0:) P_f\left(\frac{M}{2}\right) + P_f\left(\frac{M}{2}\right) - P_f(M) - 1 \geq 0 \quad (22)$$

holds, which is a necessary and sufficient condition.

(ii) If condition (C0) holds for M', then for all M<M', condition (C0) also holds.

(iii) If condition (C0) does not hold for M', then for all M>M', condition (C0) will never hold. In other words, the BS, e.g., BS 302, would not assign all SUTs to cooperatively sense one channel if the network has M or more SUTs.

Assuming that Theorem 1(i) and (ii) hold for M−1, the proof of sufficiency can proceed as follows. Consider two consecutive groups, $G_i$ and $G_{i'}$, where $i'=i+1$ and $i \geq 2$. Consider $G_{i'}$. From Lemma 3 and Proposition 2, some manipulations can be performed on $C_{i,max}$ to obtain:

$$C_{i,max} \succeq C_{i,l} = \{a_{i',max}^1, a_{i',max}^2, \ldots, a_{i',max}^{i'-2}, (a_{i',max}^{i'-1} + a_{i',max}^{i'})\}. \quad (23)$$

Note that $(a_{i',max}^{i'-1} + a_{i',max}^{i'})$ is larger than $a_{i',max}^{i'-2}$, however, the correct ordering is not used so that relationship in the following is more easily shown. Meanwhile $C_{i,l}$ above is also a valid combination and will not cause any problem. Because Eqn. (20) reveals that $a_{i,max}^{j}-a_{i,max}^{j+1} \leq 1$, it then follows that $$a_{i',max}^{i'-1} = \left\lfloor \frac{a_{i',max}^{i'-1} + a_{i',max}^{i'}}{2} \right\rfloor \text{ and } a_{i',max}^{i'} = \left\lceil \frac{a_{i',max}^{i'-1} + a_{i',max}^{i'}}{2} \right\rceil.$$

In this case, from the assumption that Theorem 1(ii) holds, it follows that:

$$P_f(a_{i',max}^{i'-1}) + P_f(a_{i',max}^{i'}) - P_f(a_{i',max}^{i'-1} + a_{i',max}^{i'}) - 1 \geq 0, \quad (24)$$

which implies $C_{i,l} \geq C_{i',max}$. Since $C_{i,max} \geq C_{i,l}$, this result builds a bridge between two consecutive groups and reveals that the largest combination $C_{i,max}$ for $i \geq 2$ is $C_{2,max}$. Then for M, if the following inequality $$P_f\left(\left\lceil \frac{M}{2} \right\rceil\right) + P_f\left(\left\lfloor \frac{M}{2} \right\rfloor\right) - P_f(M) - 1 \geq 0$$

holds, then $C_{1,max} \geq C_{2,max}$, the inequality as given in Theorem 1(i).

The proof of necessity can proceed as follows. In the results above, it is shown that $C_{2,max}$ is the largest combination excluding $C_{1,max}$. Therefore in order for the combination $C_{1,max}$ to be the optimal solution, the only requirement is $C_{1,max} \geq C_{2,max}$, which can be satisfied if condition (C0) holds.

Thus, Theorem 1(iii) can be proven as follows. Assume for M condition (C0) does not hold, e.g., $$P_f\left(\left\lceil \frac{M}{2} \right\rceil\right) + P_f\left(\left\lfloor \frac{M}{2} \right\rfloor\right) - P_f(M) - 1 < 0.$$

Then consider the left hand side in the case of M+1. Since $$\left\lceil \frac{M}{2} \right\rceil = \left\lfloor \frac{M+1}{2} \right\rfloor \text{ and } \left\lfloor \frac{M}{2} \right\rfloor + 1 = \left\lceil \frac{M+1}{2} \right\rceil$$

can be easily verified, after some manipulation, it follows that:

$$P_f\left(\left\lceil \frac{M}{2} \right\rceil\right) + P_f\left(\left\lfloor \frac{M}{2} \right\rfloor\right) - P_f(M) - 1 - \quad (25)$$
$$\left[P_f\left(\left\lceil \frac{M+1}{2} \right\rceil\right) + P_f\left(\left\lfloor \frac{M+1}{2} \right\rfloor\right) - P_f(M+1) - 1\right] =$$
$$P_f\left(\left\lfloor \frac{M}{2} \right\rfloor\right) - P_f\left(\left\lceil \frac{M+1}{2} \right\rceil\right) - [P_f(M) - P_f(M+1)]$$

which can be shown to be larger than 0 from the decreasing and convex property of $\tilde{P}_f(m)$. This result implies that $$P_f\left(\left\lceil \frac{M+1}{2} \right\rceil\right) + P_f\left(\left\lfloor \frac{M+1}{2} \right\rfloor\right) - P_f(M+1) - 1 < 0,$$

which means $C_{1,max} \leq C_{2,max}$ for M+1. In this case, assigning all SUTs to sense one channel cooperatively is always not the best action, which finishes the proof of Theorem 1(iii). In fact, Theorem 1(ii) follows the same argument as Theorem 1(iii), which can thus be proved as well. Accordingly, the self-contained proof for Theorem 1 is complete.

It can be understood that Theorem 1 introduces the condition that the BS, e.g., BS 302, assigns all SUTs, e.g., SUTs 304-308, to cooperatively sense one channel in order to gain the largest objective value, given the number of SUTs M. It can be further understood that the structural results show that sensing fewer channels to gain higher sensing accuracy (e.g., for the sensed channels) can be preferable (e.g., in the sense of objective function in (P2) and condition (C0), etc.). In addition, Theorem 1(ii) and (iii) reveals that for given system parameters, there exists a threshold value of M, which can determine whether the combination $C_{1,max}$ is the optimal solution. Turning back to (P1). After some manipulation, it follows that:

$$\tilde{I}_t(b(t-1)) = \Sigma_{\{n:a_n(t)>0\}}\{(1-P_f(a_n(t)))(L-\eta-\tilde{\tau})(B-e_t)$$
$$\mathcal{J}_2\} + \Sigma_{\{n:a_n(t)>0\}}\{(1-\overline{P}_d)(L-n-\tilde{\tau})(-e_t-e_w)$$
$$\mathcal{J}_2 - \tilde{\tau}c\}, \quad (26)$$

where $\mathcal{J}_2 = p_{10} + b_0^n(t-1)(p_{00}-p_{10})$. It is obvious that $\tilde{I}_t(b(t-1))|_{a(t)=C_{1,max}} \geq \tilde{I}_t(b(t-1))|_{a(t)=C_{i,l}}$, for all i, l, since the second term is negative. As a result, it can be understood that the optimal solution obtained for (P2) is also the optimal one for (P1).

During the derivation of the condition (C0), it can be shown analytically that the methods for obtaining the second largest combination among all possible combinations, then comparing it with our desired combination (e.g., $C_{1,max}$) can be employed to gain the final condition. It can be understood from the derivation procedure that, when the channels have different belief values and are ordered accordingly in a descending way, (C0) can be more readily satisfied. Accordingly, it can be further understood that considering channels with the same belief values is a more stringent case. In various non-limiting implementations, by utilizing intrinsic properties of the problem and Lemma 3, the optimal solution of a combinatorial optimization problem can be obtained analytically. In addition, another significance of the result is that given the number of SUTs M, it can be immediately determined whether all sensing efforts should be assigned (e.g., assigning all SUTs) to sense one channel (e.g., determining whether $C_{1,max}$ is the optimal solution by simply testing (C0), etc.).

Although only the case that (C0) is satisfied is considered here, the framework can be extended to more general cases (e.g., cases where M is large and (C0) is violated, etc.). It can be further understood that, according to the disclosed framework. when M becomes large, more channels should be sensed, because it can be shown that exploiting more spectrum opportunities is more beneficial, as described above regarding the basic tradeoff between sensing accuracy and exploitation of available spectrum. Thus, obtaining an optimal solution for general cases (e.g., cases where M is large and (C0) is violated, etc.), can be explored, it suffices that the various non-limiting embodiments of the disclosed subject matter are not so limited.

For instance, although it is assumed that $\tilde{P}_f(m)$ is convex, similar analysis can be followed even if $\tilde{P}_f(m)$ is not always convex on the domain of m. As described above, any concave section can only occur in the beginning of the domain due to the value of $\tilde{P}_f(m)$ being bounded by zero. Thus, by separately treating the range where $\tilde{P}_f(m)$ is concave, the same procedure in the derivation of the largest combination and the proof of Theorem 1 can be followed to obtain a new combination ordering and optimal solution corresponding to the new property of $\tilde{P}_f(m)$. However, for ease of illustration and not limitation, the following discussion treats the case that M satisfies condition (C0), and assume it holds for all within the range of [0, L−η].

Structure of the Optimal Policy

In the study of optimal cooperative sensing scheduling, it is natural to consider whether the myopic CSS is also the optimal one under the same condition. Extensive simulation results confirm that when condition (C0) is satisfied the optimal CSS is to assign all SUTs to sense one channel. However, this proof is difficult to show analytically, because imperfect spectrum sensors introduce complexity in the belief vector update (e.g., in channel state component 312), etc. Thus, it can be understood that more information is required to study this challenging problem. Although it is difficult to deal with the extension of the myopic CSS to the optimal case, a simple and illustrative but nontrivial case, is demonstrated for the purposes of illustration and not limitation (e.g., where two SUTs and two channels exist and with fixed SU sensing duration 506). The reward parameters $e_f$, $e_w$ and c can be set to zero for expression simplicity. However, the parameters with general values can be easily incorporated. It can be assumed that $$P_f(m) \le \frac{p_{10}p_{01}}{p_{00}p_{11}}, \forall m.$$

Theorem 2: Consider the network with 2 SUTs and 2 channels. The optimal CSS at any slot t is to assign all SUTs to cooperatively sense the channel given by arg $\max_n b_0^n(t-1)$, if condition (C0) holds.

To prove Theorem 2, first assume all SUTs are always assigned to sense one channel. As demonstrated elsewhere, the BS, e.g., BS 302, can choose the channel with the largest belief value, e.g., arg $\max_n b_0^n(t-1)$. Thus, the expected value obtained under the following two cases can be compared: (i) two SUTs sense channel 1; (ii) each SUT senses one channel.

At the last time slot t=T, it can be understood that the optimal action is actually the myopic action. Suppose for t+1<T, the BS will assign all SUTs to cooperatively sense the channel with the largest belief value. It needs to be shown that it also holds for t (e.g., that the optimal action is actually the myopic action). As used elsewhere, $\hat{V}_t(b(t-1); g)$ can be denoted as an expected total reward obtained by sensing action g in slot t followed by the myopic policy in future slots. Similarly, $I_t(b(t-1); g)$ can be denoted as the expected immediate reward obtained by sensing action g in slot t. Further, g=1 can be defined as the action that two SUTs sense channel 1 and g=2 as the action that each SU senses one channel. In order to show the optimality of the myopic policy, $\hat{V}_t(b(t-1); g=1) - \hat{V}_t(b(t-1); g=2) \ge 0$ must be shown.

For both actions, (e.g., two SUTs sense channel 1 and each SU senses one channel) the observation and system state at t can determine the channel selected in t+1. Therefore, similar arguments in the proof of Theorem 2 as demonstrated can be applied to result in:

$$\hat{V}_t(b(t-1); g=1) - \hat{V}_t(b(t-1); g=2) = \quad (27)$$
$$[I_t(b(t-1); g=1) - I_t(b(t-1); g=2)] +$$
$$\Lambda + [b_0^1(t-1)(1-b_0^2(t-1))P_f(2) - (1-b_0^1(t-1))b_0^2 \overline{P}_d P_f(1)]$$
$$\Delta(p_{00}p_{11} - p_{10}p_{01}),$$

where $\Lambda$ is a positive term and $\Delta = \hat{V}_t(1|[0,1]) - \hat{V}_t(1|[1,0])$. $\hat{V}_t(g|[s_1, s_2])$ can denote the expected total reward starting from t under the action g and system state s(t−1) in slot t−1, as is demonstrated elsewhere. It can be understood that, the first term in the right hand side of Eqn. (27) can be nonnegative due to the presumption that condition (C0) holds. Denote the last term as $\mathcal{J}_3$, and after some manipulation, it follows that:

$$\mathcal{J}_3 = (b_0^1(t-1)(1-b_0^2(t-1)) + b_0^2(t-1)(1-b_0^1(t-1)))p_{00}$$
$$(P_f(1) - P_f(2)) + (p_{00} - p_{10})(b_0^2(t-1)(1-b_0^1(t-1))$$
$$\overline{P}_d P_f(1)(1-\Delta) - b_0^1(t-1)(1-b_0^2(t-1))P_f(2)(1-P_f(2)\Delta)) \quad (28)$$

Since $p_{00} \ge b_0^1(t-1) \ge b_0^2(t-1) \ge p_{10}$, it follows that:

$$\mathcal{J}_3 \ge p_{10}P_{01}$$
$$\overline{P}_d P_f(1)(1-\Delta) - p_{00}p_{11}P_f(2)(1-P_f(2)-\Delta) \ge p_{10}p_{01}[$$
$$\overline{P}_d P_f(1)(1-\Delta) - (1-P_f(2)-\Delta)] \quad (29)$$

where the second inequality results from the assumption above that $$P_f(2) \le \frac{p_{10}p_{01}}{p_{00}p_{11}}.$$

By making use of the conclusion that $|\Delta| \le (1-P_f(2))$, $\mathcal{J}_3$ can be further expressed as $\mathcal{J}_3 \ge p_{10}P_{01}P_f(2)\overline{P}_d P_f(1) > 0$, which leads to $\hat{V}_t(b(t-1); g=1) - \hat{V}_t(b(t-1); g=2) > 0$.

The study of Theorem 2 reveals that in this exemplary illustration of 2 SUTs and 2 channels, the myopic CSS is actually optimal, which, as can be understood, highly simplifies the procedure of finding the optimal policy. This conclusion provides nontrivial results and insights into the problem at hand, while the optimality of the myopic sensing scheduling for general M and N can be understood to be highly challenging. The following sections focus on the exemplary case of optimal CSS by assigning all SUTs to sense one channel.

While the study of optimal cooperative sensing scheduling reveals that the myopic policy can coincide with the optimal policy, the myopic policy can comprise two parts: CSS and the sensing time $\tau^*(t)$, where the latter one is given by $\tau^*(t) = \arg\max_{\tau(t)} I_t(b(t-1))$, which is the solution of a statistic optimization problem. Thus, further study of optimal cooperative sensing scheduling involves discussion of the structure of the optimal sensing time. It can be shown that there exists only one maximum τ(t) within the range of [0, L−η]. In addition, the myopic solution can be obtained by many popular effective searching algorithms with low complexity. Although the optimal sensing time is very difficult to obtain, some insights about its structure can be shown in the following proposition.

Proposition 3: (i) The optimal sensing time $\tau^*(t)$ that maximizes the total expected reward is the same as the myopic sensing time $\tilde{\tau}^*(t)$ that maximizes the immediate expected reward, if $p_{00} = p_{01} = p_{11} = p_{10}$. (ii) The optimal sensing time $\tau^*(t)$ is no smaller than $\tilde{\tau}^*(t)$, ∀t.

Proposition 3 can be proven as follows. Proposition 3(i) can be proven from the aspect of belief update. All the belief vectors after state transition will be set to the same value $p_{10}$, in which case the expected future reward in any t will not be influenced by the probability of false alarm, which is related to sensing duration (e.g., which is the only impact different sensing r caused on the expected future reward.). Moreover, the updated belief value is also indifferent with the observation outcome at the same time. Since $\tilde{\tau}^*(t)$ maximizes the immediate reward, the optimal sensing time $\tau^*(t)$ should be equivalent to $\tilde{\tau}^*(t)$.

Proposition 3(ii) can be proven by considering $\tau(t) \leq \tilde{\tau}^*(t)$. It can be proved that the expected future reward obtained under $\tilde{\tau}^*(t)$ is larger than that under $\tau(t)$. Because $\tilde{\tau}^*(t)$ maximizes the immediate reward, it also maximizes the total expected remaining reward. Therefore, only when $\tau(t) > \tilde{\tau}^*(t)$ could $\tau(t)$ result in a larger total expected remaining reward than $\tilde{\tau}^*(t)$.

For example, denote $V_t(b(t-1), \tau(t))$ as the maximum expected remaining reward obtained starting from t, under the current belief vector $b(t-1)$ and sensing time $\tau(t)$. The proof can be based on the following lemmas.

Lemma 4: The value function in Eqn. (6) is convex in the belief vector. Specifically, for the set of value functions $\{V_t(b_1(t-1)), \ldots, V_t(b_I(t-1))\}$ with their corresponding belief vectors $\{b_1(t-1), \ldots, b_I(t-1)\}$, the following inequality $$\sum_{i=1}^{I} \phi_i V_t(b_i(t-1)) \geq \sum_{i=1}^{I} \phi_i(b_i(t-1)) \quad (30)$$

$\forall \phi \in [0, 1]$, $\sum_{i=1}^{I} \phi_i = 1$ is satisfied, where the set of belief vectors labeled as $\{b_1(t-1), \ldots, b_I(t-1)\}$ can be defined for the convenience of showing the convexity.

It is demonstrated elsewhere that the value function, $V_t(\tilde{b}_i(t-1), \tau(t))$, is piece-wise linear and convex (PWLC) with respect to the belief vector $\tilde{b}_i(t-1)$. Because the value function given in Eqn. (6) is a standard value function, then Lemma 4 follows.

Lemma 5: Assume channel n is sensed in slot t. If observation $\theta_n(t)=0$ or $\theta_n(t)=1$ is received in slot t, then the expected future reward $V_{t+1}(\mathcal{T}(b(t-1)|\tau(t), \theta_n(t)))$ is independent of the sensing time $\tau(t)$ in slot t. In other words, it follows that:

$$V_{t+1}(\mathcal{T}(b(t-1)|\tilde{\tau}^*(t),0)) = V_{t+1}(\mathcal{T}(b(t-1)|\tau(t),0)) \quad (31)$$

$$V_{t+1}(\mathcal{T}(b(t-1)|\tilde{\tau}^*(t),1)) = V_{t+1}(\mathcal{T}(b(t-1)|\tau(t),1)) \quad (32)$$

which can be proven as follows. All belief values except the selected channel n can be updated according to the transition probability, which is independent of the sensing time. For the selected channel n, it can be seen from Eqn. (4) that $\mathcal{T}(b_0^n(t-1)|\tilde{\tau}^*(t), 0) = \mathcal{T}(b_0^n(t-1)|\tau(t), 0) = 1$ and $\mathcal{T}(b_0^n(t-1)|\tilde{\tau}^*(t), 1) = \mathcal{T}(b_0^n(t-1)|\tau(t), 1) = 0$, which is independent of the sensing time as well.

Lemma 6: In any time t, the future reward $V_{t+1}(\mathcal{T}(b(t-1)|\tau(t),\theta_n(t)))$ can satisfy the following inequality:

$$\phi V_{t+1}(\mathcal{T}(b(t-1)|\tau(t),\theta_n(t)=0)) + (1-\phi) V_{t+1}(\mathcal{T}(b(t-1)|\tilde{\tau}^*(t),\theta_n(t)=2)) \geq V_{t+1}(\mathcal{T}(b(t-1)|\tau(t),\theta_n(t)=2)) \quad (33)$$

where $\phi$ is given by:

$$\frac{\sum_i b_i^n(t-1) p_{i0}[Pr(0|0,\tilde{\tau}^*(t)) - Pr(0|0,\tau(t))]}{\sum_i b_i^n(t-1)[p_{i0}Pr(2|0,\tau(t)) + p_{i1}Pr(2|1)]}$$

for all $\tau(t) \leq \tilde{\tau}^*(t)$. The proof of Lemma 6 can be understood by applying the belief update Eqn. (4), we can obtain the following inequality after manipulation:

$$\phi \mathcal{T}(b(t-1)|\tau(t),\theta_n(t)=0) + (1-\phi) \mathcal{T}(b(t-1)|\tilde{\tau}^*(t), \theta_n(t)=2) = \mathcal{T}(b(t-1)|\tau(t),\theta_n(t)=2) \quad (34)$$

where $\phi$ is given as above. Then, Lemma 6 follows from the conclusion of Lemma 4. Now comparing the expected remaining reward from t obtained under different sensing time $\tau(t)$ and the optimal myopic sensing time $\tilde{\tau}^*(t)$, which is given by:

$$V_t(b(t-1),\tilde{\tau}^*(t)) - V_t(b(t-1),\tau(t)) = I_t(b(t-1),\tilde{\tau}^*(t)) - I_t(b(t-1),\tau(t)) + \mathbb{E}[V_{t+1}(\mathcal{T}(b(t-1)|\tau(t),\theta_n(t)))] \geq \mathbb{E}[V_{t+1}(\mathcal{T}(b(t-1)|\tau(t),\theta_n(t)))] \quad (35)$$

where the inequality results from the fact that $\tilde{\tau}^*(t)$ maximize the immediate reward. Applying Lemma 6, it follows that:

$$V_t(b(t-1),\tilde{\tau}^*(t)) - V_t(b(t-1),\tau(t)) \geq 0 \quad (36)$$

Then, consider $\tau(t) > \tilde{\tau}^*(t)$. Although the immediate reward under $\tilde{\tau}^*(t)$ is still the maximum one, the expected future reward obtained under $\tilde{\tau}^*(t)$ is smaller than that under $\tau(t)$, which statement relies on the observation from Lemma 6, where a smaller probability of false alarm implies a larger expected future reward. Therefore, the optimal sensing time $\tilde{\tau}^*(t)$ can only locate in the range of $[\tilde{\tau}^*(t), L-\eta]$. Accordingly, proposition 3 is proven.

While the conclusion arrived at herein is similar to that arrived at elsewhere, it can be understood that although myopic sensing time cannot always be generalized to the optimal sensing time, the analysis reveals useful insights to the structure of the optimal sensing time. In addition, myopic sensing time can serve as a useful tradeoff between the computational complexity with acceptable performance and optimality.

Energy-Efficient Reward Parameter Design

As described above, to accomplish the objective of influencing the energy-efficiency of CRNs, an objective or reward function or policy can be employed by CSSC 112 (e.g., via scheduling component 314, by reward/objective component 610, portions thereof, and so on, etc.). To that end, various non-limiting implementations can employ a punishment parameter, $e_w$, associated with collisions with PUTs. Thus, in a non-limiting aspect a punishment parameter can advantageously improve energy efficiency in CRNs, compared to the general designs without the punishment parameter, as described herein. Although the myopic policy does not always preserve optimality, as described above, the performance of the myopic policy still suffices to demonstrate the advantages the punishment parameter on energy efficiency. Similar to conventional studies, the method of analyzing the steady-state reward is employed, where the reward function as described herein is related to the sensing time $\tau(t)$.

As can be understood, steady-state performance (e.g., throughput, etc.) of the myopic policy is unique. As a result of which, the performance can be determined by a Markov reward process $(\vec{S}(t), R(t))$, according to various non-limiting embodiments, because the sensing scheduling result is made at the beginning of each slot and prior to the decision of sensing time. According to an aspect, $\vec{S}(t)$ can be defined as the channel ordering and $R(t)$ can be related to the sensing time $\tau(t)$.

To study an analytical expression of the throughput, the concept of Transmission Period as described elsewhere can be employed, where under the situation of $p_{00} \geq p_{10}$, the event of channel switch (e.g., from idle to busy or from busy to idle) is equivalent to a slot without positive reward. In the model as described herein, the situation can be more complicated, and that slot may refer to conditions such as: (i) no ACK is received, and negative reward is obtained; and (ii) the sensing outcome is busy and thus no transmission is performed, only the energy for sensing is consumed. Thus, letting $\mathcal{L}_k$ denote the length of k-th transmission period, a discrete-time random process $\{\mathcal{L}_k\}_{k=1}^{\infty}$ with a sample space of positive integers follows. As described herein, the total reward obtained in T slots is of interest as well as how much power is due to successful transmission, how much is due to collision, how much is due to power consumed for transmission, and how much is consumed for the sensing. These elements can be derived in the following discussion.

For example, average successful transmission amount, $\mathcal{H}_B$, can be defined as the ratio between overall length of successful transmission duration and the overall length of transmission duration (e.g., length of transmission duration including the successful ones, failed ones, silent ones, etc.). Let $$\overline{\mathcal{L}_k} = \lim_{k \to \infty} \frac{\sum_{k=1}^{K} \mathcal{L}_k}{K}$$

denote the average length of a transmission period. The average successful transmission amount $\mathcal{H}_B$ is given by $$\mathcal{H}_B = 1 - \frac{L - \eta - \hat{\tau}(1)}{\mathcal{D}},$$

where $$\mathcal{D} = (L - \eta - \hat{\tau}(1))\overline{\mathcal{L}_k} + \hat{\tau}(1) - \lim_{k \to \infty} \frac{\sum_{k=1}^{K} \hat{\tau}(b_{1,k})}{K}$$

denotes the average length of transmission duration of a transmission period, $b_{i,k}$ denotes the belief value for the i-th slot in k-th transmission period, $\hat{\tau}(b_{i,k})$ denotes the optimal sensing time given the corresponding belief value $b_{i,k}$.

Mathematically, $\mathcal{H}_B$ can be expressed as:

$$\mathcal{H}_B = \frac{\lim_{k \to \infty} \sum_{k=1}^{K} \sum_{i=1}^{\mathcal{L}_k - 1} (L - \eta - \hat{\tau}(b_{i,k}))}{\lim_{k \to \infty} \sum_{k=1}^{K} \sum_{i=1}^{\mathcal{L}_k} (L - \eta - \hat{\tau}(b_{i,k}))} \quad (37)$$

From the myopic policy it can be understood that, in a transmission period, the first $\mathcal{L}_k - 1$ slots are all successful transmission slots, although the actual or effective transmission duration may vary. As a result the expression for $\mathcal{H}_B$ can be obtained, which can be further manipulated to result in:

$$\mathcal{H}_B = \frac{\lim_{k \to \infty} \sum_{k=1}^{K} \left[ \sum_{i=1}^{\mathcal{L}_k - 1} (L - \eta - \hat{\tau}(b_{i,k})) - (L - \eta - \hat{\tau}(1)) \right]}{\lim_{k \to \infty} \sum_{k=1}^{K} \sum_{i=1}^{\mathcal{L}_k} (L - \eta - \hat{\tau}(b_{i,k}))} = \quad (38)$$

$$1 - \frac{L - \eta - \hat{\tau}(1)}{\mathcal{D}}$$

The expression $\mathcal{D}$ can be derived through induction:

$$\mathcal{D} = \lim_{k \to \infty} \frac{\sum_{k=1}^{K} \sum_{i=1}^{\mathcal{L}_k - 1} (L - \eta - \hat{\tau}(b_{i,k}))}{K} \quad (39)$$

$$= (L - \eta) \lim_{k \to \infty} \frac{\sum_{k=1}^{K} \mathcal{L}_k}{K} - \lim_{k \to \infty} \frac{\sum_{k=1}^{K} \sum_{i=1}^{\mathcal{L}_k} \hat{\tau}(b_{i,k})}{K}$$

The second term on the RHS can be further derived as follows:

$$\lim_{k \to \infty} \frac{\sum_{k=1}^{K} \sum_{i=1}^{\mathcal{L}_k} \hat{\tau}(b_{i,k})}{K} = \lim_{k \to \infty} \frac{\sum_{k=1}^{K} \left[ \hat{\tau}(b_{i,k}) + \sum_{i=2}^{\mathcal{L}_k} \hat{\tau}(1) \right]}{K} \quad (40)$$

$$= \lim_{k \to \infty} \frac{\sum_{k=1}^{K} \hat{\tau}(b_{i,k})}{K} + \lim_{k \to \infty} \frac{\sum_{k=1}^{K} (\mathcal{L}_k - 1)\hat{\tau}(1)}{K}$$

Thus, the upper bound of $\mathcal{H}_B$ can be expressed as $$\mathcal{H}_B \leq 1 - \frac{L - \eta - \hat{\tau}(1)}{\overline{\mathcal{D}}},$$

where $$\overline{\mathcal{D}} = (L - \eta - \hat{\tau}(1))\overline{\mathcal{L}} + \hat{\tau}(1) - \hat{\tau}(\overline{b}), \overline{\mathcal{L}} = 1 + \frac{\overline{b}}{1 - p_{00}(1 - P_f(M; \hat{\tau}(1)))}$$

and $P_f(m; \hat{\tau}(b))$ can denote the probability of false alarm achieved by m cooperating SUTs and the sensing time $\hat{\tau}(b)$.

For example, because the upper bound for $\mathcal{H}_B$ is of interest, in turn, finding the minimum value of $$\lim_{k \to \infty} \frac{\sum_{k=1}^{K} \hat{\tau}(b_{i,k})}{K}$$

is of interest. It can be shown that the optimal sensing time $\hat{\tau}(\cdot)$ is non-increasing with the current belief value, e.g., $\hat{\tau}(b') \leq \hat{\tau}(b)$ if $b' \geq b$. Because, for all belief values, it follows that $b \in [0, 1]$, it follows that:

$$\lim_{k \to \infty} \frac{\sum_{k=1}^{K} \hat{\tau}(b_{i,k})}{K} \geq \lim_{k \to \infty} \frac{\sum_{k=1}^{K} \hat{\tau}(\overline{b})}{K} = \hat{\tau}(\overline{b}) \quad (41)$$

then the minimum value can be obtained. Accordingly, the next step can be to find out the maximum value of $\overline{\mathcal{L}}$, by first working out the limit length of $\mathcal{L}_k$, which follows the following distribution:

$$Pr\{\mathcal{L}_k = l\} = \qquad (42)$$

$$\begin{cases} 1 - \overline{b}_{1,k}(1 - P_f(M; \hat{\tau}(b_{1,k}))), & l = 1 \\ \overline{b}_{1,k}(1 - P_f(M; \hat{\tau}(b_{1,k}))) \quad [p_{00}(1 - P_f(M; \hat{\tau}(1)))]^{l-2} \\ *[1 - p_{00}(1 - P_f(M; \hat{\tau}(1)))], & l \geq 2 \end{cases}$$

$$1 - \overline{b}_{1,k}(1 - P_f(M; \hat{\tau}(b_{1,k}))), \quad l = 1$$

$$\overline{b}_{1,k}(1 - P_f(M; \hat{\tau}(b_{1,k})))[p_{00}(1 - P_f(M; \hat{\tau}(1)))]^{l-2}$$

$$[1 - p_{00}(1 - P_f(M; \hat{\tau}(1)))], \quad l \geq 2$$

where $\overline{b}_{1,k} = p_{00}b_{1,k} + p_{10}(1-b_{1,k})$, $P_f(m; \hat{\tau}(b))$ can denote the probability of false alarm achieved by m cooperating SUTs and the sensing time $\tau(b)$. From the distribution above, the limit length can be obtained and expressed as:

$$\overline{\mathcal{L}_k} = \mathbb{E}[l] = 1 + \frac{b_{1,k}(1 - P_f(M; \hat{\tau}(b_{1,k})))}{1 - p_{00}(1 - P_f(M; \hat{\tau}(1)))} \qquad (43)$$

It can be understood (or can be explained through the so-called stochastic domination of $\mathcal{L}_k(1)$) that the maximum value of the above relation can be achieved when $b_{1,k} = \overline{b}$ and $P_f(M; \hat{\tau}(b_{1,k}))$ is very small (e.g., for example if M is large, etc.). Then the maximum value of $\overline{\mathcal{L}}$ follows:

$$\overline{\mathcal{L}} = 1 + \frac{\overline{b}}{1 - p_{00}(1 - P_f(M; \hat{\tau}(1)))} \qquad (44)$$

As a result, the upper bound of $\mathcal{D}$, defined as $\overline{\mathcal{D}}$, can be obtained from the above:

$$\mathcal{D} = (L - \eta - \hat{\tau}(1))\overline{\mathcal{L}} + \hat{\tau}(1) - \lim_{k \to \infty} \frac{\sum_{k=1}^{K} \hat{\tau}(b_{i,k})}{K} \leq \qquad (45)$$

$$(L - \eta - \hat{\tau}(1))\overline{\mathcal{L}} + \hat{\tau}(1) - \hat{\tau}(\overline{b}) \overset{\Delta}{=} \overline{\mathcal{D}}$$

which leads to the upper bound of $\mathcal{H}_B$.

As a result, attention can be turned to analyzing the average collision amount, which can refer to an interference generated to the PUTs and the transmissions that lead to punishment received in the SUT system side. Thus, average collision amount can be defined as the ratio of overall length of transmission duration that results in collision with the PUTs and the overall length of transmission duration. The upper bound of the average collision amount $\mathcal{H}_C$ can be given by $$\mathcal{H}_C \leq \frac{(L - \eta - \hat{\tau}(1))(1 - \overline{P}_d)}{\overline{\mathcal{D}}}$$

as a result of the relation:

$$\mathcal{H}_C = \frac{\lim_{k \to \infty} \sum_{k=1}^{K} (L - \eta - \hat{\tau}(1))(1 - \overline{P}_d)}{\lim_{k \to \infty} \sum_{k=1}^{K} \sum_{i=1}^{\mathcal{L}_k} (L - \eta - \hat{\tau}(b_{i,k}))} \qquad (46)$$

Determining average transmission power consumption can reflect the average power consumed for transmission. Note that for the last slot in each transmission period, the system may not transmit due to the sensing result being busy, which can result the transmission power is saved. Thus, average transmission power consumption $\mathcal{H}_T$ can be given by:

$$\mathcal{H}_T = \frac{\lim_{k \to \infty} \sum_{k=1}^{K} \left[ \sum_{i=1}^{\mathcal{L}_k - 1} (L - \eta - \hat{\tau}(b_{i,k})) + (L - \eta - \hat{\tau}(1))(1 - \overline{P}_d) \right]}{\lim_{k \to \infty} \sum_{k=1}^{K} \sum_{i=1}^{\mathcal{L}_k} (L - \eta - \hat{\tau}(b_{i,k}))} \leq \qquad (47)$$

$$\frac{(L - \eta - \hat{\tau}(1))\overline{P}_d}{\overline{\mathcal{D}}}$$

Accordingly, various non-limiting implementations of the disclosed subject matter can employ energy efficiency criteria to facilitate optimal CSS and energy-efficient CRNs. To that end, two exemplary related criteria or constraints that can facilitate determining the energy efficiency of the system are described herein. For example, generally it is desired to maximize successful transmission durations and minimize collisions caused (which can result in wasted energy). Thus, a criterion referred to herein as Successful transmission oVer Collision (SVC) can be defined to determine or measure energy efficiency of a CRN, which can reflect the ratio between meaningful energy consumption and energy waste. Denoting the SVC criterion as $\epsilon^{SVC}$, which can be defined as the ratio between overall successful transmission duration and the overall collision duration. The upper bound of $\epsilon^{SVC}$ can be expressed as follows:

$$\varepsilon^{SVC} = \frac{\lim_{k \to \infty} \sum_{k=1}^{K} \sum_{i=1}^{\mathcal{L}_k - 1} (L - \eta - \hat{\tau}(b_{i,k}))}{\lim_{k \to \infty} \sum_{k=1}^{K} (L - \eta - \hat{\tau}(1))(1 - \overline{P}_d)} \leq \frac{\overline{\mathcal{D}} - (L - \eta - \hat{\tau}(1))}{(L - \eta - \hat{\tau}(1))(1 - \overline{P}_d)}. \qquad (48)$$

As a further example, it is also generally desired to use transmission power more efficiently, which means that the more power that is used for successful transmission, the better. Thus, a criterion referred to herein as Successful transmission oVer transmission Power consumption (SVP) can be defined, which can reflect a ratio between meaningful energy consumption and the overall energy consumed. Denoting the SVP criterion as $\epsilon^{SVP}$, which can be obtained by the summation of total successful transmission durations over the summation of total transmission power consumed, it can mathematically expressed as:

$$\varepsilon^{SVP} = \frac{\lim_{k \to \infty} \sum_{k=1}^{K} \sum_{i=1}^{\mathcal{L}_k - 1} (L - \eta - \hat{\tau}(b_{i,k}))}{\lim_{k \to \infty} \sum_{k=1}^{K} \left[ \sum_{i=1}^{\mathcal{L}_k - 1} (L - \eta - \hat{\tau}(b_{i,k})) + (L - \eta - \hat{\tau}(1))(1 - \overline{P}_d) \right]} \leq \qquad (49)$$

$$\frac{1}{1 + \frac{(L - \eta - \hat{\tau}(1))(1 - \overline{P}_d)}{\mathcal{D} - (L - \eta - \hat{\tau}(1))}}.$$

As described above, once scheduling component 314 selects a subset of the set of SUTs, e.g., a subset of SUTs 304-308, to measure a subset of the set of primary user wireless channels in time slot t (e.g., using myopic policy, optimal policy, executing the scheduling algorithm on subgroups of SUTs or wireless channels, employing an objective or reward function or policy, and so on), the selection or measurement schedule (e.g., schedule 316) can be output to the SUTs, and measurements of the channels are performed in time slot t. Measurements can be received and processed by measurement component 604 to identify wireless channels measured to be in an idle state for time slot t, and traffic transmissions on those wireless channels can be scheduled by traffic component 606 for time slot t. ACK and/or NACK observations for time slot t can be received by observation component 608, which can incorporate observations into an observation vector$_t$. Observation vector$_t$ can be provided, along with a measurement vector$_t$ and belief vector$_{t-1}$, to channel state component 312. Utilizing this information, channel state component 312 can determine a belief vector$_t$ based thereon. The belief vector$_t$ is then provided to scheduling component 314 for subsequent CSS in time t+1, and so on.

Figure 7:
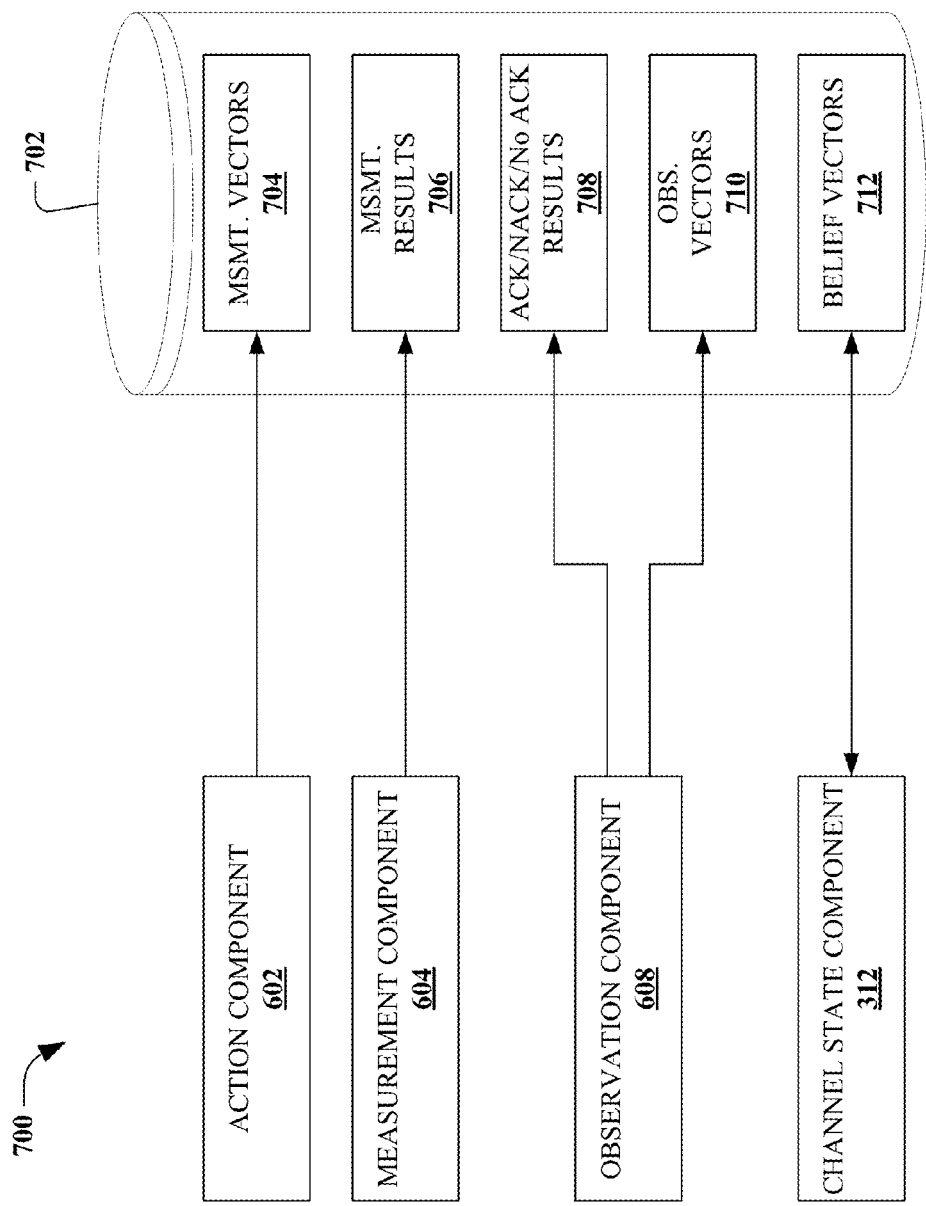
FIG. 7 depicts a block diagram of an example parameter database system that can be employed in conjunction with cooperative sensing for cognitive radio.

FIG. 7 depicts a block diagram of an example parameter database system 700 that can be employed in conjunction with cooperative sensing for cognitive radio. For ease of illustration, similar terminology and reference characters is employed regarding FIG. 7 as that employed, for example, regarding FIGS. 1-3, 6, etc., to indicate similar functionality. System 700 can be employed in conjunction with a CSSC as described herein (e.g., CSSC 112, etc.). Particularly, system 700 can include a database or storage component 702 or portions thereof that can store information pertaining to CSS in a CR wireless communication environment (e.g., CRNs, etc.). For example, information can be employed in conjunction with a scheduling algorithm based on one or more reward policies for improving energy efficiency for CR wireless communications. Additionally, system 700 can comprise one or more components for generating data pertaining to states of wireless channels upon which the scheduling algorithm schedules the cooperative sensing.

According to at least one aspect, system 700 can comprise an action component 602 that can compile a measurement vector based on cooperative sensing selections made by a CR base station, e.g., BS 302, in successive wireless time frames, for example. These cooperative sensing selections, as well as measurement vector can be stored in a measurement vector data location 704 of database or storage component 702 for respective time frames.

System 700 can further comprise a measurement component 604, that can be adapted to receive sensing determinations of wireless channels made by SUTs, e.g., SUTs 304-308, and can be further adapted to store measurement results for time frames in measurement data location 706 of database or storage component 702. Additionally, measurement component 604 can estimate an idle/busy state of the respective wireless channels, for example, based upon measurement results, and an idle/busy decision threshold. Thus, estimated idle/busy states can be stored as well (e.g., via database or storage component 702, etc.).

Further, system 700 can comprise an observation component 608 that can be adapted to receive ACK and/or NACK observations from SUTs, e.g., SUTs 304-308, in response to traffic transmissions associated with those SUTs in respective time frames, for example. In one aspect of the subject disclosure, ACK/NACK results can be stored in ACK/NACK data location 708 of database or storage component 702. Additionally, an observation vector (e.g., an observation vector compiled from the ACK/NACK results for time frames, etc.) can be stored in an observation vector data location 710 of database or storage component 702. In further non-limiting implementations, as described above regarding FIG. 6, for example, channel state component 312 can employ a measurement vector and observation vector for a current time frame (e.g., time t), as well as a belief vector describing state probabilities for the wireless channels from a prior time frame (e.g., b(t−1) for time t−1), to calculate current belief vectors b(t) for respective time frames. Thus, current belief vectors can be stored in a belief vector data location 712, also as a function of respective wireless time frames.

Database or storage component 702 therefore can serve as a repository for information for wireless channels associated with a CRN (e.g., for historical data for determining statistical behavior, etc.). For instance, information can be stored as a function of wireless time frames, for instance, to enable determination of channel state probabilities, to optimize scheduling decisions for particular time frames, and so on. As data accumulates, a particular time horizon over which channel state estimation calculations are performed can increase, which can be utilized for instance in conjunction with an objective or reward policy or function described at FIG. 6, supra. While database or storage component 702 is depicted in FIG. 7 as distinct from memory or storage component (e.g., memory 316) that can store, for example, historical belief vectors 318, various exemplary implementations are not so limited. Thus, FIGS. 6-7 are presented as an aid to understand various non-limiting implementations. It is understood that the various described components, or portions or subcomponents thereof, can be further aggregated, integrated, or distributed, or otherwise rearranged to provide similar functionality without departing from the scope of the disclosed subject matter.

Figure 8:
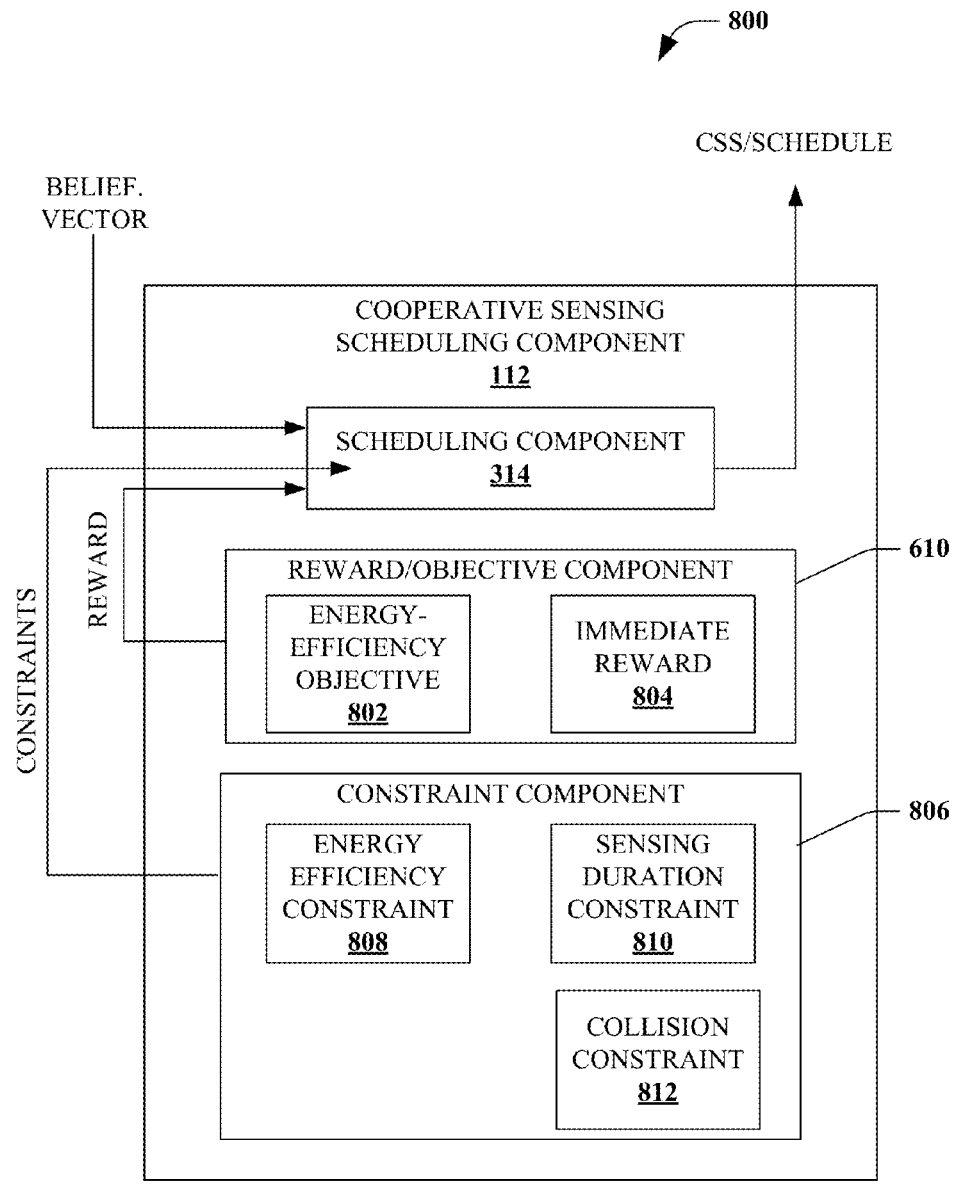
FIG. 8 depicts a block diagram 800 of a sample system that can employ various objective or reward policies or functions and/or constraints for implementing cooperative sensing to facilitate energy-efficient CRNs.

FIG. 8 depicts a block diagram 800 of a sample system that can employ various objective or reward functions or policies and/or constraints for implementing cooperative sensing to facilitate energy-efficient CRNs. Thus, an exemplary CSSC 112, according to one or more additional aspects of the subject disclosure, can comprise a scheduling component 314, as described herein. In addition, CSSC 112 can further include a reward/objective component 610, as described herein. Moreover, FIG. 8 depicts an exemplary implementation of a CSSC 112 that can further comprise a constraint component 802. For instance, scheduling component 314 can receive belief vector describing idle/busy state probabilities for a set of wireless channels observable by CSSC 112. Additionally, a reward/objective component 610 can provide a selected reward policy for optimizing cooperative sensing scheduling decisions based on a wireless system state defined by the belief vector. As described herein, reward/objective component 610 can comprise an energy efficiency-objective 802, as described herein, which can be employed by scheduling algorithms (e.g., by scheduling component 314, by reward/objective component 610, portions thereof, and so on, etc.) adapted to select a sensing assignment in a manner that seeks to maximize a reward related to energy efficiency. As described herein, as the time horizon over which the scheduling decisions are calculated increases, the complexity of scheduling decisions can burden processing capabilities of CSSC 112. In such a case, an immediate reward 804 can be employed, which can prioiritize determining the immediate reward while ignoring the impact of current policy on the future rewards, thus reducing this time horizon and the associated calculation complexity.

Further to the above, CSSC 112 can comprise a constraint component 806 that can be adapted to apply one or more constraint(s) for cooperative sensing scheduling decisions performed by scheduling component 314. Examples of such constraints can comprise an energy efficiency constraint 808, that can facilitate tuning an energy efficiency parameter (e.g., adjusting punishment parameter, $e_w$, etc.), tuning a reward function parameter (e.g., reward for successful transmission B), and so on, etc., as further described herein. As a further example, a sensing duration constraint 810 can be imposed on cooperative sensing scheduling decisions to ensure that a sensing duration is selected in a manner that seeks to maximize a reward related to energy efficiency. Additionally, a collision constraint 812 can be imposed such that a desired detection probability is achieved in a manner that seeks to establish a collision probability below a collision threshold. That is, a desired detection probability can facilitate minimizing energy wasted due to collision(s) or potential collisions with PUTs, and can, according to a further non-limiting aspect, protect the priority of PUTs, (e.g., concurrently or otherwise, etc.). In at least one aspect, a combination of the foregoing constraints can be imposed on scheduling decisions, in addition to one or more reward policies provided by reward/objective component 610.

It is to be appreciated that the provided embodiments are exemplary non-limiting implementations of the techniques provided by the disclosed subject matter. As a result, such examples are not intended to limit the scope of the hereto appended claims. For example, certain considerations or design-tradeoffs are described for illustration only and are not intended to imply that other parameters or combinations thereof are not possible or desirable. Accordingly, such modifications as would be apparent to one skilled in the are intended to fall within the scope of the hereto appended claims.

The aforementioned systems have been described with respect to interaction between several components and/or wireless communication entities. It should be appreciated that such systems and components can include those components or sub-components specified therein, some of the specified components or sub-components, and/or additional components. For example, a system could include CSSC 112, CR base station, e.g., BS 302, PUT310, and/or SUTs 304-308, and so on, or a different combination of these or other entities. Sub-components could also be implemented as modules communicatively coupled to other modules rather than included within parent modules. Additionally, it should be noted that one or more components could be combined into a single component providing aggregate functionality. For instance, measurement component 604 could include traffic component 606, or vice versa, to facilitate receiving SUT channel sensing results and scheduling traffic transmissions based on those results, by way of a single component. The components can also interact with one or more other components not specifically described herein but known by those of skill in the art.

In view of the exemplary embodiments described supra, methods that can be implemented in accordance with the disclosed subject matter will be better appreciated with reference to the flowcharts of FIGS. 9-12. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be understood that various other branches, flow paths, and orders of the blocks, can be implemented which achieve the same or a similar result. Moreover, not all illustrated blocks may be required to implement the methods described hereinafter. Additionally, it should be further understood that the methods disclosed hereinafter and throughout this specification are capable of being stored on an article of manufacture to facilitate transporting and transferring such methods to computers, for example, as further described herein. The term article of manufacture, as used herein, is intended to encompass a computer program accessible from any computer-readable device, carrier, or media.

Exemplary Methods

Figure 9:
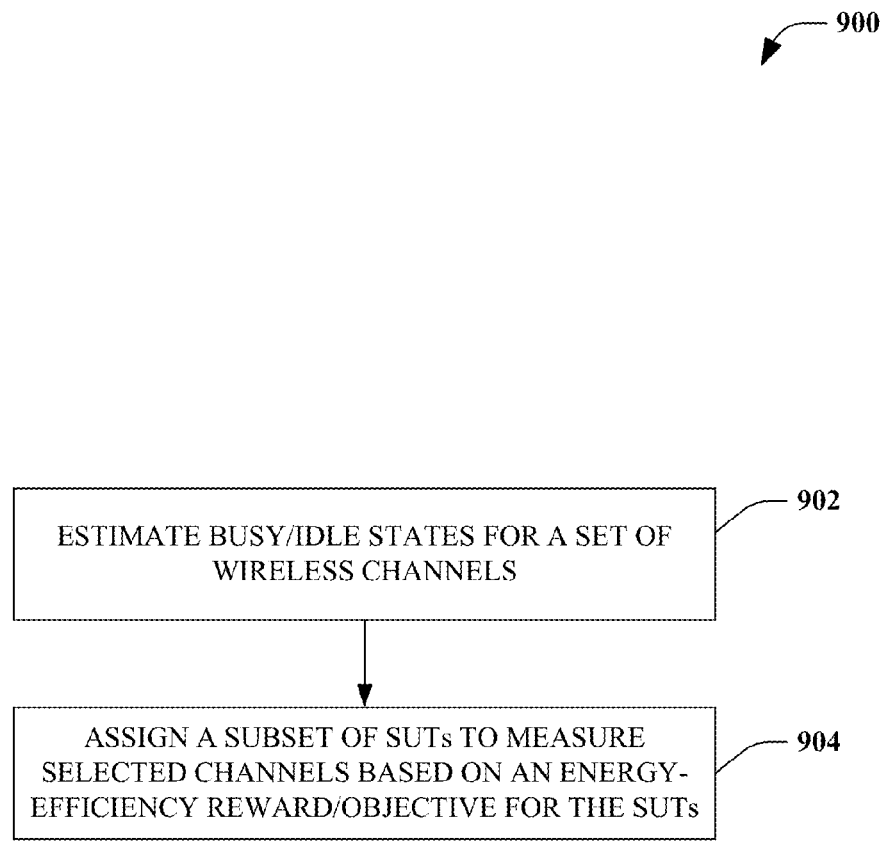
FIG. 9 depicts a flowchart of a sample method for providing cooperative sensing in cognitive radio wireless communications, according to particular aspects of the subject disclosure.

FIG. 9 depicts a flowchart of a sample method 900 for providing cooperative sensing in cognitive radio wireless communications, according to particular aspects of the subject disclosure. For instance, at 902, method 900 can comprise estimating states to generate estimated states for a set of wireless channels as busy or idle from prior channel information (e.g., prior states, historical information, probabilities of detection and/or false alarm, and so on, etc.) associated with the set of wireless channels. For example, in various non-limiting implementations, the estimating can include estimating states for the set of wireless channels in a CR wireless communication system. In a further example, the estimating can be based on recent idle/busy state estimates of the wireless channels, such as from one or more previous wireless time frames.

According to a particular example, the estimating can also comprise traffic-based feedback information indicating whether a collision has occurred on one or more of the wireless channels. In yet another example, the estimating can include employing traffic feedback results, channel measurement assignment information, and/or channel measurement results, and so on, etc., as described above. In addition, method 900 can further comprise identifying SUTs and wireless channels that increase, improve, maximize, optimize or attempt to increase, improve, maximize, optimize an energy efficiency objective (e.g., an energy efficiency function, reward, policy, or objective, etc.) for a current time frame based on the estimated states in the current time frame. For instance, identifying SUTs can include identifying SUTs and selected wireless channels based on a PUT collision constraint that facilitates mitigating collisions of the SUTs with a PUT, as further described herein. In addition, identifying SUTs can further include determining a sensing duration for sensing selected wireless channels, and identifying the SUTs and selected wireless channels based on an energy efficiency constraint.

At 904, method 900 can also comprise assigning a subset of SUTs to measure selected wireless channels based on an energy efficiency objective for the subset of SUTs and the estimated states of the wireless channels. For instance, assigning the subset of SUTs can also comprise increasing, improving, maximizing, optimizing or attempting to increase, improve, maximize, optimize a reward associated with energy efficiency (e.g., an energy efficiency function, reward, policy, or objective, etc.) based on traffic feedback results, channel measurement assignment information, channel measurement results, and so on, etc., as described herein. For instance, increasing the reward can include maximizing or attempting to maximize an expected immediate reward for a current time slot, maximizing or attempting to maximize the reward associated with energy efficiency to maximize (or in an attempt to maximize) the energy efficiency objective for the subset of SUTs, and so on. Moreover, as described, the assigning can be based on an optimization or attempted optimization of the energy efficiency objective (e.g., an energy-efficiency function, reward, policy, or objective, etc.). This optimization can employ the estimates of busy/idle states for respective wireless channels, in some aspects. In additional aspects, the estimates can also be based on prior scheduling decisions, including prior SUT wireless channel sensing assignments, equipment sensitivity settings of the one or more SUTs, and so on. In further aspects, the estimates can also be based on the traffic-based feedback information associated with the existence of collisions in prior wireless time frames.

In other non-limiting implementations of methods 900, measurement results of the selected wireless channels can be received in response to the assigning, whereas data traffic can be specified for one or more SUTs based on the measurement results. Thus, data traffic feedback associated with the data traffic can be received or inferred, and the data traffic feedback can be employed to facilitate assigning one or more SUTs in a subsequent time frame.

Figure 10:
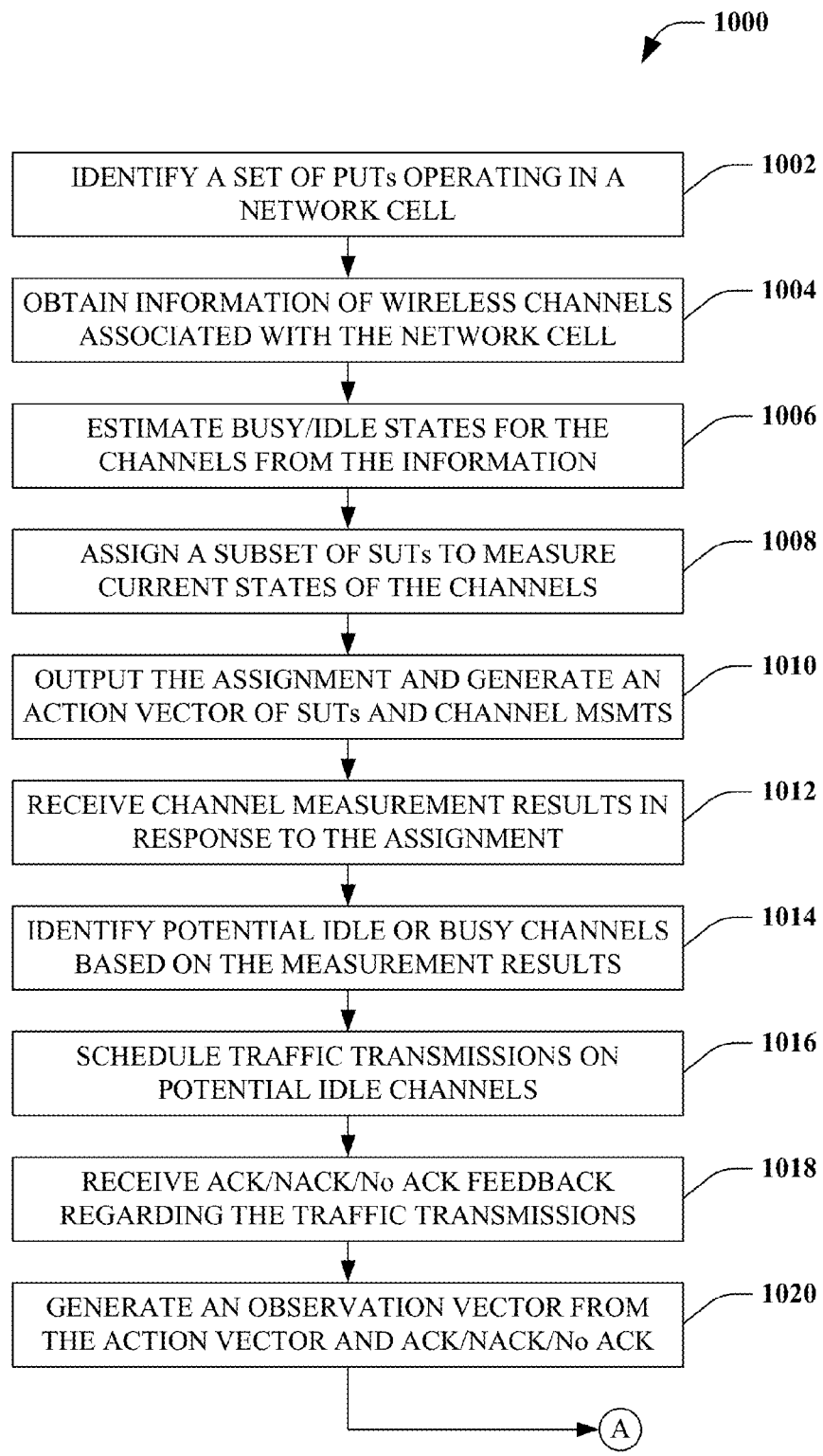
FIGS. 10-11 depict flowcharts of example methods for providing cooperative sensing scheduling according to an energy-efficiency function, reward, policy, or objective, as described herein.
Figure 11:
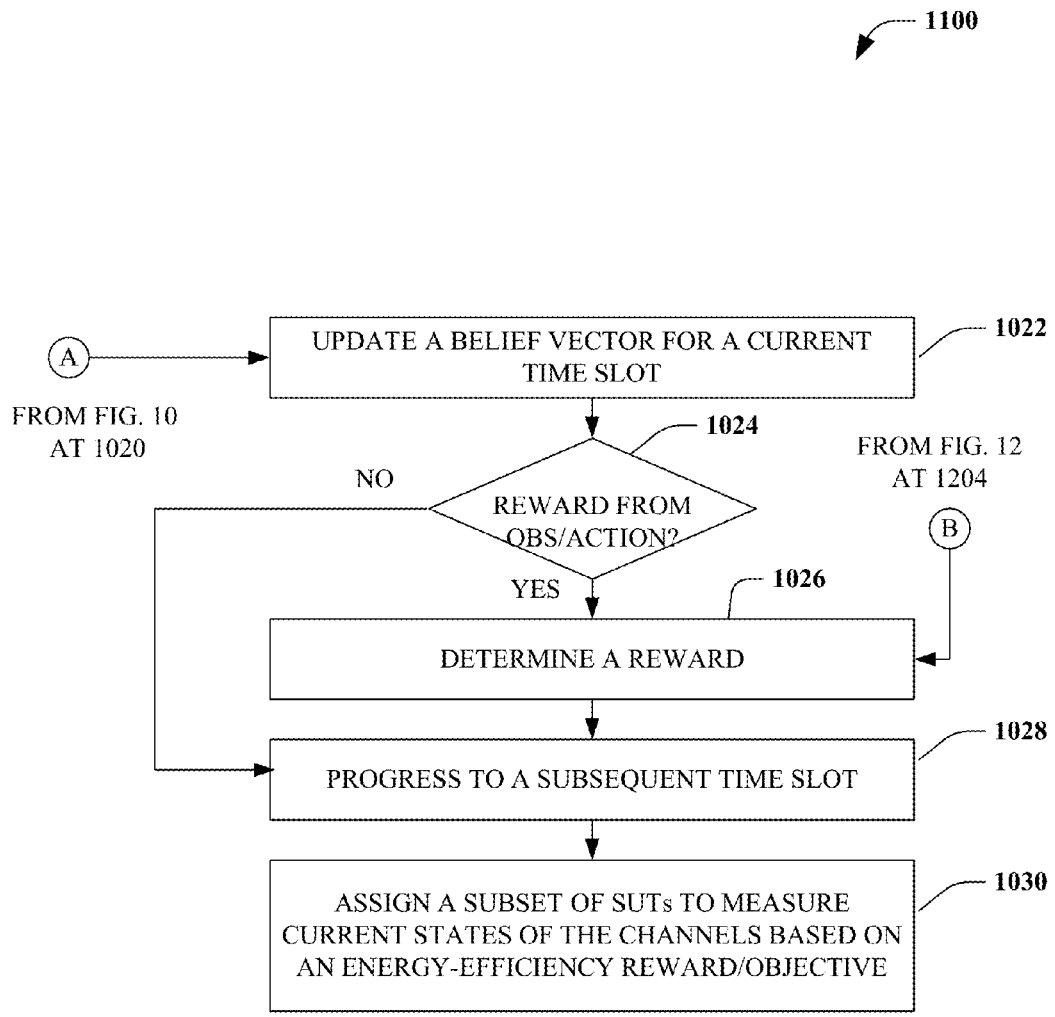

FIGS. 10-11 depict flowcharts of example methods 1000 and 1100 for providing cooperative sensing scheduling according to an energy-efficiency function, reward, policy, or objective, as described herein. For instance, at 1002, method 1000 can comprise identifying a set of PUTs (e.g., PUT 310, etc.) operating within a network cell (e.g., wireless communication environment 300, etc.). At 1004, method 1000 can comprise obtaining information of wireless channels associated with the network cell. For example, information obtained can include, but is not limited to traffic feedback results, channel measurement assignment information, channel measurement results, long-term statistical behavior of wireless channels from a previous time frame, busy or idle probability states of wireless channels, and so on, as further described herein. At 1006, method 1000 can further comprise estimating busy/idle states for the wireless channels from the information.

In addition, at 1008, method 1000 can include assigning a subset of SUTs to sense current idle or busy states of one or more of the wireless channels, whereas at 1010, the assignment can be output and an action vector of SUTs and channel measurements can be generated. At 1012, method 1000 can further comprise receiving channel measurement results for the wireless channels in response to the assignment. At 1014, potential idle or busy channels can be identified, based in part on the measurement results. Moreover, at 1016, method 1000 can also include scheduling traffic transmissions (e.g., wireless traffic, data traffic, and so on, etc.) on one or more of the potential idle channels. Thus, method 1000 can comprise receiving feedback (e.g., receiving ACK, NACK, lack of ACK, etc.) regarding the traffic transmissions, and at 1020, method 1000 can comprise generating an observation vector from the action vector and the ACK/NACK feedback.

From 1020, method 1000 can proceed to 1022 of method 1100 as depicted in FIG. 11, which can further comprise updating a belief vector representing current idle/busy states of the wireless channels in a current time slot, from the observation vector and the action vector. Accordingly, at 1024, a determination can be made as to whether a reward is to be obtained or determined for scheduling optimization based on an energy-efficiency function, reward, policy, or objective as described herein, based on the ACK/NACK feedback, on the observation vector, on the action vector, and/or on other information or considerations associated with the energy-efficiency function, reward, policy, or objective. Thus, if there is a reward to be obtained or determined, method 1100 can proceed to 1026 and the reward can be determined, for example, at 1204 at FIG. 12, as further described below. Otherwise, method 1100 can proceed to 1028, where method 1100 can comprise progressing to a subsequent wireless time slot. At this point, method 1100 can further include, at 1030, assigning a subset of SUTs to measure current states of the channels based on the energy-efficiency reward/objective. The assigning can be understood to incorporate any reward determined according to the energy-efficiency function, reward, policy, or objective, as described herein.

Figure 12:
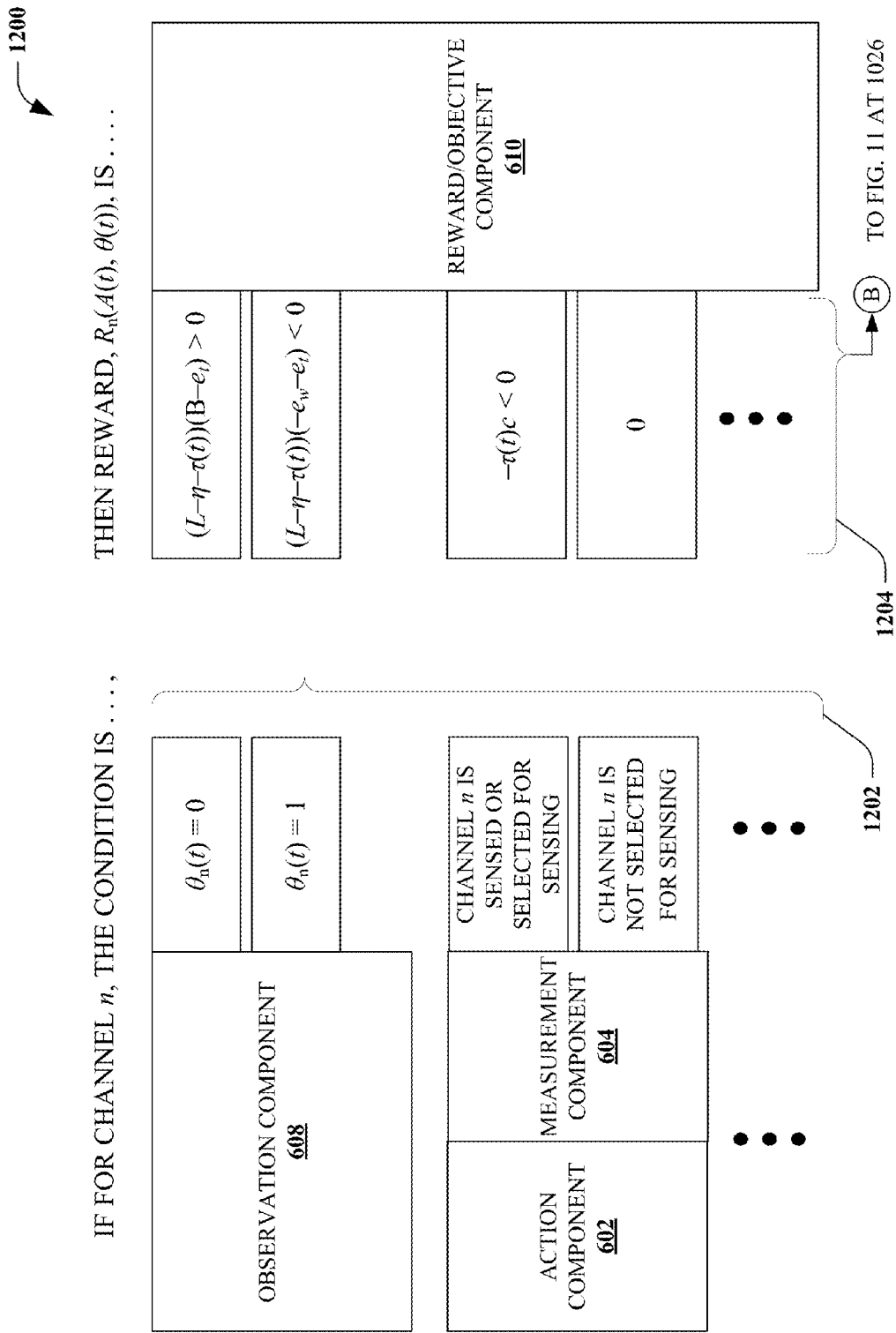
FIG. 12 illustrates an exemplary block diagram that illustrates non-limiting aspects of an energy-efficiency objective or reward function or policy as described herein.

As a non-limiting example, FIG. 12 illustrates an exemplary block diagram 1200 that illustrates non-limiting aspects of an energy-efficiency objective or reward function or policy as described herein. For example, as described above regarding FIGS. 3-6, for instance cooperative sensing scheduling can be implemented in a manner that can influence the energy-efficiency of CRNs. To accomplish this objective, an energy-efficiency function, reward, policy, or objective can be employed by a reward/objection component 610 in conjunction with scheduling component 314, or portions thereof, and so on as further described herein regarding FIGS. 6, 8, etc., to determine assignments for SUTs, e.g., SUTs 304-308, etc. for CSS in time slot t+1.

For example, regarding CSS, at the beginning of each slot, a BS, e.g., BS 302 can decide how many SUTs can be assigned to sense each channel in order to maximize a reward (e.g., an immediate reward related to energy efficiency). In addition, various embodiments of the disclosed subject matter can employ an energy-efficiency function, reward, policy, or objective in POMDP, variable sensing duration for each slot, different number of channels sensed in each slot, various objective or reward functions or policies, constraints, and so on, etc., in the context of multiple primary channels.

As a further non-limiting example, the disclosed subject matter provides an exemplary reward that can be received at the end of each slot t according to an energy-efficiency function, reward, policy, or objective. For example, because an objective can be defined to obtain energy-efficient CRN designs, energy consumption can taken into account (e.g., by scheduling component 314, by reward/objective component 610, etc.) according to various aspects of the disclosed subject matter. Furthermore, as described above regarding FIGS. 6, 8, etc., scheduling component 314 and reward/objective component 610 can receive inputs from other components. For example, referring to FIG. 12, observation component 608 is depicted with action component 602 and measurement component 604 as inputs to reward function, $R_n(A(t), \theta(t))$ as described above, regarding FIG. 6, for example.

For instance, FIG. 6 describes observation component 608 denoting $\theta_n(t)$ as the observation of channel n obtained in slot t, and four possible outcomes at relevant times, (e.g., (i) $\theta_n(t)=0$, can denote that data transmission is performed as a result of measurement component 604 identifying channel n as idle and observation component 608 receiving an ACK in response to transmissions on this channel; (ii) $\theta_n(t)=1$, can denote that data transmission is performed as a result of measurement component 604 identifying channel n as idle and observation component 608 does not receive an ACK for this channel (or an NACK is received); (iii) $\theta_n(t)=2$, can denote that measurement component 604 identifies channel n as busy based in part on the result fusion outcome at 508 and will not be utilized; and (iv) $\theta_n(t)=3$, can denote that the BS determines that, e.g., via scheduling component 314, the channel will not be sensed, etc.). Accordingly, observation component 608 can be adapted to establish a system observation vector for which it is noted the observations can be distinguished, because the BS can govern the transmission decisions, according to further non-limiting aspects.

Likewise, for measurement vectors, CSSC 112 can comprise an action component 602 that can be adapted to generate a measurement vector in respective wireless time slots, which can determine whether a channel is sensed or selected for sensing, or whether the channel is when a channel is not selected for sensing. Thus, an exemplary non-limiting energy-efficiency function, reward, policy, or objective can consider, in conjunction with conditions or outcomes (i) and (ii) above regarding observation component 608, the conditions of whether a channel is sensed or selected for sensing, or whether the channel is when a channel is not selected for sensing, as inputs to exemplary non-limiting energy-efficiency function, reward, policy, or objective. Thus, FIG. 12 depicts observation component 608 and conditions or outcomes (i) (e.g., $\theta_n(t)=0$) and (ii) (e.g., $\theta_n(t)=1$) associated with observation component 608 and the conditions of whether a channel is sensed or selected for sensing, or whether the channel is when a channel is not selected for sensing associated with action component 602 and measurement component 604, each with the corresponding reward result or function as described above regarding FIG. 6, and as further described below.

As an illustrative example, exemplary non-limiting energy-efficiency function, reward, policy, or objective for channel n, $R_n(A(t), \theta(t))$, as depicted in FIG. 12 can comprise non-limiting values such as: (i) when $\theta_n(t)=0$, e.g., as determined by observation component 608, a positive reward $(L-\eta-\tau(t))(B-e_t)$ can be determined (e.g., by scheduling component 314, by reward/objective component 610, by portions thereof, etc.), where $\tau(t) \in (0, L-\eta)$ can denote the sensing duration (e.g., SU sensing duration 506), $\eta$ can denote the duration for sensing scheduling and result fusion in the BS (e.g., sensing scheduling 504 and result fusion 508), B can denote a reward (e.g., an aspect of reward 514) for successful transmission and $-e_t$ can denote the energy consumed for transmission, both of which can be proportional to transmission duration; (ii) when $\theta_n(t)=1$, e.g., as determined by observation component 608, a negative reward $(L-\eta-\tau(t))(-e_w-e_t)$ can be determined (e.g., by scheduling component 314, by reward/objective component 610, by portions thereof, etc.). In various non-limiting implementations, $-e_w$ can be regarded as a punishment for interference generated to a PU, as described above, which can be understood to reflect energy waste due to collision(s) or potential collisions (e.g., a parameter that can facilitate achieving energy-efficient CRN designs, as further described herein); (iii) when a channel is sensed (e.g., at SU sensing duration 506) or selected for sensing (e.g., via scheduling component 314), a negative reward $-\tau(t)c$ can be determined (e.g., by scheduling component 314, by reward/objective component 610, by portions thereof, etc.), where c can denote energy consumed in spectrum sensing per unit of time, according to further non-limiting aspects; and (iv) when a channel is not selected for sensing, a condition of no reward (e.g. zero reward) can be employed or determined (e.g., by scheduling component 314, by reward/objective component 610, by portions thereof, etc.), according to still further non-limiting aspects.

Thus, to accomplish the objective of influencing the energy-efficiency of CRNs, an exemplary non-limiting energy-efficiency function, reward, policy, or objective can be employed by CSSC 112 (e.g., via scheduling component 314, by reward/objective component 610, portions thereof, and so on, etc.). Accordingly, as described above regarding FIG. 11, if there is a reward to be obtained, method 1100 can further comprise determining the reward, for example, at 1204 of FIG. 12.

Figure 13:
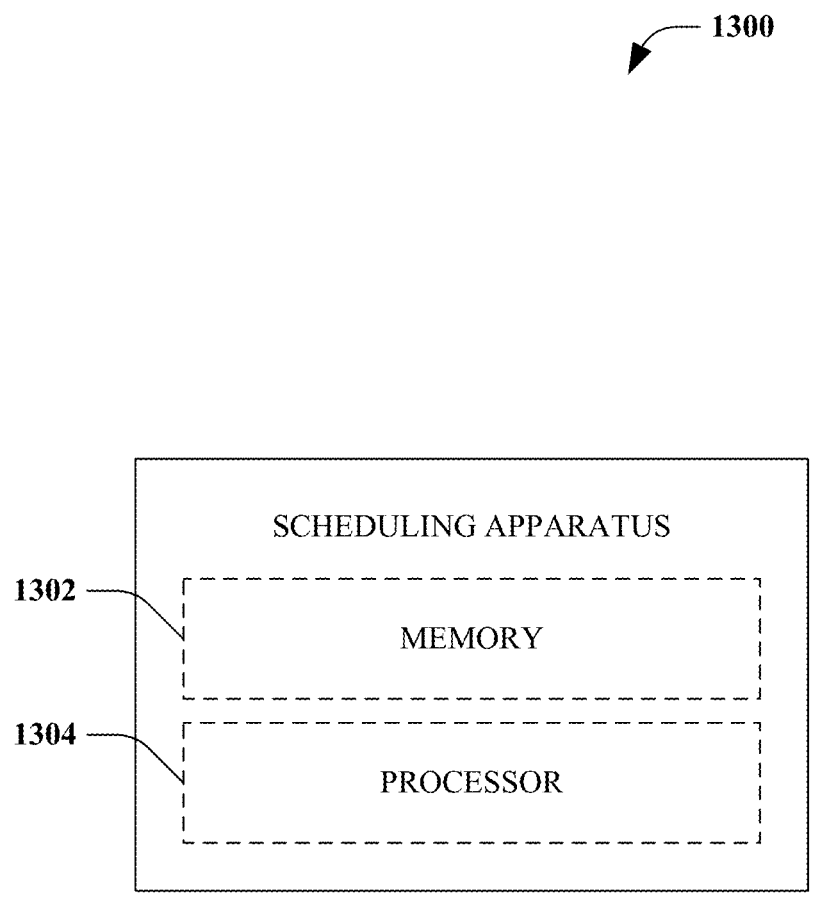
FIG. 13 illustrates an exemplary non-limiting scheduling apparatus suitable for performing various techniques of the disclosed subject matter.
Figure 14:
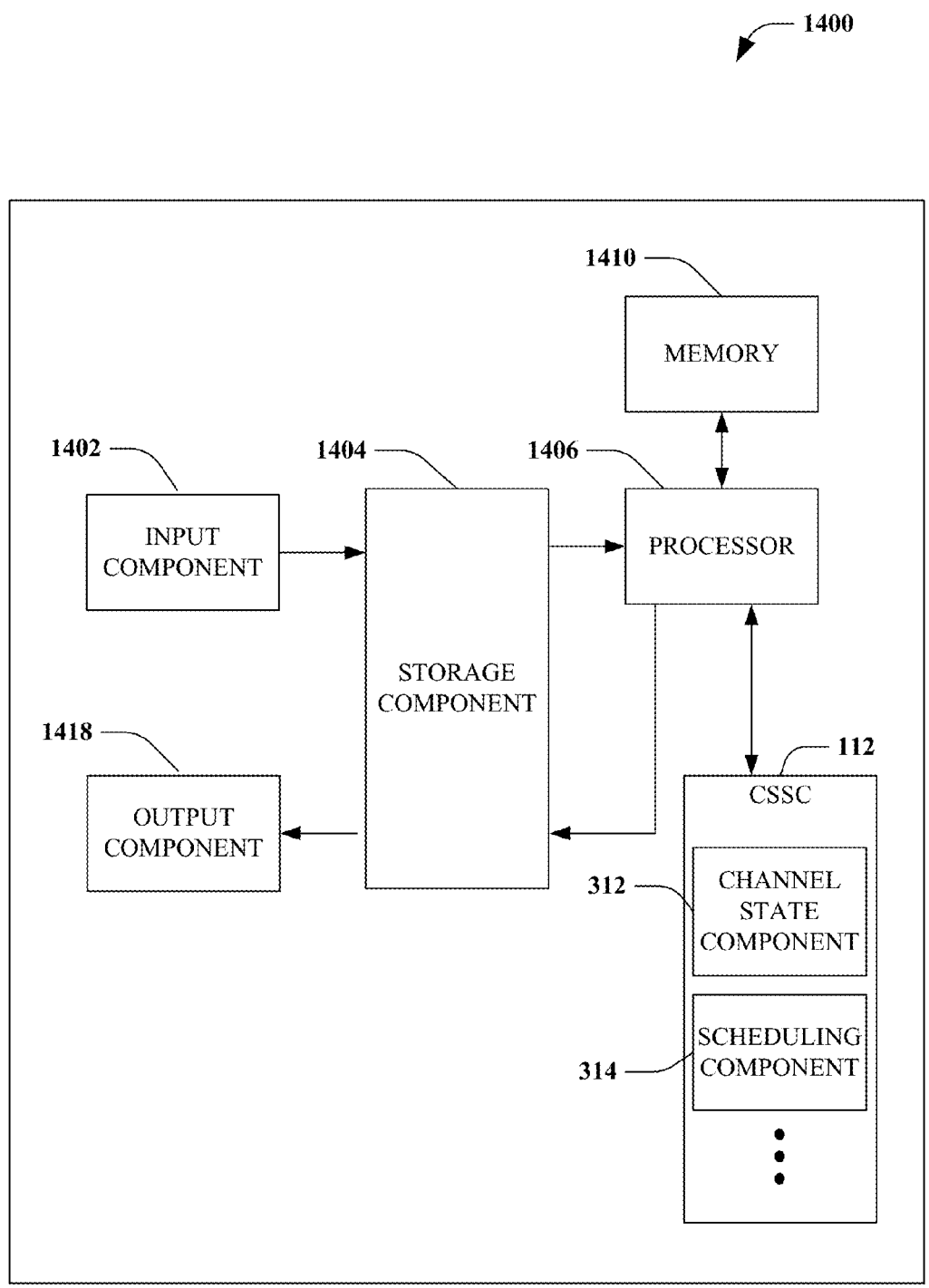
FIG. 14 illustrates an exemplary non-limiting system suitable for performing various techniques of the disclosed subject matter.

In view of the methods described supra, systems and devices that can be implemented in accordance with the disclosed subject matter will be better appreciated with reference to the functional block diagrams of FIGS. 13-14. While, for purposes of simplicity of explanation, the functional block diagrams are shown and described as various assemblages of functional component blocks, it is to be understood and appreciated that such illustrations or corresponding descriptions are not limited by such functional block diagrams, as some implementations may occur in different configurations. Moreover, not all illustrated blocks may be required to implement the systems and devices described hereinafter.

Exemplary Systems and Apparatuses

FIG. 13 illustrates an exemplary non-limiting scheduling apparatus 1300 suitable for performing various techniques of the disclosed subject matter. The apparatus 1300 can be a stand-alone scheduling apparatus or portion thereof or a specially programmed computing device or a portion thereof (e.g., a memory retaining instructions for performing the techniques as described herein coupled to a processor). Apparatus 1300 can include a memory 1302 that retains various instructions with respect to scheduling, comparison, reward calculations, statistical calculations, analytical routines, and/or the like. For instance, apparatus 1300 can include a memory 1302 that retains instructions for estimating states for a set of wireless channels as busy or idle from prior channel information associated with the set of wireless channels. The memory 1302 can further retain instructions for calculating a branch metric based on the cumulative path metric. Additionally, memory 1302 can retain instructions for assigning a subset of secondary user terminals (SUTs) to measure selected wireless channels based on an energy-efficiency objective for the subset of SUTs and the estimated states of the set of wireless channels.

Memory 1302 can further include instructions pertaining to receiving measurement results of the set of wireless channels; to specifying data traffic for the subset of SUTs based on the measurement results; to receiving or inferring data traffic feedback associated with to the data traffic; and/or to employing the data traffic feedback to facilitate assigning the subset of SUTs in a subsequent time frame. The above example instructions and other suitable instructions can be retained within memory 1302, and a processor 1304 can be utilized in connection with executing the instructions.

In further non-limiting implementations, apparatus 1300 can comprise processor 1304, and/or computer readable instructions stored on a non-transitory computer readable storage medium (e.g., memory 1302, a hard disk drive, and so son, etc.), the computer readable instructions, when executed by a computing device, e.g., processor 1304, can cause the computing device perform operations, according to various aspects of the disclosed subject matter. For instance, as a non-limiting example, the computer readable instructions, when executed by a computing device, can cause the computing device to estimate states to generate estimated states for wireless channels as busy or idle from prior channel information associated with the set of wireless channels, assign a subset of SUTs to measure selected wireless channels based on an energy-efficiency reward policy for the subset of SUTs and the estimated states of the wireless channels, and so on, etc., as described herein.

FIG. 14 illustrates a system 1400 that can be utilized in connection with cooperative sensing scheduling techniques as described herein. System 1400 can comprise an input component 1402 that can receive data, signals, information, feedback, and so on to facilitate CSS, and can perform typical actions thereon (e.g., transmits to storage component 1404 or other components such as CSSC 112, channel state component 312, scheduling component 314, portions thereof, and so on, etc.) for the received data, signals, information, feedback, etc. A storage component 1404 can store the received data, signal, information (e.g., action, measurement, belief, and/or observation vectors, such as described above regarding FIGS. 6-7, etc.) for later processing or can provide it to CSSC 112, or a processor 1406, via memory 1410 over a suitable communications bus or otherwise, or to the output component 1418.

Processor 1406 can be a processor dedicated to analyzing information received by input component 1402 and/or generating information for transmission by an output component 1418. Processor 1406 can be a processor that controls one or more portions of system 1400, and/or a processor that can analyze information received by input component 1402, can generate information for transmission by output component 1418, and can perform various CSS algorithms associated with CSSC 112, or as further described herein. In addition, system 1400 can further include a CSSC 112, as described above and that can perform various techniques as described herein, in addition to the various other functions required by other components as described above.

While CSSC 112 is shown external to the processor 1406 and memory 1410, it is to be appreciated that CSSC 112 can include CSS code or instructions stored in storage component 1404 and subsequently retained in memory 1410 for execution by processor 1406. In addition, CSSC 112 can utilize artificial intelligence based methods in connection with performing inference and/or probabilistic determinations and/or statistical-based determinations in connection applying the CSS techniques described herein.

System 1400 can additionally comprise memory 1410 that is operatively coupled to processor 1406 and that stores information such as described above, parameters, information, and the like, wherein such information can be employed in connection with implementing the CSS techniques as described herein. Memory 1410 can additionally store protocols associated with generating lookup tables, etc., such that system 1400 can employ stored protocols and/or algorithms further to the performance of sequence translation.

It will be appreciated that storage component 1404, memory 1406, and survivor memory unit 1420, or any combination thereof as described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synch link DRAM (SLDRAM), and direct Rambus RAM (DRRAM). The memory 1410 is intended to comprise, without being limited to, these and any other suitable types of memory, including processor registers and the like. In addition, by way of illustration and not limitation, storage component 1404 can include conventional storage media as in known in the art (e.g., hard disk drive).

Accordingly, in further non-limiting implementations, exemplary system 1400 for scheduling sensing in a wireless system can comprise a means for identifying states for a set of wireless channels as busy or idle from prior channel information associated with the set of wireless channels. For instance, CSSC 112 can comprise the means for identifying states for a set of wireless channels as further described herein. Furthermore, CSSC 112 can comprise a means for selecting SUTs for sensing a subset of the wireless channels based on an objective function related to energy consumption of the wireless system and the identified states of the set of wireless channels, for example, as described above regarding FIG. 6-8, 13-14, etc. For instance, the means for selecting SUTs to sense the subset of wireless channels can be based in part on an energy efficiency constrain, on a PUT collision constraint that facilitates mitigating collisions of the SUTs with a PUT associated with the wireless system, and so on, etc. In addition, exemplary system 1400 for scheduling sensing in a wireless system can further comprise a means for determining a sensing duration for sensing the subset of the set of wireless channels, for example, as described above regarding FIG. 6, to facilitate attempting to maximize the objective function related to energy consumption of the wireless system.

In further non-limiting embodiments, exemplary system 1400 can also include a means for receiving measurement results (e.g., via input component 1402, measurement component 604, etc.) associated with identified states of the set of wireless channels in response to the selecting the SUTs, as described above regarding FIG. 6-8, 13-14, etc. In addition, system 1400 can also include a means for identifying one of the subset of wireless channels as being in an idle state from the measurement results (e.g., via measurement component 604, etc.). In still other non-limiting implementations of exemplary system 1400, the disclosed subject matter provides a means for assigning wireless traffic for one of the SUTs on one or more wireless channels (e.g., via scheduling component 314, etc.), a means for receiving or inferring feedback associated with the wireless traffic (e.g., via observation component 608, etc.), and a means for verifying one of the identified states of the set of wireless channels based on the feedback (e.g., via channel state component 314, etc.).

In still further non-limiting implementations, regarding, for example FIGS. 6, 8, 14, etc., an exemplary system (e.g., 600, 800, 1400, etc.) for CSS employing objectives, rewards, policies, and so on related to energy efficiency can comprise a channel state component (e.g., channel state component 312, portions thereof, and so on, etc.) adapted to estimate states of wireless channels associated with a cognitive radio base station (e.g., BS 302, etc.) as busy or idle for a wireless time slot (e.g., slot 500, etc.). In addition, the exemplary system (e.g., 600, 800, 1400, etc.) can further comprise a scheduling component (e.g., scheduling component 314, portions thereof, and so on, etc.) adapted to select, based on a reward policy associated with energy efficiency of SUTs, a subset of SUTs to perform idle or busy state measurements on a subset of the wireless channels.

In a further non-limiting example, the scheduling component can be adapted to employ a sensing duration constraint (e.g., sensing duration constraint 810, etc.) to determine a sensing duration to sense a subset of the wireless channels by one or more SUTs to improve or attempt to improve the reward policy associated with energy efficiency. Alternatively or additionally, the scheduling component can be adapted to employ a collision constraint (e.g., collision constraint 812, etc.) to facilitate the selection of the subset of SUTs based on a PUT collision constraint to mitigate collisions of the subset of SUTs with the PUT. In still further exemplary embodiments, exemplary system (e.g., 600, 800, 1400, etc.) can further comprise a scheduling component adapted to employ an energy efficiency constraint (e.g., energy efficiency constraint 808, etc.) to facilitate selection of the subset of SUTs to facilitate maximization or attempted maximization of the reward policy associated with energy efficiency of the SUTs. For instance, the energy efficiency constraint (e.g., energy efficiency constraint 808, etc.) can be adapted to tune an energy efficiency parameter, such as, for example, a punishment parameter associated with interference with the PUT, a reward associated with successful transmission, and so on, as further described herein.

In still further exemplary embodiments, exemplary system (e.g., 600, 800, 1400, etc.) can further comprise a reward component (not shown) (e.g., reward/objective component 610, portions thereof, and so on, etc.) adapted to determine an expected immediate reward, apply the reward policy associated with energy efficiency of SUTs, for example, as further described above regarding FIG. 6.

Numerical Results

Figure 15:
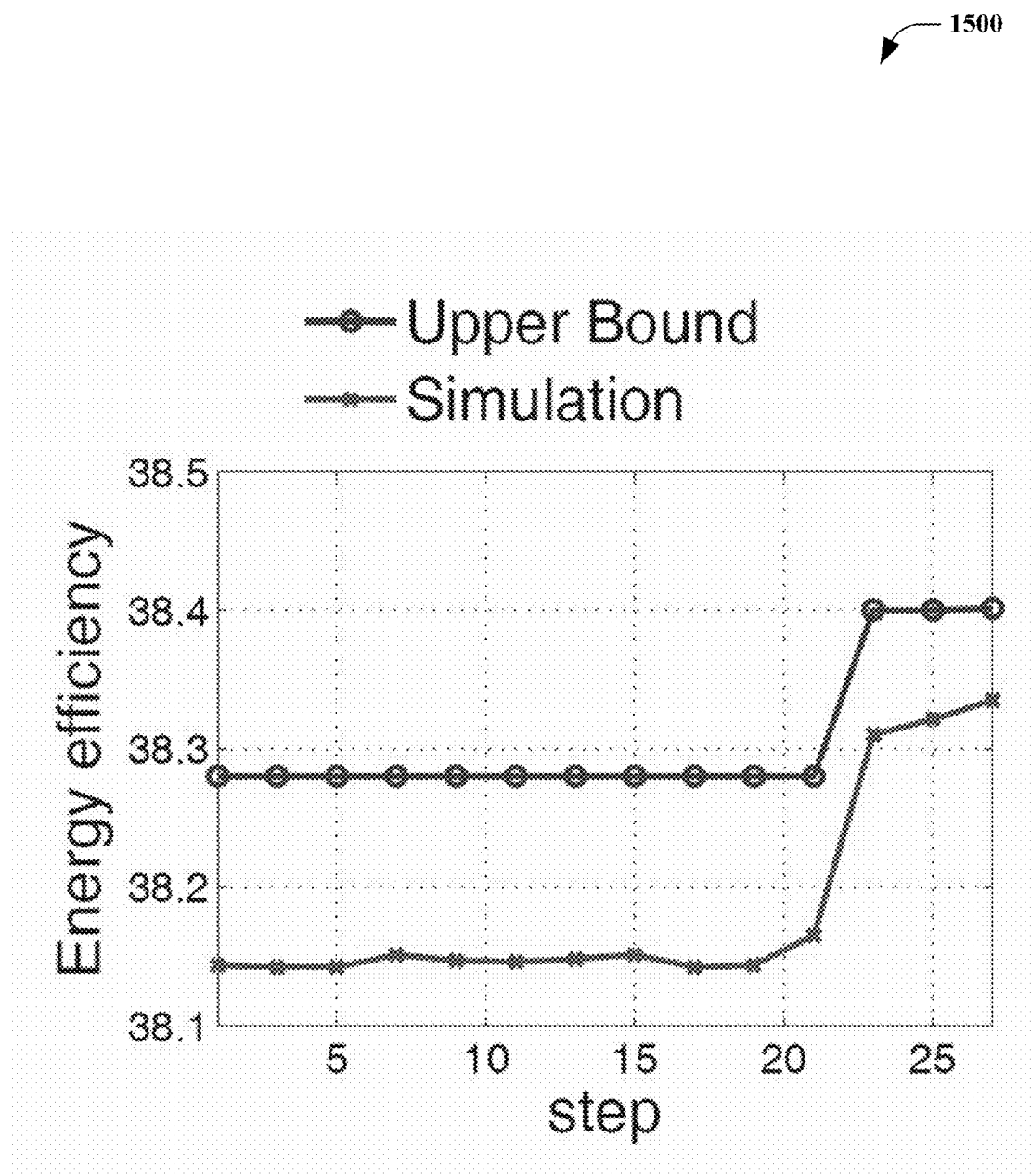
FIGS. 15-16 demonstrate energy-efficient performance of various non-limiting embodiments, in accordance with aspects of the disclosed subject matter.
Figure 16:
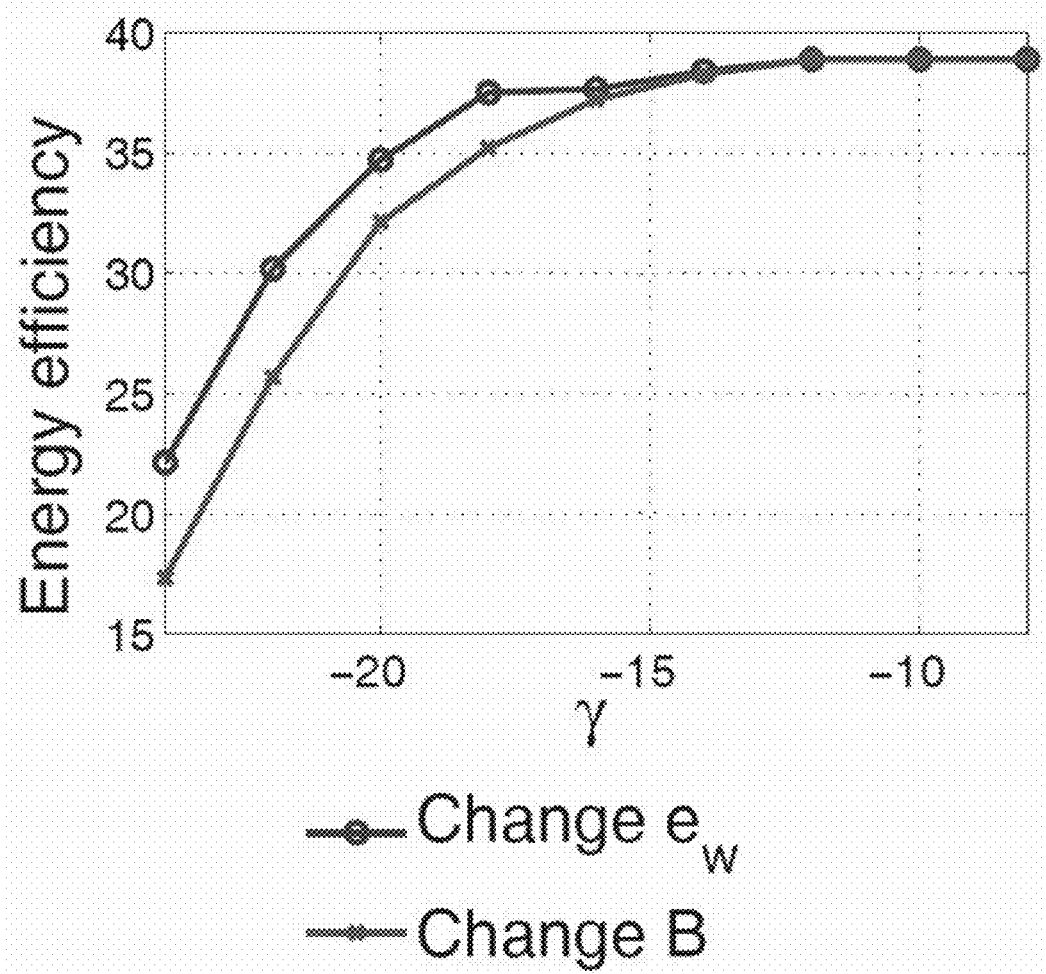

FIGS. 15-16 demonstrate energy-efficient performance of various non-limiting embodiments, in accordance with aspects of the disclosed subject matter. As described herein, a further non-limiting aspect of the disclosed subject matter provides exemplary embodiments that can employ a punishment parameter that can be tunes to facilitate better energy efficiency in CRNs. Thus, simulation results as presented in FIGS. 15-16 demonstrate an exemplary impact of punishment parameter $e_w$ on energy efficiency of an exemplary CRN. For instance, in the non-limiting example as used as a basis in the simulation, a number of primary channels is presumed to be N=10, the number of SUTs is presumed to be M=8, frame duration is chosen to be L=100 milliseconds (ms), and duration for sensing scheduling and result fusion is chosen to be η=0.1 L. In addition, a conventional signal model can be used, where a low SNR region is considered, sampling rate is chosen to be $f_s$=4 megaHertz (MHz), desired detection probability is set to $\bar{P}_d$=0.9, and parameters related to the reward function are set to B=10, $e_t$=1, and c=10.

Thus, in FIG. 15 energy efficiency simulation performance using a punishment parameter, $e_w$, versus an upper bound is depicted. For instance, the value of the efficiency criteria $\epsilon^{SVC}$ achieved in the derived upper bound can be compared to simulation results, under the transition probabilities $p_{00}$=0.8, $p_{10}$=0.7 and SNR value γ=−14 decibel (dB). The punishment parameter, $e_w$, can be varied from 30 to 550, with step size of 40 in FIG. 15. Note that, according to a non-limiting aspect, for practical considerations, sensing duration is exemplified without using the entire frame, otherwise the sensing result would remain idle and the transmission could not be performed. Thus, for this practical consideration, value of $e_w$ can be limited to avoid this situation for all belief values. It can be seen from FIG. 15 that the difference between the upper bound and the simulation results can be within 1 percent (%). Moreover, according to a further non-limiting aspect, optimal $e_w$ can be achieved at a boundary of making the model practical. Thus, FIG. 15 demonstrates that by appropriately choosing the value of a punishment parameter, e, better energy efficiency can be achieved.

FIG. 16 depicts the effects of adjusting punishment parameter, $e_w$, versus adjusting reward function parameter (e.g., reward for successful transmission B). For example, consider two different schemes of adjusting the punishment parameter, $e_w$, as described herein, and of adjusting the reward for successful transmission B with setting $e_w$=0 as in conventional designs. Thus, FIG. 16 compares maximum values of $\epsilon^{SVC}$ of the two schemes under different SNR, γ, values ranging from −24 dB to −8 dB. It can be seen in FIG. 16 that the first scheme (e.g., adjusting the punishment parameter, $e_w$) leads to better energy efficiency than the second one (e.g., adjusting the reward for successful transmission B). Thus, FIG. 16 demonstrates that the improvement is comparatively larger in the low SNR region than in the high SNR region (e.g., γ>−15 dB), which can be attributed in part to tuning, e, such that the BS, e.g. BS 302, has better sensing performance by making relatively more cautious transmission decisions to avoid collision and perform more successful transmissions, whereas with tuning B, collisions are not taken into account. It can be understood that in low SNR regions, sensing performance suffers, and as a result, to gain higher throughput the BS, e.g., BS 302 can attempt tuning B, but throughput is limited by bad sensing performance resulting in low energy efficiency. On the other hand, when SNR is high, only a very small duration for sensing is needed to maximize the corresponding value function and the sensing performance tends to become close in both schemes. Accordingly, FIG. 16 reveals that by introducing the punishment parameter, $e_w$, higher energy efficiency can be obtained compared to the conventional designs.

It can be understood that while a brief overview of exemplary systems, methods, scenarios, and/or devices has been provided, the disclosed subject matter is not so limited. Thus, it can be further understood that various modifications, alterations, addition, and/or deletions can be made without departing from the scope of the embodiments as described herein. Accordingly, similar non-limiting implementations can be used or modifications and additions can be made to the described embodiments for performing the same or equivalent function of the corresponding embodiments without deviating therefrom.

Exemplary Computer Networks and Environments

One of ordinary skill in the art can appreciate that the disclosed subject matter can be implemented in connection with any computer or other client or server device, which can be deployed as part of a communications system, a computer network, or in a distributed computing environment, connected to any kind of data store. In this regard, the disclosed subject matter pertains to any computer system or environment having any number of memory or storage units, and any number of applications and processes occurring across any number of storage units or volumes, which may be used in connection with communication systems using the scheduling techniques, systems, and methods in accordance with the disclosed subject matter. The disclosed subject matter may apply to an environment with server computers and client computers deployed in a network environment or a distributed computing environment, having remote or local storage. The disclosed subject matter may also be applied to standalone computing devices, having programming language functionality, interpretation and execution capabilities for generating, receiving and transmitting information in connection with remote or local services and processes.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may implicate the communication systems using the scheduling techniques, systems, and methods of the disclosed subject matter.

Figure 17:
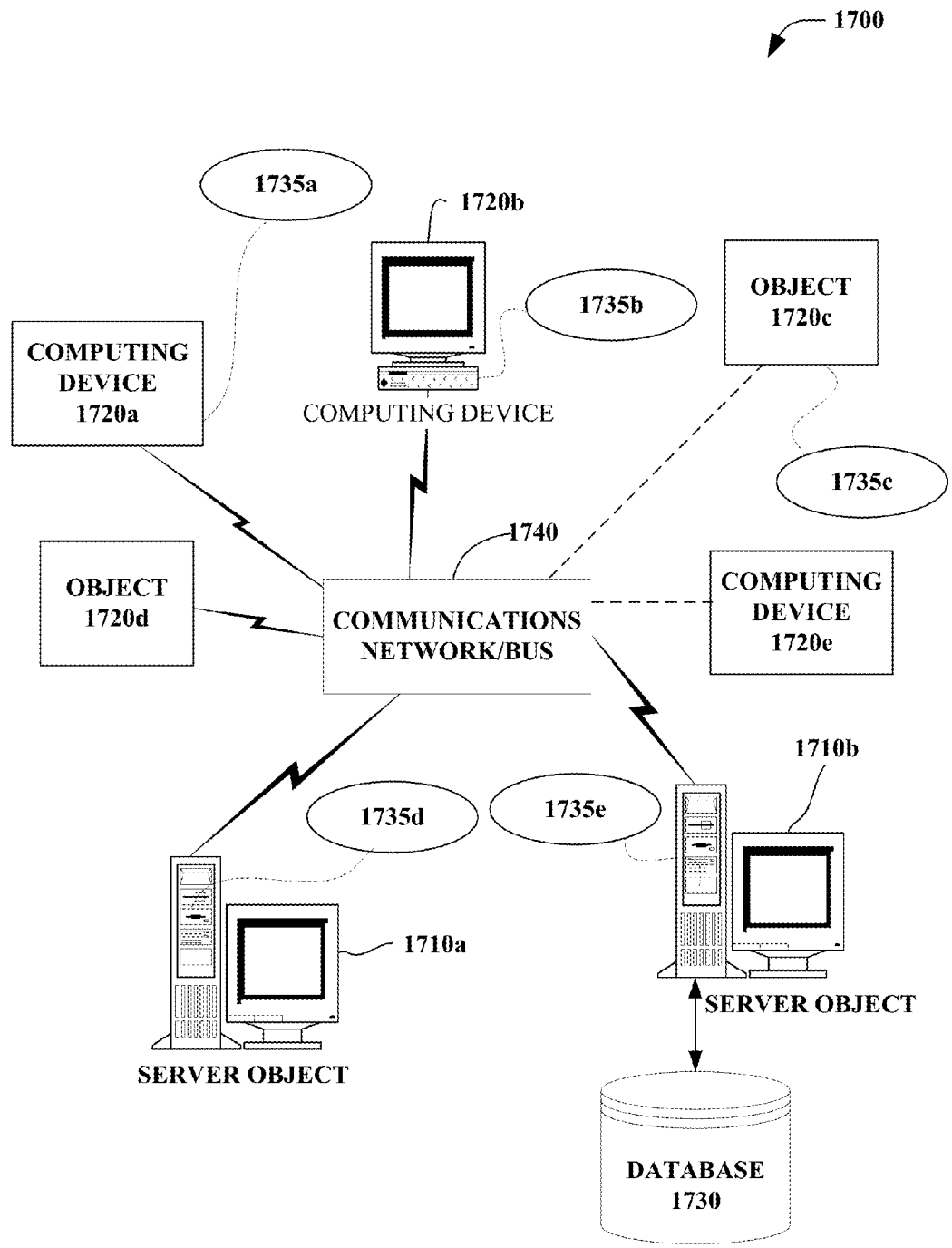
FIG. 17 is a block diagram representing an exemplary non-limiting networked environment in which the disclosed subject matter may be implemented.

FIG. 17 provides a schematic diagram of an exemplary networked or distributed computing environment. The distributed computing environment comprises computing objects 1710a, 1710b, etc. and computing objects or devices 1720a, 1720b, 1720c, 1720d, 1720e, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 1740. This network may itself comprise other computing objects and computing devices that provide services to the system of FIG. 17, and may itself represent multiple interconnected networks. In accordance with an aspect of the disclosed subject matter, each object 1710a, 1710b, etc. or 1720a, 1720b, 1720c, 1720d, 1720e, etc. may contain an application that might make use of an API, or other object, software, firmware and/or hardware, suitable for use with the design framework in accordance with the disclosed subject matter.

It can also be appreciated that an object, such as 1720c, may be hosted on another computing device 1710a, 1710b, etc. or 1720a, 1720b, 1720c, 1720d, 1720e, etc. Thus, although the physical environment depicted may show the connected devices as computers, such illustration is merely exemplary and the physical environment may alternatively be depicted or described comprising various digital devices such as PDAs, televisions, MP3 players, etc., any of which may employ a variety of wired and wireless services, software objects such as interfaces, COM objects, and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for communicating information used in the communication systems using the scheduling techniques, systems, and methods according to the disclosed subject matter.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, e.g., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 17, as an example, computers 1720a, 1720b, 1720c, 1720d, 1720e, etc. can be thought of as clients and computers 1710a, 1710b, etc. can be thought of as servers where servers 1710a, 1710b, etc. maintain the data that is then replicated to client computers 1720a, 1720b, 1720c, 1720d, 1720e, etc., although any computer can be considered a client, a server, or both, depending on the circumstances. Any of these computing devices may be processing data or requesting services or tasks that may use or implicate the communication systems using the scheduling techniques, systems, and methods in accordance with the disclosed subject matter.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to communication (wired or wirelessly) using the scheduling techniques, systems, and methods of the disclosed subject matter may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web(WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 17 illustrates an exemplary networked or distributed environment, with server(s) in communication with client computer (s) via a network/bus, in which the disclosed subject matter may be employed. In more detail, a number of servers 1710a, 1710b, etc. are interconnected via a communications network/bus 1740, which may be a LAN, WAN, intranet, GSM network, the Internet, etc., with a number of client or remote computing devices 1720a, 1720b, 1720c, 1720d, 1720e, etc., such as a portable computer, handheld computer, thin client, networked appliance, or other device, such as a VCR, TV, oven, light, heater and the like in accordance with the disclosed subject matter. It is thus contemplated that the disclosed subject matter may apply to any computing device in connection with which it is desirable to communicate data over a network.

In a network environment in which the communications network/bus 1740 is the Internet, for example, the servers 1710a, 1710b, etc. can be Web servers with which the clients 1720a, 1720b, 1720c, 1720d, 1720e, etc. communicate via any of a number of known protocols such as HTTP. Servers 1710a, 1710b, etc. may also serve as clients 1720a, 1720b, 1720c, 1720d, 1720e, etc., as may be characteristic of a distributed computing environment.

As mentioned, communications to or from the systems incorporating the scheduling techniques, systems, and methods of the disclosed subject matter may ultimately pass through various media, either wired or wireless, or a combination, where appropriate. Client devices 1720a, 1720b, 1720c, 1720d, 1720e, etc. may or may not communicate via communications network/bus 17, and may have independent communications associated therewith. For example, in the case of a TV or VCR, there may or may not be a networked aspect to the control thereof. Each client computer 1720a, 1720b, 1720c, 1720d, 1720e, etc. and server computer 1710a, 1710b, etc. may be equipped with various application program modules or objects 1735a, 1735b, 1735c, etc. and with connections or access to various types of storage elements or objects, across which files or data streams may be stored or to which portion(s) of files or data streams may be downloaded, transmitted or migrated. Any one or more of computers 1710a, 1710b, 1720a, 1720b, 1720c, 1720d, 1720e, etc. may be responsible for the maintenance and updating of a database 1730 or other storage element, such as a database or memory 1730 for storing data processed or saved based on communications made according to the disclosed subject matter. Thus, the disclosed subject matter can be utilized in a computer network environment having client computers 1720a, 1720b, 1720c, 1720d, 1720e, etc. that can access and interact with a computer network/bus 1740 and server computers 1710a, 1710b, etc. that may interact with client computers 1720a, 1720b, 1720c, 1720d, 1720e, etc. and other like devices, and databases 1730.

Exemplary Computing Device

Figure 18:
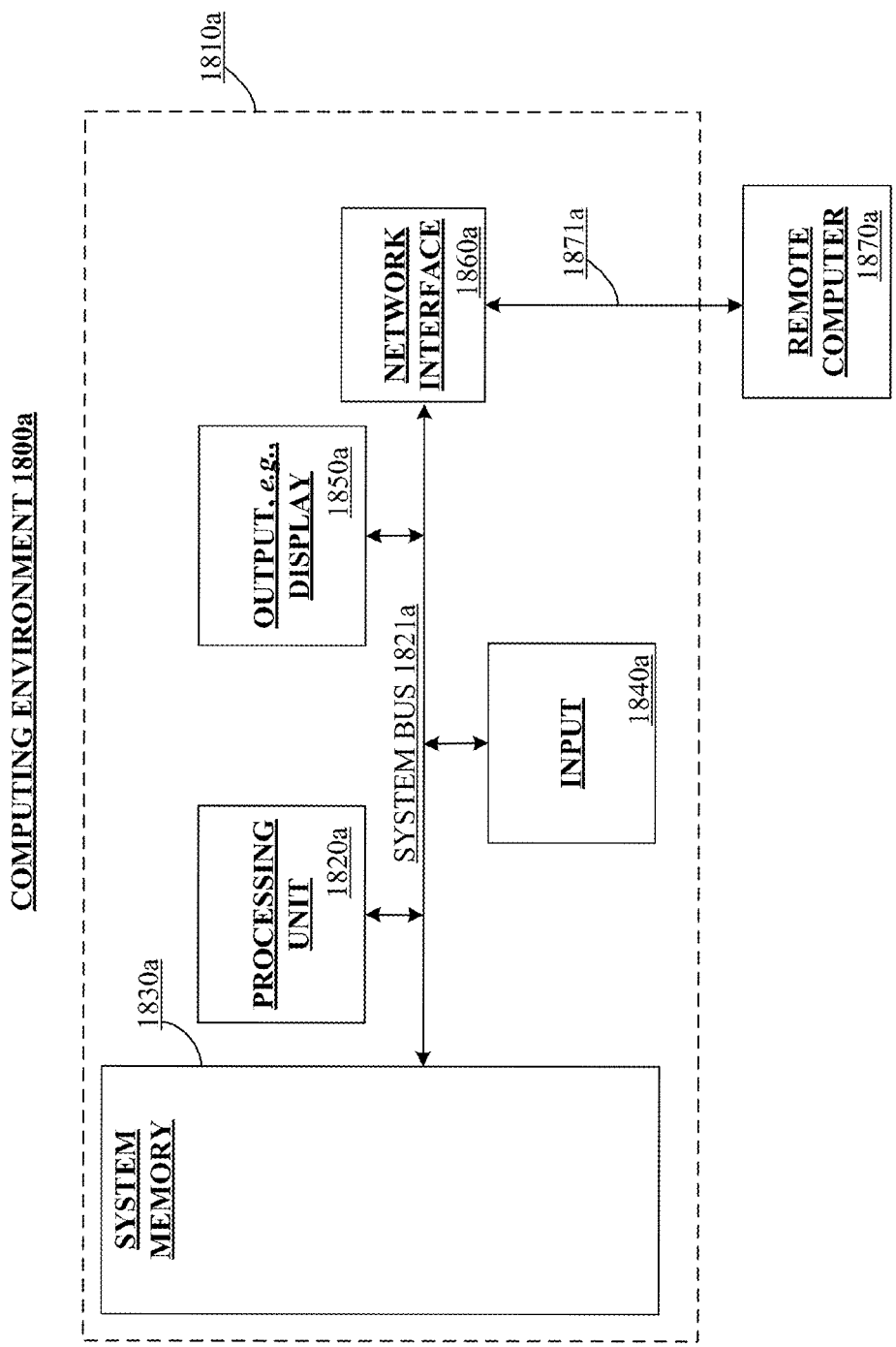
FIG. 18 is a block diagram representing an exemplary non-limiting computing system or operating environment in which the disclosed subject matter may be implemented.

As mentioned, the disclosed subject matter applies to any device wherein it may be desirable to communicate data, e.g., to or from a mobile device. It should be understood, therefore, that handheld, portable and other computing devices and computing objects of all kinds are contemplated for use in connection with the disclosed subject matter, e.g., anywhere that a device may communicate data or otherwise receive, process or store data. Accordingly, the below general purpose remote computer described below in FIG. 18 is but one example, and the disclosed subject matter may be implemented with any client having network/bus interoperability and interaction. Thus, the disclosed subject matter may be implemented in an environment of networked hosted services in which very little or minimal client resources are implicated, e.g., a networked environment in which the client device serves merely as an interface to the network/bus, such as an object placed in an appliance.

Although not required, the some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules, being executed by one or more computers, such as client workstations, servers or other devices. Those skilled in the art will appreciate that the disclosed subject matter may be practiced with other computer system configurations and protocols.

FIG. 18 thus illustrates an example of a suitable computing system environment 1800a in which some aspects of the disclosed subject matter may be implemented, although as made clear above, the computing system environment 1800a is only one example of a suitable computing environment for a media device and is not intended to suggest any limitation as to the scope of use or functionality of the disclosed subject matter. Neither should the computing environment 1800a be interpreted as having any dependency or requirement relating to any one or combination of components illustrated in the exemplary operating environment 1800a.

With reference to FIG. 18, an exemplary remote device for implementing the disclosed subject matter includes a general purpose computing device in the form of a computer 1810a. Components of computer 1810a may include, but are not limited to, a processing unit 1820a, a system memory 1830a, and a system bus 1821a that couples various system components including the system memory to the processing unit 1820a. The system bus 1821a may be any of several types of bus structures including a memory bus or memory controller, a peripheral bus, and a local bus using any of a variety of bus architectures.

Computer 1810a typically includes a variety of computer readable media. Computer readable media can be any available media that can be accessed by computer 1810a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1810a. Communication media typically embodies computer readable instructions, data structures, program modules or other data in a modulated data signal such as a carrier wave or other transport mechanism and includes any information delivery media.

The system memory 1830a may include computer storage media in the form of volatile and/or nonvolatile memory such as read only memory (ROM) and/or random access memory (RAM). A basic input/output system (BIOS), containing the basic routines that help to transfer information between elements within computer 1810a, such as during start-up, may be stored in memory 1830a. Memory 1830a typically also contains data and/or program modules that are immediately accessible to and/or presently being operated on by processing unit 1820a. By way of example, and not limitation, memory 1830a may also include an operating system, application programs, other program modules, and program data.

The computer 1810a may also include other removable/non-removable, volatile/nonvolatile computer storage media. For example, computer 1810a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 1821a through a non-removable memory interface such as an interface, and a magnetic disk drive or optical disk drive is typically connected to the system bus 1821a by a removable memory interface, such as an interface.

A user may enter commands and information into the computer 1810a through input devices such as a keyboard and pointing device, commonly referred to as a mouse, trackball or touch pad. Other input devices may include a microphone, joystick, game pad, satellite dish, scanner, wireless device keypad, voice commands, or the like. These and other input devices are often connected to the processing unit 1820*a* through user input 1840*a* and associated interface(s) that are coupled to the system bus 1821*a*, but may be connected by other interface and bus structures, such as a parallel port, game port or a universal serial bus (USB). A graphics subsystem may also be connected to the system bus 1821*a*. A monitor or other type of display device is also connected to the system bus 1821*a* via an interface, such as output interface 1850*a*, which may in turn communicate with video memory. In addition to a monitor, computers may also include other peripheral output devices such as speakers and a printer, which may be connected through output interface 1850*a*.

The computer 1810*a* may operate in a networked or distributed environment using logical connections to one or more other remote computers, such as remote computer 1870*a*, which may in turn have media capabilities different from device 1810*a*. The remote computer 1870*a* may be a personal computer, a server, a router, a network PC, a peer device, personal digital assistant (PDA), cell phone, handheld computing device, or other common network node, or any other remote media consumption or transmission device, and may include any or all of the elements described above relative to the computer 1810*a*. The logical connections depicted in FIG. 18 include a network 1871*a*, such local area network (LAN) or a wide area network (WAN), but may also include other networks/buses, either wired or wireless. Such networking environments are commonplace in homes, offices, enterprise-wide computer networks, intranets and the Internet.

When used in a LAN networking environment, the computer 1810*a* is connected to the LAN 1871*a* through a network interface or adapter. When used in a WAN networking environment, the computer 1810*a* typically includes a communications component, such as a modem, or other means for establishing communications over the WAN, such as the Internet. A communications component, such as a modem, which may be internal or external, may be connected to the system bus 1821*a* via the user input interface of input 1840*a*, or other appropriate mechanism. In a networked environment, program modules depicted relative to the computer 1810*a*, or portions thereof, may be stored in a remote memory storage device. It will be appreciated that the network connections shown and described are exemplary and other means of establishing a communications link between the computers may be used.

While the disclosed subject matter has been described in connection with the preferred embodiments of the various figures, it is to be understood that other similar embodiments may be used or modifications and additions may be made to the described embodiment for performing the same function of the disclosed subject matter without deviating therefrom. For example, one skilled in the art will recognize that the disclosed subject matter as described in the present application applies to communication systems using the disclosed scheduling techniques, systems, and methods and may be applied to any number of devices connected via a communications network and interacting across the network, either wired, wirelessly, or a combination thereof.

Accordingly, while words such as transmitted and received are used in reference to the described communications processes, it should be understood that such transmitting and receiving is not limited to digital communications systems, but could encompass any manner of sending and receiving data suitable for implementation of the described scheduling techniques. As a result, the disclosed subject matter should not be limited to any single embodiment, but rather should be construed in breadth and scope in accordance with the appended claims.

Exemplary Communications Networks and Environments

The above-described communication systems using the scheduling techniques, systems, and methods may be applied to any network, however, the following description sets forth some exemplary telephony radio networks and non-limiting operating environments for communications made incident to the communication systems using the scheduling techniques, systems, and methods of the disclosed subject matter. The below-described operating environments should be considered non-exhaustive, however, and thus the below-described network architecture merely shows one network architecture into which the disclosed subject matter may be incorporated. One can appreciate, however, that the disclosed subject matter may be incorporated into any now existing or future alternative architectures for communication networks as well.

The global system for mobile communication ("GSM") is one of the most widely utilized wireless access systems in today's fast growing communication systems. GSM provides circuit-switched data services to subscribers, such as mobile telephone or computer users. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

As one of ordinary skill in the art can appreciate, the exemplary GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000("IMT-2000"), Digital Enhanced Cordless Telecommunications ("DECT"), etc., as well as to other network services that shall become available in time. In this regard, the scheduling techniques, systems, and methods of the disclosed subject matter may be applied independently of the method of data transport, and does not depend on any particular network architecture, or underlying protocols.

Figure 19:
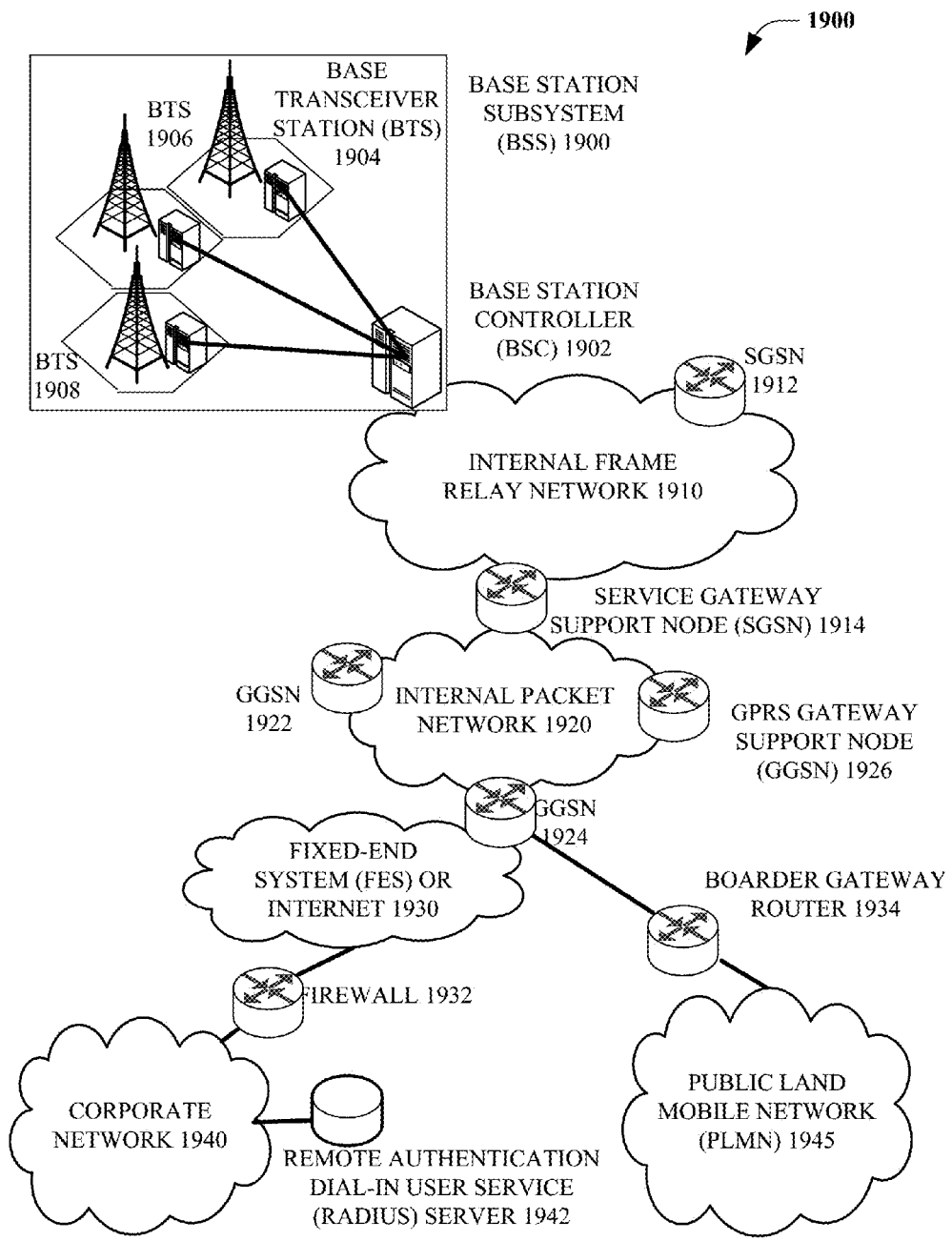
FIG. 19 illustrates an overview of a network environment suitable for service by embodiments of the disclosed subject matter.

FIG. 19 depicts an overall block diagram of an exemplary packet-based mobile cellular network environment, such as a GPRS network, in which the disclosed subject matter may be practiced. In such an environment, there are a plurality of Base Station Subsystems ("BSS") 1900 (only one is shown), each of which comprises a Base Station Controller ("BSC") 1902 serving a plurality of Base Transceiver Stations ("BTS") such as BTSs 1904, 1906, and 1908. BTSs 1904, 1906, 1908, etc. are the access points where users of packet-based mobile devices become connected to the wireless network. In exemplary fashion, the packet traffic originating from user devices is transported over the air interface to a BTS 1908, and from the BTS 1908 to the BSC 1902. Base station subsystems, such as BSS 1900, are a part of internal frame relay network 1910 that may include Service GPRS Support Nodes ("SGSN") such as SGSN 1912 and 1914. Each SGSN is in turn connected to an internal packet network 1920 through which a SGSN 1912, 1914, etc. can route data packets to and from a plurality of gateway GPRS support nodes (GGSN) 1922, 1924, 1926, etc. As illustrated, SGSN 1914 and GGSNs 1922, 1924, and 1926 are part of internal packet network 1920. Gateway GPRS serving nodes 1922, 1924 and 1926 mainly provide an interface to external Internet Protocol ("IP") networks such as Public Land Mobile Network ("PLMN") 1945, corporate intranets 1940, or Fixed-End System ("FES") or the public Internet 1930. As illustrated, subscriber corporate network 1940 may be connected to GGSN 1924 via firewall 1932; and PLMN 1945 is connected to GGSN 1924 via boarder gateway router 1934. The Remote Authentication Dial-In User Service ("RADIUS") server 1942 may be used for caller authentication when a user of a mobile cellular device calls corporate network 1940.

Generally, there can be four different cell sizes in a GSM network-macro, micro, pico and umbrella cells. The coverage area of each cell is different in different environments. Macro cells can be regarded as cells where the base station antenna is installed in a mast or a building above average roof top level. Micro cells are cells whose antenna height is under average roof top level; they are typically used in urban areas. Pico cells are small cells having a diameter is a few dozen meters; they are mainly used indoors. On the other hand, umbrella cells are used to cover shadowed regions of smaller cells and fill in gaps in coverage between those cells.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Various implementations of the disclosed subject matter described herein may have aspects that are wholly in hardware, partly in hardware and partly in software, as well as in software. Furthermore, aspects may be fully integrated into a single component, be assembled from discrete devices, or implemented as a combination suitable to the particular application and is a matter of design choice. As used herein, the terms "node," "terminal," "access point," "base station," "component," "system," and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the systems of the disclosed subject matter, or certain aspects or portions thereof, may take the form of program code (e.g., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the disclosed subject matter. In the case of program code execution on programmable computers, the computing device generally includes a processor, a storage medium readable by the processor (including volatile and non-volatile memory and/or storage elements), at least one input device, and at least one output device. In addition, the components may communicate via local and/or remote processes such as in accordance with a signal having one or more data packets (e.g., data from one component interacting with another component in a local system, distributed system, and/or across a network such as the Internet with other systems via the signal).

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the some aspects of the disclosed subject matter may be implemented as a system, method, apparatus, or article of manufacture using standard programming and/or engineering techniques to produce software, firmware, hardware, or any combination thereof to control a computer or processor based device to implement aspects detailed herein. The terms "article of manufacture", "computer program product" or similar terms, where used herein, are intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally, it is known that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the various embodiments.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components, e.g., according to a hierarchical arrangement. Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

While for purposes of simplicity of explanation, methodologies disclosed herein are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the disclosed subject matter has been described in connection with the particular embodiments of the various figures, it is to be understood that other similar embodiments may be used or modifications and additions may be made to the described embodiment for performing the same function of the disclosed subject matter without deviating therefrom. Still further, the disclosed subject matter may be implemented in or across a plurality of processing chips or devices, and storage may similarly be effected across a plurality of devices. Therefore, the disclosed subject matter should not be limited to any single embodiment, but rather should be construed in breadth and scope in accordance with the appended claims.

What is claimed is:

1. A method of wireless communication, comprising:
   estimating states to generate estimated states for a set of wireless channels as busy or idle from prior channel information associated with the set of wireless channels; and
   assigning at least a subset of secondary user terminals (SUTs) to measure selected ones of the set of wireless channels based on an energy efficiency objective function for at least the subset of SUTs and the estimated states of the set of wireless channels, wherein the energy efficiency objective function is determined by at least one of a first ratio of an overall successful transmission duration of a set of successful transmissions to an overall collision duration of a set of collisions for the set of wireless channels, or a second ratio of an amount of total successful transmission durations to an amount of total transmission power consumed for the set of wireless channels.

2. The method of claim 1, further comprising:
   receiving measurement results of the selected ones of the set of wireless channels in response to the assigning;
   specifying data traffic for at least one of the subset of SUTs based at least in part on the measurement results;
   receiving or inferring data traffic feedback associated with to the data traffic; and
   employing the data traffic feedback for the assigning at least the subset of SUTs in a subsequent time frame.

3. The method of claim 1, wherein the estimating includes employing at least one of traffic feedback results, channel measurement assignment information, or channel measurement results, and further comprising:
   based on the estimated states in a current time frame, identifying at least the subset of SUTs and the selected ones of the set of wireless channels that improve the energy efficiency objective function at least for the current time frame.

4. The method of claim 3, wherein the identifying includes identifying at least the subset of SUTs and the selected ones of the set of wireless channels based on a primary user terminal (PUT) collision constraint to mitigate collisions of at least the subset of SUTs with at least one PUT.

5. The method of claim 3, wherein the identifying includes determining a sensing duration for sensing the selected ones.

6. The method of claim 3, wherein the identifying includes identifying at least the subset of SUTs and the selected ones of the set of wireless channels based on an energy efficiency constraint.

7. The method of claim 3, wherein the assigning at least the subset of the SUTs includes increasing a reward associated with energy efficiency based on at least one of the traffic feedback results, the channel measurement assignment information, or the channel measurement results.

8. The method of claim 7, wherein the increasing the reward includes maximizing an expected immediate reward for a current time slot.

9. The method of claim 7, wherein the increasing the reward includes maximizing the reward associated with energy efficiency to maximize the energy efficiency objective function for at least the subset of SUTs.

10. A system, comprising:
    a channel state component adapted to estimate states of wireless channels associated with a cognitive radio base station as busy or idle for a wireless time slot; and
    a scheduling component adapted to select, based on a reward policy associated with energy efficiency of secondary user terminals (SUTs), a subset of SUTs to perform idle or busy state measurements on a subset of the wireless channels, wherein the reward policy associated with energy efficiency is associated with at least one of a ratio of an overall successful transmission duration of a set of successful transmissions to an overall collision duration of a set of collisions for the wireless channels, or a ratio of an amount of total successful transmission durations to an amount of total transmission power consumed for the wireless channels.

11. The system of claim 10, wherein the scheduling component is further adapted to employ a sensing duration constraint to determine a sensing duration to sense at least one of the subset of the wireless channels by at least one of the subset of SUTs that improves the reward policy associated with energy efficiency.

12. The system of claim 10, wherein the scheduling component is further adapted to employ a collision constraint to facilitate the selection of the subset of SUTs based on a primary user terminal (PUT) collision constraint to mitigate collisions of the subset of SUTs with at least one PUT.

13. The system of claim 10, wherein the scheduling component is further adapted to employ an energy efficiency constraint to facilitate the selection of the subset of SUTs to facilitate maximization of the reward policy associated with energy efficiency of the SUTs.

14. The system of claim 13, wherein the energy efficiency constraint is adapted to tune an energy efficiency parameter.

15. The system of claim 14, wherein the energy efficiency parameter comprises at least one of a punishment parameter associated with interference with the at least one PUT or a reward associated with successful transmission.

16. The system of claim 10, further comprising a reward component adapted to at least one of determine an expected immediate reward or apply the reward policy associated with energy efficiency.

17. A system for scheduling sensing in a wireless system, comprising:
means for identifying states for a set of wireless channels as busy or idle from prior channel information associated with the set of wireless channels;
means for selecting secondary user terminals (SUTs) for sensing a subset of the set of wireless channels based on an objective function related to energy consumption of the wireless system and the identified states of the set of wireless channels, wherein the objective function related to energy consumption of the wireless system is associated with at least one of a first comparison between an overall successful transmission duration of a set of successful transmissions and an overall collision duration of a set of collisions for the set of wireless channels or, a second comparison between an amount of total successful transmission durations and an amount of total transmission power consumed for the set of wireless channels.

18. The system of claim 17, further comprising:
means for receiving measurement results associated with identified states of the subset of the of the set of wireless channels in response to the selecting the SUTs;
means for identifying at least one of the subset of the set of wireless channels as being in an idle state from the measurement results;
means for assigning wireless traffic for at least one of the SUTs on the at least one of the subset of the set of wireless channels;
means for receiving or inferring feedback associated with the wireless traffic; and
means for verifying at least one of the identified states of the at least one of the subset of the set of wireless channels based at least in part on the feedback.

19. The system of claim 17, further comprising:
means for determining a sensing duration for sensing the subset of the set of wireless channels to facilitate attempting to maximize the objective function related to energy consumption of the wireless system.

20. The system of claim 17, wherein the means for selecting SUTs to sense the subset of the set of wireless channels includes means for selecting SUTs to sense the subset of the set of wireless channels based in part on an energy efficiency constraint.

21. The system of claim 17, wherein the means for selecting SUTs to sense the subset of the set of wireless channels includes means for selecting SUTs to sense the subset of the set of wireless channels based in part on a primary user terminal (PUT) collision constraint that facilitates mitigating collisions of at least one of the SUTs with at least one PUT associated with the wireless system.

22. A computer readable storage medium comprising computer readable instructions that, when executed by a computing device, cause the computing device to perform operations, comprising:
estimating states to generate estimated states for a set of wireless channels as busy or idle from prior channel information associated with the set of wireless channels; and
assigning at least a subset of secondary user terminals (SUTs) to measure selected ones of the set of wireless channels based at least in part on an energy-efficiency reward policy for at least the subset of SUTs and the estimated states of the set of wireless channels, wherein the energy-efficiency reward policy is associated with at least one of a comparison between an overall successful transmission duration of a set of successful transmissions and an overall collision duration of a set of collisions for the set of wireless channels, or a comparison to an amount of total successful transmission durations and an amount of total transmission power consumed for the set of wireless channels.

23. A cooperative sensing scheduling apparatus, comprising:
a reward component adapted to determine an energy-efficiency reward for a subset of secondary user terminals (SUTs), wherein the energy-efficiency reward is associated with at least one of a relationship of an overall successful transmission duration of a set of successful transmissions to an overall collision duration of a set of collisions for a set of wireless channels associated with the SUTs, or a relationship of an amount of total successful transmission durations to an amount of total transmission power consumed for the set of wireless channels associated with the SUTs;
a scheduling component adapted to select, based in part on the energy-efficiency reward, the subset of SUTs to sense a subset of the set of wireless channels associated with the SUTs to determine states of the subset of wireless channels as idle or busy.

24. The apparatus of claim 23, further comprising:
a constraint component adapted to at least one of determine an energy efficiency constraint adapted to facilitate tuning an energy efficiency parameter, determine a primary user terminal (PUT) collision constraint to mitigate collisions of at least one of the subset of SUTs with at least one PUT, or determine a sensing duration of at least one of the subset of SUTs for the subset of wireless channels.

* * * * *